(12) United States Patent
Walbeck et al.

(10) Patent No.: US 7,310,670 B1
(45) Date of Patent: Dec. 18, 2007

(54) MULTI-CHANNEL POWER LINE EXCHANGE PROTOCOL

(75) Inventors: Alan K. Walbeck, Sandy, UT (US); Michael J. Miller, Pleasant Grove, UT (US); Eric R. Southam, Pleasant Grove, UT (US); Bradley C. Giles, Salt Lake City, UT (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/559,817

(22) Filed: Apr. 25, 2000

(51) Int. Cl.
*G06F 15/173* (2006.01)
(52) U.S. Cl. .................. 709/225; 709/229; 709/235; 726/9; 726/20; 710/40
(58) Field of Classification Search .......... 709/223, 709/231–232, 238, 235, 225, 229; 370/229, 370/231, 235; 726/9, 20; 710/40
See application file for complete search history.

(56) References Cited

U.S. PATENT DOCUMENTS

| | | | |
|---|---|---|---|
| 4,491,946 A * | 1/1985 | Kryskow et al. | 370/453 |
| 4,558,275 A | 12/1985 | Borowy et al. | |
| 4,799,052 A * | 1/1989 | Near et al. | 370/451 |
| 4,853,843 A | 8/1989 | Ecklund | |
| 4,949,337 A | 8/1990 | Aggers et al. | |
| 5,371,852 A | 12/1994 | Attanasio et al. | |
| 5,408,610 A * | 4/1995 | Arakawa | 709/245 |
| 5,473,604 A * | 12/1995 | Lorenz et al. | 370/229 |
| 5,535,337 A * | 7/1996 | Hogan et al. | 709/248 |
| 5,554,968 A | 9/1996 | Lee | |
| 5,608,720 A | 3/1997 | Biegal et al. | |
| 5,615,212 A | 3/1997 | Ruszczyk et al. | |
| 5,630,204 A | 5/1997 | Hylton et al. | |
| 5,640,446 A | 6/1997 | Everett et al. | |

(Continued)

FOREIGN PATENT DOCUMENTS

EP 0 321 976 6/1989

(Continued)

OTHER PUBLICATIONS

Communication relating to the results of the partial International search, date unknown.

*Primary Examiner*—Larry D. Donaghue
*Assistant Examiner*—Asghar Bilgrami
(74) *Attorney, Agent, or Firm*—Joseph J. Laks; Ronald H. Kurdyla; Joseph J. Opalach

(57) ABSTRACT

A scalable networking protocol that allows multiple nodes to communicate via a multi-channel network medium is described. The networking protocol allows any node on the network to assign itself as the active network server. The active network server polls client nodes based on a lineup card. The lineup card includes a high priority queue for low-latency devices, and a low priority queue for devices that can tolerate higher latencies. Network information is sent on the channels as fragments. The protocol provides bad-channel detection and retransmission of fragments in a fragment-by-fragment basis. Support for streaming data or asynchronous data is provided by allocating time slots on the network and allowing two intelligent nodes to talk directly to each other during count-limited token sessions, as arbitrated by the active network server. The network node serving as the active network server can be changed on a dynamic basis, and is typically determined by the first node initiating a transmit request on a sleeping network. Client nodes are addressed by dynamic-polling using an address isolation scheme.

15 Claims, 29 Drawing Sheets

U.S. PATENT DOCUMENTS

| | | | |
|---|---|---|---|
| 5,668,986 A | 9/1997 | Nilsen et al. | |
| 5,684,826 A * | 11/1997 | Ratner | 375/222 |
| 5,742,774 A | 4/1998 | Al-Salameh et al. | |
| 5,758,052 A | 5/1998 | Glowny et al. | |
| 5,774,668 A | 6/1998 | Choquier et al. | |
| 5,784,648 A * | 7/1998 | Duckwall | 710/40 |
| 5,796,999 A | 8/1998 | Azagury et al. | |
| 5,822,535 A * | 10/1998 | Takase et al. | 709/226 |
| 5,828,837 A * | 10/1998 | Eikeland | 709/202 |
| 5,838,226 A | 11/1998 | Houggy et al. | |
| 5,857,075 A * | 1/1999 | Chung | 709/223 |
| 5,878,221 A * | 3/1999 | Szkopek et al. | 709/218 |
| 5,889,954 A | 3/1999 | Gessel et al. | |
| 5,893,118 A | 4/1999 | Sonderegger | |
| 5,935,218 A * | 8/1999 | Beyda et al. | 709/251 |
| 5,937,165 A * | 8/1999 | Schwaller et al. | 709/224 |
| 6,006,330 A * | 12/1999 | Soni | 726/3 |
| 6,411,628 B1 * | 6/2002 | Hauck et al. | 370/447 |

FOREIGN PATENT DOCUMENTS

| | | |
|---|---|---|
| JP | 59122257 | 7/1984 |

\* cited by examiner

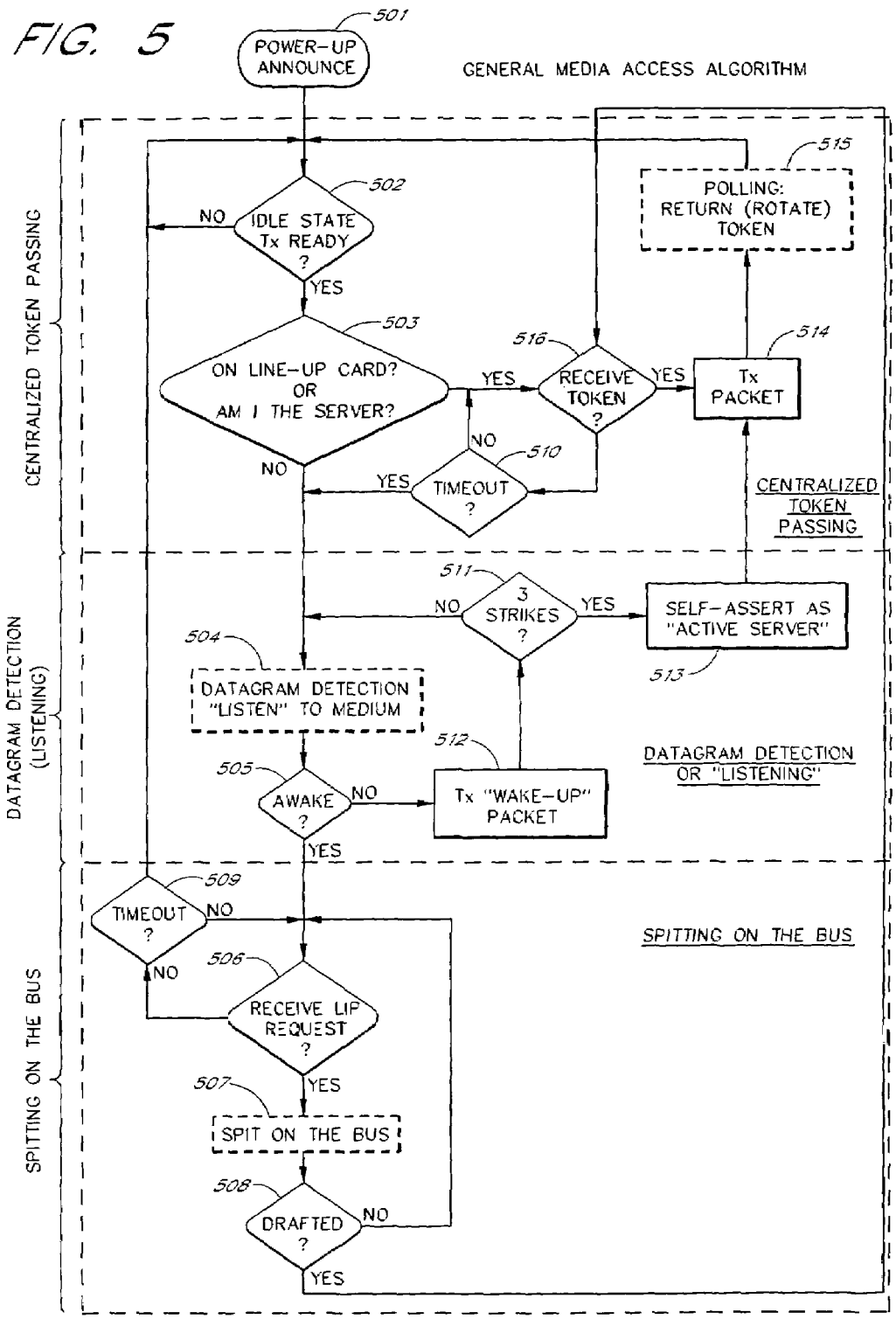

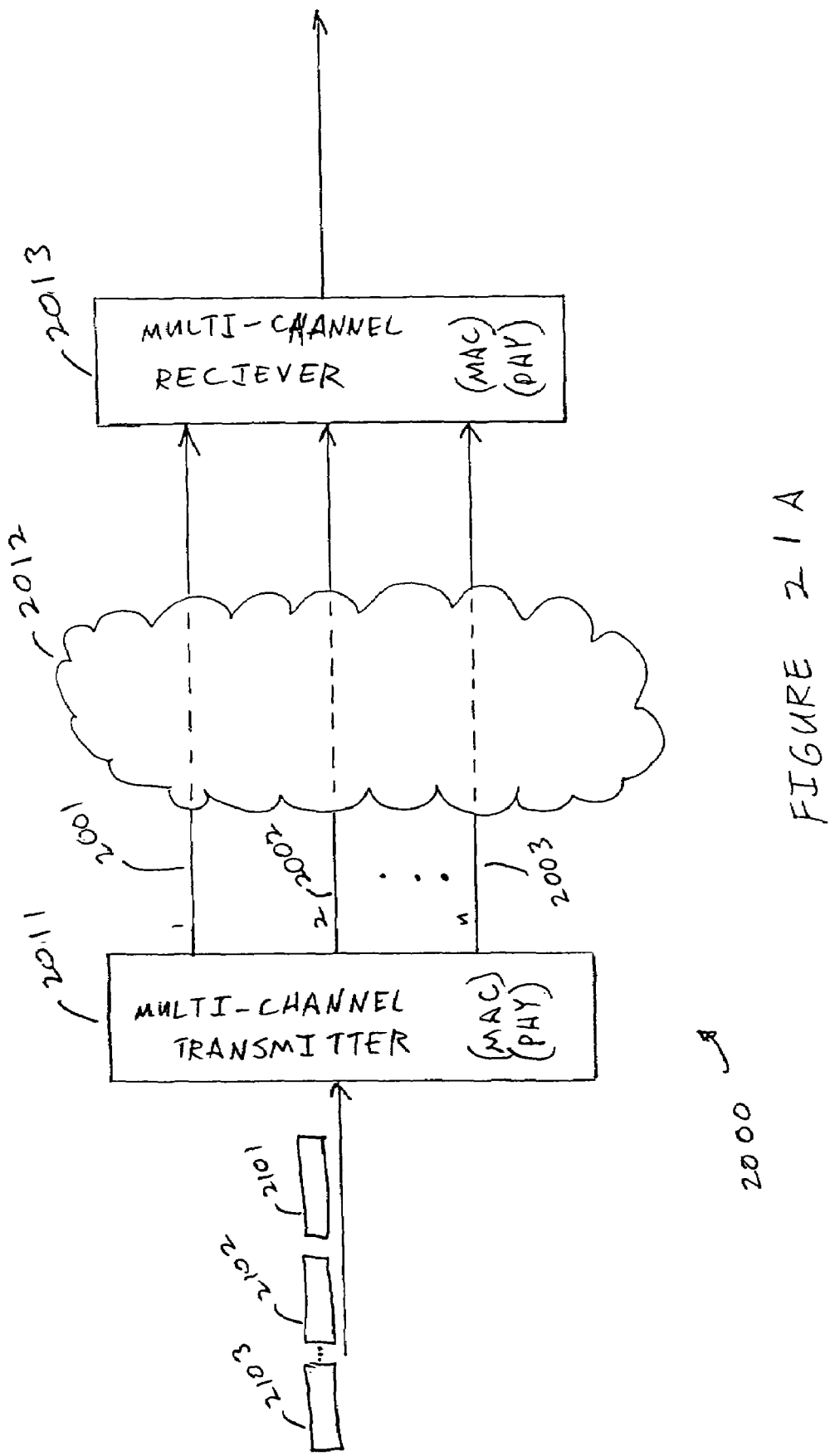

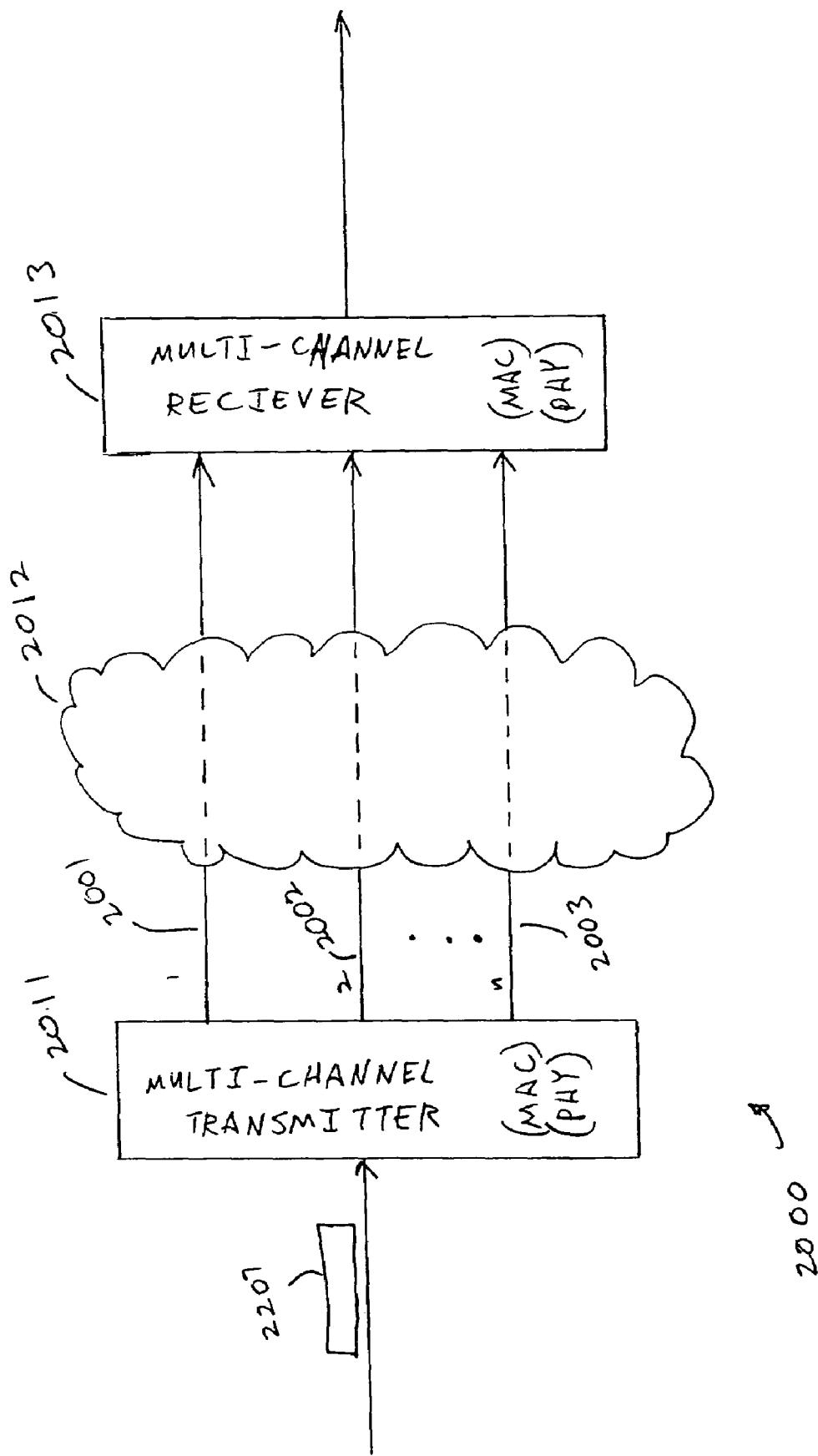

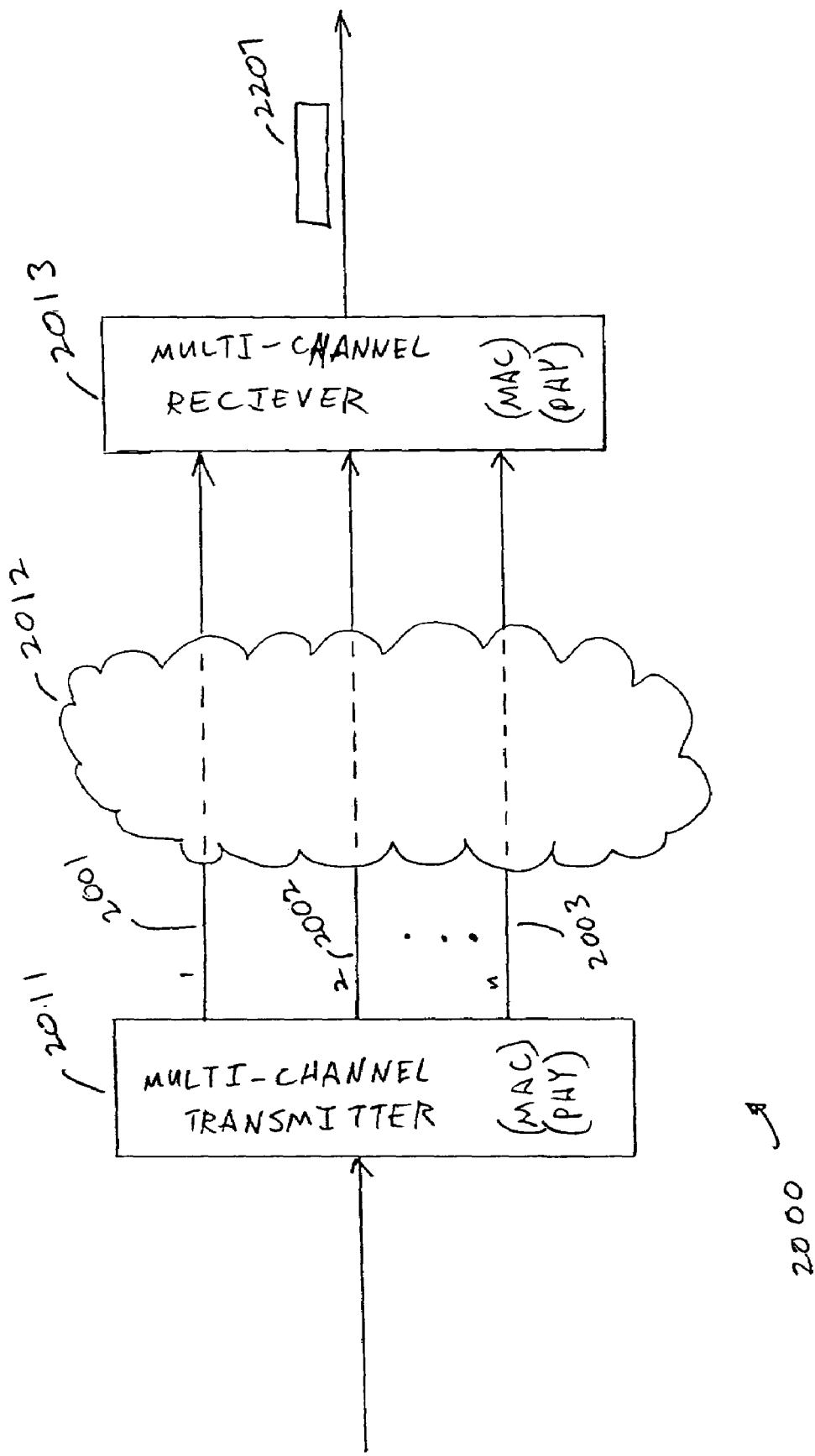
FIGURE 2.2C

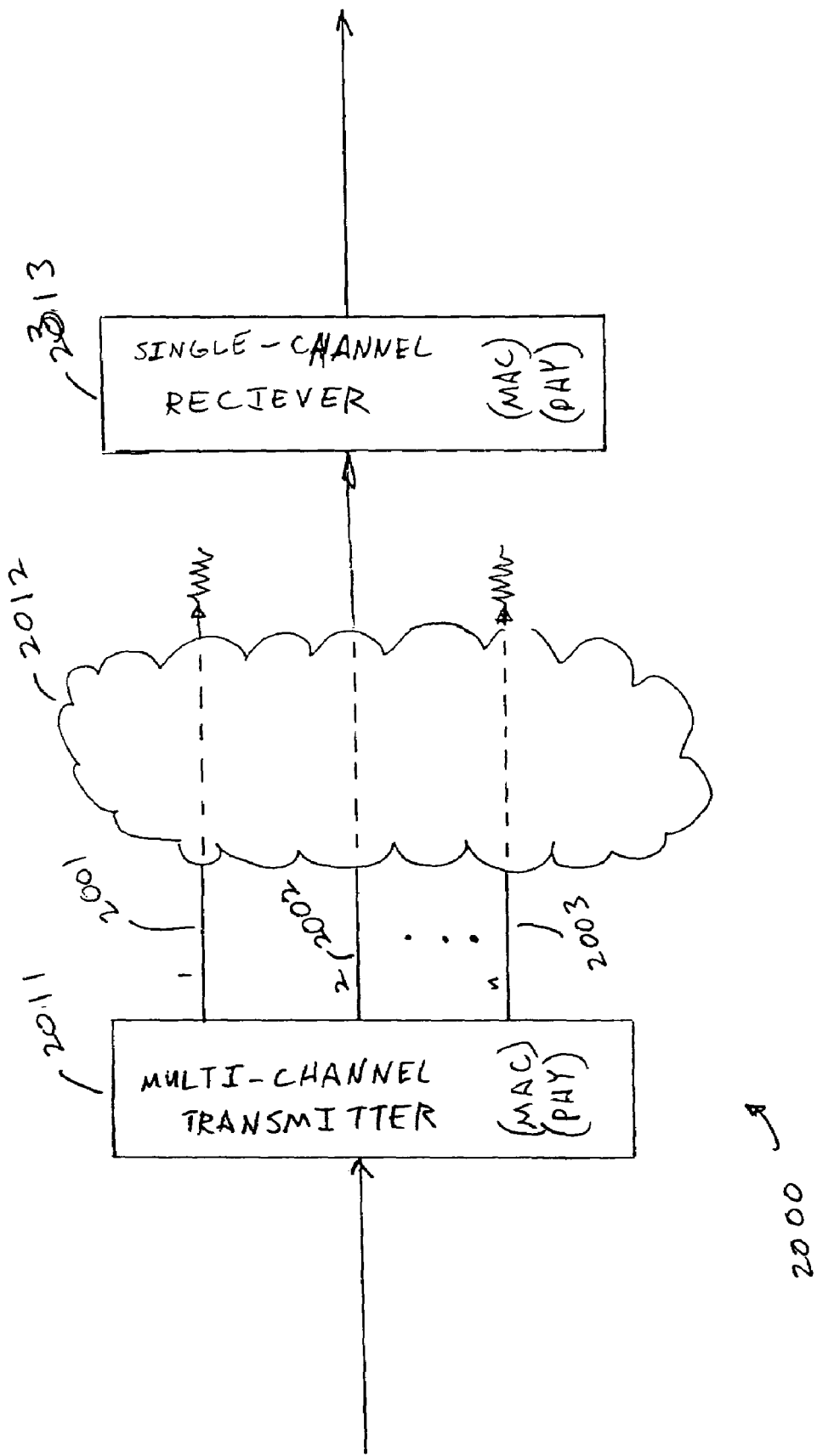

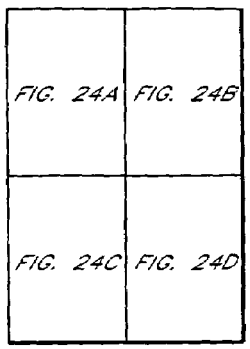
FIG. 24
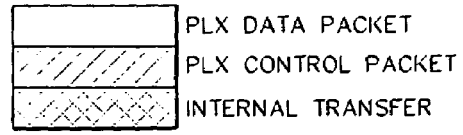
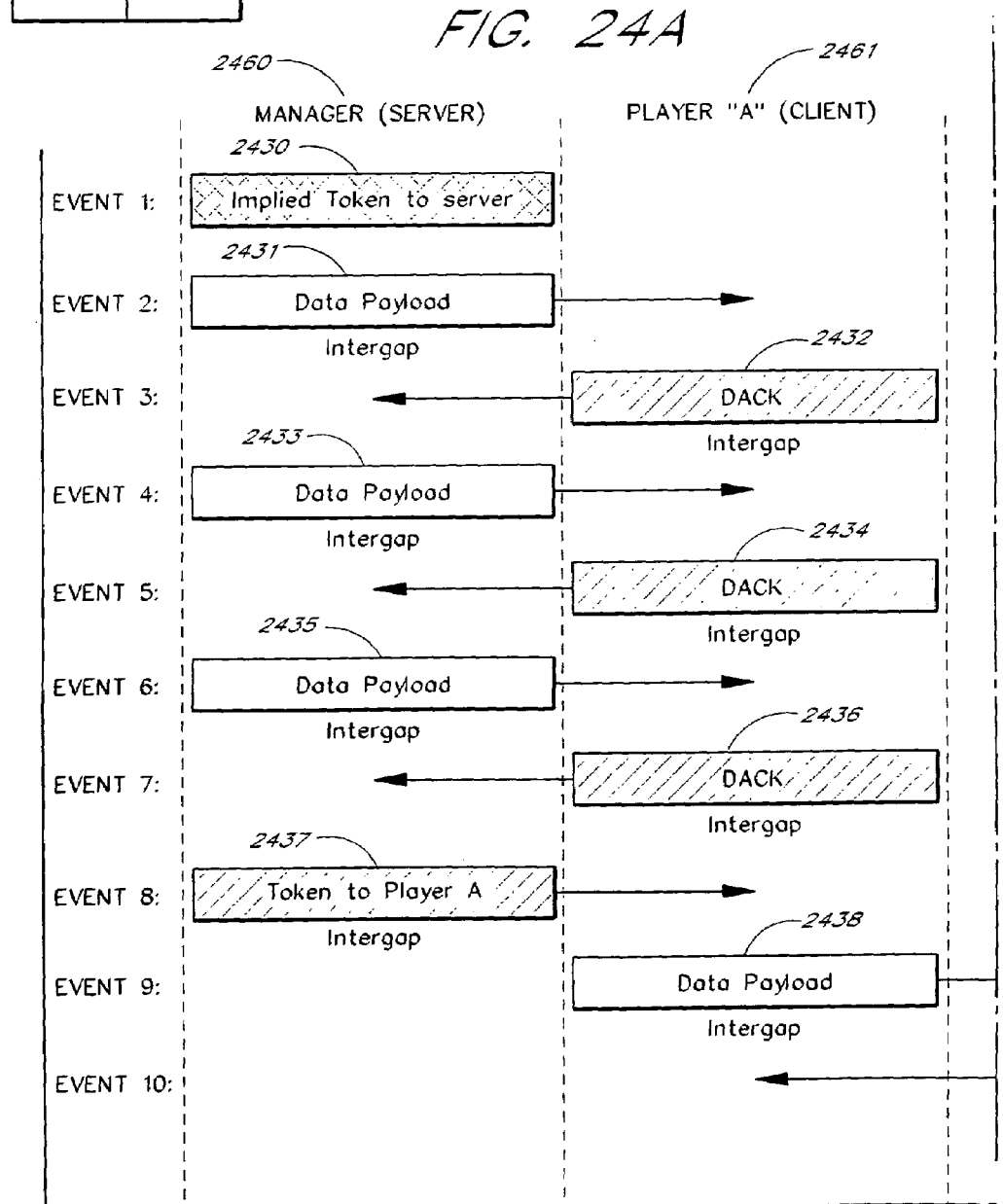
FIG. 24A

*Payload Packet*

*Token Packet*

*DACK Packet*

MULTI-CHANNEL POWER LINE EXCHANGE PROTOCOL

BACKGROUND OF THE INVENTION

1. Field of the Invention

The disclosed invention relates to data network protocols, and more specifically, to protocols adapted to multi-channel and isochronous networking systems.

2. Description of the Related Art

The widespread availability of computers, especially personal computers, has generated a rapid increase in the number of computer networks. Networking two or more computers together allows the computers to share information, file resources, printers, etc. Connecting two or more personal computers and printers together to form a network is, in principle, a simple task. The computers and printers are simply connected together using a cable, and the necessary software is installed onto the computers. In network terminology, the cable is the network medium and the computers and printers are the network nodes. Unfortunately, in practice, creating a computer network is often not quite as simple as it sounds. Typically, a user will encounter both software and hardware problems in attempting to configure a computer network.

Standard network software, such as software based on the Open Systems Interconnection (OSI) model discussed below, is written assuming that each network node is a "smart" device having substantial processing and storage capabilities. A typical PC does have the requisite processing and storage capabilities. However, a typical printer is a "dumb" device and does not have the necessary processing and storage capabilities. Some manufacturers provide network printer adapters that allow a printer to be connected to a network. The printer adapters are single board computers that provide processing and storage capabilities similar to that of a fully configured PC. The network printer adapter thus converts the "dumb" printer into a "smart" device. Although the network printer adapters do work, they are relatively expensive and therefore unsuitable for many home and small office environments. Moreover, the printer adapters are not suitable for connecting other non-PC devices to a network. For example, users often desire to connect dumb devices such as outdoor lights, alarm systems, telephone systems and the like, to their computer networks. Buying a network adapter card to turn each of these dumb devices into a smart device would be prohibitively expensive.

Software problems are not the only problems users encounter when wiring a network. Users also often encounter hardware problems insomuch as it is usually necessary to install a network cable to connect the devices. In a home or office environment, it can be very difficult to install the necessary cabling when the computers are located in different rooms or on different floors. Network systems that use radio or infrared radiation are known, but such systems are subject to interference and government regulation, and thus are far less common than systems that rely on a physical connection such as a wire or cable.

Fortunately, the electrical power lines embedded in the walls of homes and offices provide a ready-made network medium that can be used to carry network data. Unfortunately, as a network medium, the power lines are relatively noisy, and present a difficult challenge to those who would try to use the power lines to send and receive data. The noise causes errors in transmission, lost data, garbled messages, etc.

SUMMARY OF THE INVENTION

The present invention solves these and other problems by providing a low-cost, easy to use, flexible, reliable, and scalable network architecture/protocol that allows multiple smart and dumb nodes to communicate via a common data/control channel or via multiple channels. The network medium can be a power line, radio-frequency link, fiber-optic cable, coaxial cable, twisted pair, etc.

The networking protocol allows any node on the network to assign itself as the active network server. The active network server polls client nodes based on a lineup card. Inactive nodes are automatically removed from the lineup card, thus reducing unnecessary polling traffic. This architecture reduces collisions while preserving bandwidth for actual data transmission. Support for both control and data networking needs is provided by the protocol. Support for streaming data or asynchronous data is provided by allocating time slots on the network and allowing two intelligent nodes to talk directly to each other as arbitrated by the active network server. The active network server can also allocate separate data channels such that large amounts of data traffic can flow independently of the operations of the main network. The network node serving as the active network server can be changed on a dynamic basis, and is typically determined by the first node initiating a transmit request on a sleeping network. Client nodes are addressed by dynamic-polling using an address isolation scheme.

The PLX architecture, which includes the PLX protocol, is well suited to networks that use the existing electrical power wires (power lines) in a building as the network medium. The use of existing power lines to transmit data means that the user does not need to install a network cable.

The PLX architecture provides robust, deterministic, media accessibility for the network nodes. Nodes are addressed by dynamic polling using an address isolation scheme. A viable data channel is provided for use in diagnostics, argument passing, and generic data passing applications.

In one embodiment, the PLX protocol provides globally unique identification codes, node profiles, and 32-bit virtual addressability. This makes the PLX protocol compatible with plug-n-play type networks.

In one embodiment, the PLX architecture provides features such as peering, multiple servers, simple configuration, security, datagram detection, multiple data formats, and prioritization schemes. Error detection, such as CRC and checksums, and data integrity capabilities are part of some embodiments of PLX. The PLX architecture provides for smart nodes and dumb nodes and the architecture provides for data transactions ranging from simple control to complex data streaming.

In one embodiment, PLX is implemented by state machine logic or a micro-controller. A streamlined low-end node (dumb node) can be implemented to use a subset of the full PLX capabilities. Mid-range nodes, such as appliances, fit within the protocol disclosed herein. Higher-end nodes (smart nodes), such as PC's, PBX's, intercom/surveillance systems, printers, mice, and other data-intensive nodes also find applicability within the PLX architecture.

The PLX protocol defines rules of operation for a data link layer, a network layer, and a transport layer. In one embodiment, PLX includes a Media Access Control (MAC) portion of the data link layer. The MAC protocol is the set of rules that govern how and when the physical medium can be accessed by each node. In one embodiment, the MAC protocol uses a dynamic centrally distributed token passing architecture that reduces collisions on the power line.

The PLX architecture allows any node on the network to assign itself as the active network server, which is responsible for arbitrating requests for the token. When nodes are inactive, they go into a "sleep" mode, thus eliminating any unnecessary "polling" traffic. This architecture reduces collisions while preserving precious bandwidth for actual data transmission.

The PLX architecture is, in many respects, a client/server networking architecture that support packets for both control and data networking needs. Support for streaming data or asynchronous data can be supported by allocating time slots on the wire and allowing two intelligent nodes to talk directly to each other as arbitrated by an active network server. The active network server can also allocate separate data channels such that large amounts of data traffic can flow independently of the operations of the main network. The network node serving as the active network server can be changed on a dynamic basis, and is typically determined by the first node initiating a transmit request on a sleeping network. Additionally, the active network server is selected independently of the application server. The application server is typically a fixed node location. The active network server can be any server-capable node.

In one embodiment, PLX provides combined media access capabilities, including a datagram sensing algorithm for initial access onto an inactive (sleeping) network medium, followed by centralized token passing for insertion onto an active network. This effectively couples multiple access with a collision-free, token-passing type environment, with the added benefit of determinism. In one embodiment, PLX uses the presence of a datagram to determine initial media accessibility. The datagram is specifically detected by matching a specified preamble/length sequence combination.

In one embodiment, PLX reduces traffic on the network by using a centralized dynamic polling algorithm that only passes tokens to active nodes on the system. Once a node becomes inactive, the node is removed from the polling list. This selective polling process is based on the ability of nodes to insert themselves into the polling list through a process known as "spitting on the bus."

The spitting process provides real-time, on-the-fly, insertion into the polling list. The spitting process allows multiple node responses to be viewed as a single system response. This system response allows the active server node (the node that is doing the polling) to further isolate the specific node requesting insertion into the polling list.

Real-time, on-the-fly de-insertion from the polling list is provided by an aging process. Inactive nodes are eventually removed (de-inserted) from the polling list if, after a predefined period of time, they do not use the token. In one embodiment, the aging process is further expedited if a node fails to respond to a token request.

In one embodiment, the polling list is set to a fixed size (number of nodes) based on the bandwidth capability of the medium. Nodes carrying lower priority data (such as control data for a lighting system) are removed from the polling list in order to make room on the list for nodes having higher priority data (such as streaming audio/video data).

In one embodiment, the Media Access Control (MAC) layer in the PLX architecture provides a self-throttling mechanism by using a spare receive buffer and BUSY response handshake. In one embodiment, self-throttling is accomplished by providing a MAC header and a receive area large enough to hold a copy of the MAC header in each node. Even if a node is completely swamped with previous packet requests, the swamped node is still capable of responding to a request by producing a BUSY response. The BUSY response informs the transmitting node that it must hold-off on its packet burst or sequence, thus pacing the system according to the capabilities of each receiving node.

A node auto-announce feature upon power-up provides re-synchronization of remote database servers. Upon power-up of a new node, the new node will announce it's newly arrived presence on the medium.

In one embodiment, PLX provides preferred server selection and kick-start algorithms. Since PLX is a client/server type of architecture, a single node is typically selected to arbitrate media access. On a typical power line network, all nodes are not necessarily created equal. Thus, one embodiment of PLX allows a user to select a node that is most centrally located (i.e., near a breaker panel) to act as the preferred "active network server." If the preferred server is inactive, remote nodes can activate the preferred server. A simple wake-up algorithm allows an inactive preferred server to become active again.

Initially, a node acquires the token to access the medium in a client/server model. Once a client node is given the token, it may take over the medium for a specified amount of time. During this time period, it may communicate with any node on the system directly, independent of the server's involvement. At the end of this period, media access control is relinquished back to the server node. Thus media arbitration is done first in a client/server fashion, followed by a peer-to-peer time slot.

In one embodiment, PLX includes a dynamic media arbitration server. The server that arbitrates access to the medium is dynamically assigned based on activity. This dynamic assignment occurs when the first node with a packet to transmit, recognizes that the system is "inactive" and after several attempts to wake-up a preferred server (if one exists), assumes the role of active network server. Any server-capable node on a PLX network can become the active network server.

In one embodiment, the present network protocol provides for sending and receiving streaming data across a power line medium. In one embodiment, the streaming data includes digital voice data. In one embodiment, the streaming data includes digital video data.

In one embodiment, the network protocol is used to provide digital PBX-type functionality and/or digital intercom functionality across a power line medium. The network protocol can be used to extend broadband digital networking services (e.g., DSL, Cable, ISDN, etc.) throughout a home over the existing power lines in the home.

The network protocol can simultaneously handle and manage three or more types of networking traffic: control traffic; data traffic; and streaming data traffic (streaming multimedia data). The network protocol provides prioritization schemes to allow guaranteed access times depending on the networking requirements of a given node (such as a requirement for determinism for voice devices).

In one embodiment, PLX provides data communication over a difficult transport medium, including a transport medium (such as a power line or radio link) that exhibits dynamic noise conditions, unknown noise sources, and impedance characteristics. In one embodiment, PLX provides isochronous communication by providing a high-priority lineup card for nodes that require low latency access and a low-priority lineup card for nodes that can tolerate relatively more latency. In one embodiment, the number of entries on the high-priority lineup card is limited to maintain a desired throughput for real-time data such as multimedia data, including, for example, audio data, video data, and the like.

In one embodiment, PLX provides three basic operating states: 1) an active server selection state; 2) a centralized token passing state; and 3) a lineup insertion state.

In one embodiment, the use of ETS packets provide PLX with lower latency selection from the active server. Self-assertion onto the lineup card is improved by reducing arbitrary recovery wake-up and back-off incidents.

In one embodiment, the PLX system includes the capability to give priority to certain devices, to provide devices with access to the low latency lineup card, to enable dynamic token sessions sizes, and to allow unacknowledged responses (burst mode). In one embodiment, PLX is designed to use a single active server that has the ability to control access to the medium, this control includes: at what intervals nodes may access the medium; how many times a node may access the medium; and for how long a node can use the medium. As devices are inserted into the lineup card, information is exchanged that allows the active server to recognize, understand, and cater to the specific needs of each device or node.

In one embodiment, a PLX token packet includes a packet-count field that tells the node receiving the token how many packets it can send during the token session before it must end the token session. The packet count value is dynamically set by the server and can be changed as often as needed, depending on the characteristics of the system.

In one embodiment, a burst mode allows information to be sent in a timely, repetitive manner, while optimizing throughput. In burst mode, fragments are sent back-to-back without waiting for a response (that is, without waiting for a DACK). In one embodiment, burst mode sessions are terminated by an ETS packet.

In one embodiment, Quality of Service (QoS) is improved by splitting the lineup card into two separate lineup cards. The first lineup card, called the Low Latency Queue (LLQ) card, is a high-priority card used by low latency devices (e.g. audio and video devices). The second card, called the High Latency Queue (HLQ) card, is a low-priority card used by devices that do not require low latency (e.g. printers, computers doing basic file transfers, etc.)

In one embodiment, the PLX system provides for improved for latency by allowing faster insertion in the lineup card—the active server periodically polls the active devices by giving them token for a predefined period of time. Each device (node) returns the token by sending an end of token session ETS packet. The ETS packet tells the server whether the device used the token or not, and it tells the rest of the sleeping devices on the system that they can now insert (transmit a LIP packet) immediately following the ETS packet. The active server provides an Extended Inter-Gap (XIG) space after each ETS. During the XIG the server listens for LIP packets. ETS packets are sent on a relatively frequent basis to reduce contention. In one embodiment, nodes use a random back-off count that tells the node to ignore a specified number of ETS packets before responding to an ETS packet.

In one embodiment, unacknowledged responses for multi-node destined packets are also provided. A broadcast or group address packet can be sent without a DACK response. In one embodiment, multi-node packet are sent at a lower speed and/or replicated across several (or all) of the channels. In one embodiment, broadcasts packets are replicated by increasing the transmit-retry count.

In one embodiment, duplicate fragments support allows a source node to send the same information across all channels in order to provides reliability at the expense of throughput. In one embodiment, duplicated channel acknowledged status (multi-channel DACK) allows DACK information to be sent in response to packet requests. In one embodiment, a multi-channel DACK packet contains channel status information for many channels, the multi-channel DACK packet is duplicated across many channels.

In one embodiment, intelligent transmit retry logic allows the PLX protocol to determine which channels to use to send data. After the data is sent, subsequent DACK information indicates which channels were successful and which channels were bad. Intelligently retry logic maps the fragments from the bad channels to the good channels and also leverages the bad channels by replicating fragment information onto the bad channels (in case the bad channels become functional).

BRIEF DESCRIPTION OF THE DRAWINGS

The advantages and features of the disclosed invention will readily be appreciated by persons skilled in the art from the following detailed description when read in conjunction with the drawings listed below.

FIG. 5 is a flowchart showing the media access algorithm.

FIG. 21, comprising FIGS. 21A-21C, shows transmission of packets over separate channels of the multi-channel medium shown in FIG. 20.

FIG. 22, comprising FIGS. 22A-22C, shows decomposition of a packet into multiple pieces, the pieces are sent over channels of the multi-channel medium shown in FIG. 20 and reassembled into a received packet at the receiver.

FIG. 23 is a block diagram showing a single channel receiver connected to a multi-channel transmitter.

Figure 1:
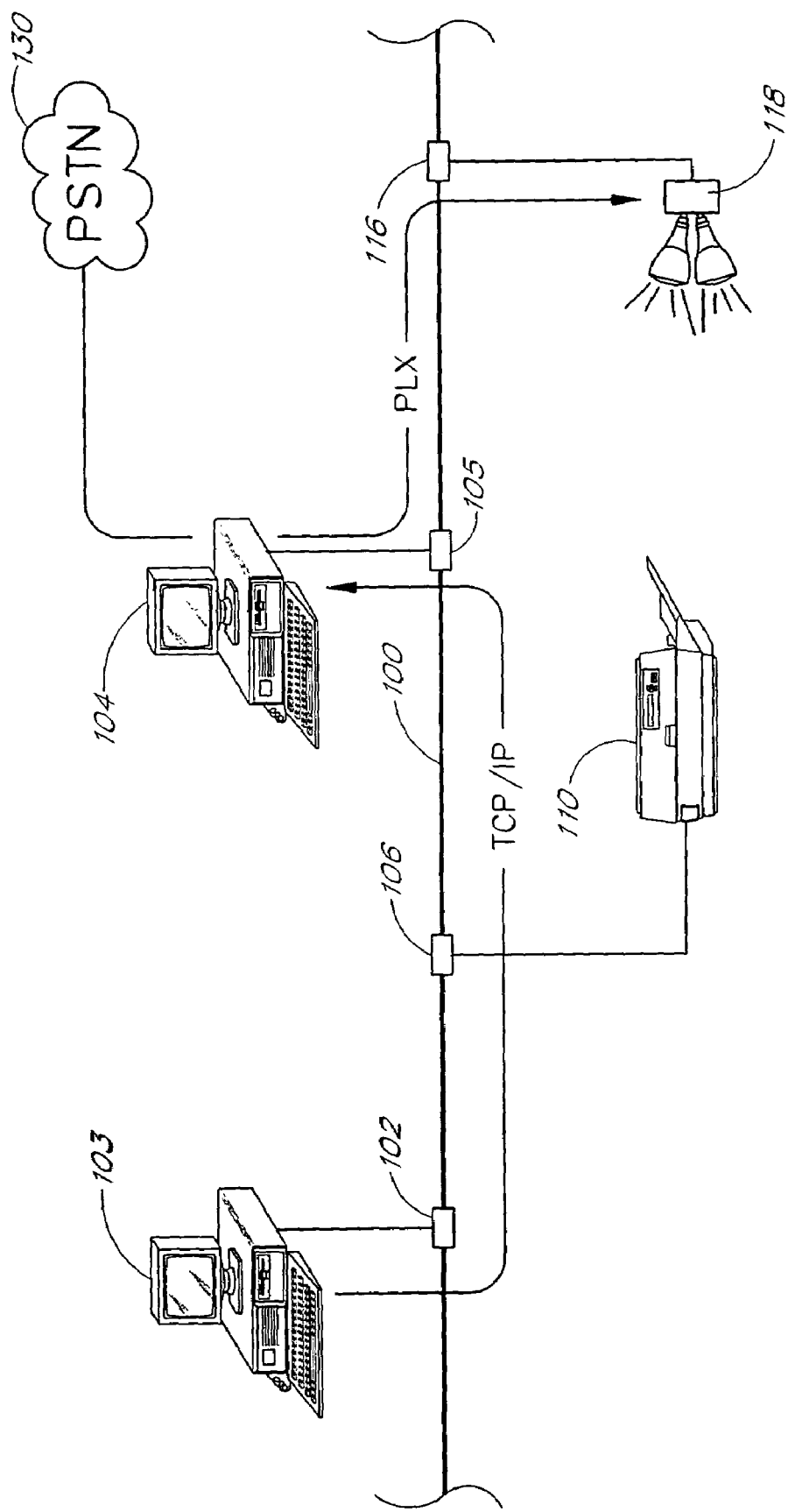
FIG. 1 is a block diagram of a network having smart nodes, such as personal computers, and dumb nodes, such as outside security lights.

In the drawings, the first digit of any three-digit number generally indicates the number of the figure in which the element first appears. Where four-digit reference numbers are used, the first two digits indicate the figure number.

DETAILED DESCRIPTION OF THE PREFERRED EMBODIMENT

FIG. 1 shows a typical computer network having a network medium 100 (shown as a cable). A smart node (shown as a personal computer 103) is connected to the network medium 100 by a connector 102. A printer 110, a computer 104 and a security lighting system 118 are also connected to the network medium 100. The lighting system 118 is an example of a "dumb" node that has relatively little computing power or storage.

Most networks configured for smart nodes (such as the computers 103 and 104) are based on a network architecture model developed by the Open System Interface (OSI) committee. The OSI architecture defines a network model that outlines each individual hardware and software layer within a communication system, the inter-dependencies between layers, and the unique function each layer performs.

Figure 2:
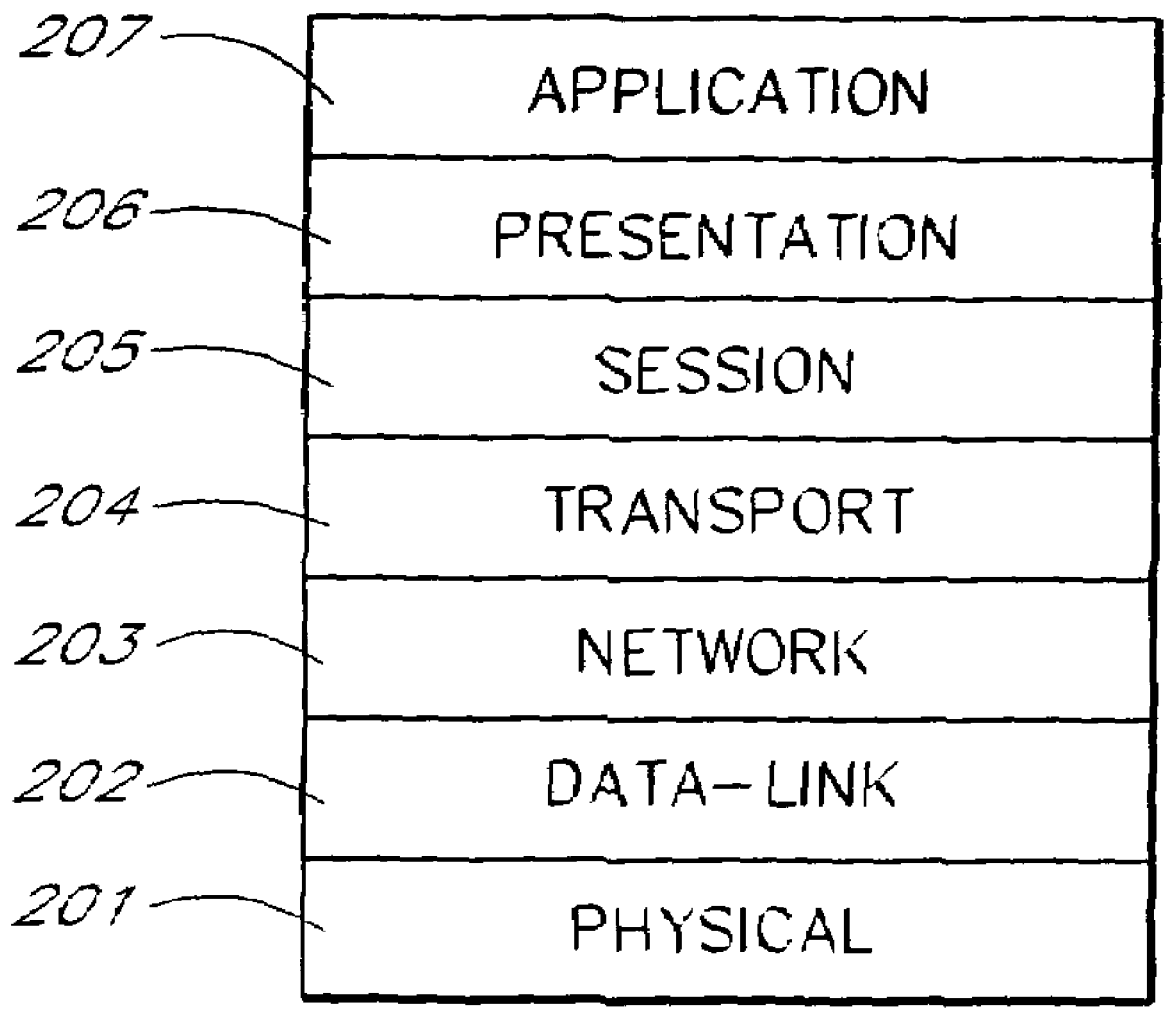
FIG. 2 is a block diagram of the seven-layers OSI network model.

FIG. 2 shows the OSI architecture is split between seven layers, from lowest to highest: a physical layer 201; a data link layer 202; a network layer 203; a transport layer 204; a session layer 205; a presentation layer 206, and an application layer 207. Each layer uses the layer immediately below it and provides a service to the layer immediately above. In some implementations a layer may itself be composed of sub-layers. A layer is the software and/or hardware environment of two or more communications devices or computers in which a particular network protocol operates. A network connection may be thought of as a set of more or less independent protocols, each in a different layer or level. The lowest layer governs direct node-to-node communication between the hardware at different nodes; the highest consists of user application programs. Each layer uses the layer beneath it and provides a service for the layer above. Each networking component hardware or software on one host uses protocols appropriate to its layer to communicate with the corresponding component (its "peer") on another node. Such layered protocols are sometimes known as peer-to-peer protocols.

The advantage of layered protocols lies in the fact that the methods for passing information from one layer to another are specified clearly as part of the protocol suite, and changes within one protocol layer are prevented from affecting the other protocol layers. This simplifies the task of designing and maintaining communication systems.

The physical layer 201 is the lowest layer in the OSI layered model. It concerns electrical and mechanical connections of the network, including Media Access Control (MAC). Media Access Control refers to control, and access to, the data transmission medium 100 (e.g., the network cable). The physical layer 201 is used by the data link layer 202.

The data link layer 202 is the second lowest layer in the OSI model. The data link layer 202 splits data into frames for sending on the physical layer 201 and receives acknowledgement frames. The data link layer 202 performs error checking and re-transmits frames not received correctly. The data link layer 202 provides an error-free virtual channel to the network layer 203. The data link layer 202 is typically split into an upper sublayer, Logical Link Control (LLC), and a lower sublayer, Media Access Control (MAC).

The network layer 203 is the third lowest layer in the OSI seven layer model. The network layer 203 determines routing of packets of data from sender to receiver via the data link layer 202 and is used by the transport layer 204. The most common network layer protocol is IP.

The transport layer 204 (or "host-host layer") is the middle layer in the OSI model. The transport layer 204 determines how to use the network layer 203 to provide a virtual error-free, point-to-point connection so that a first node can send messages to a second node and the messages will arrive uncorrupted and in the correct order. The transport layer 204 establishes and dissolves connections between nodes.

The session layer 205 is the third highest protocol layer in the OSI model. The session layer 205 uses the transport layer 204 to establish a connection between processes on different nodes. The session layer 205 handles security and creation of the session.

The presentation layer 206 is the second highest layer in the OSI model. The presentation layer 206 performs functions such as text compression, code or format conversion to try to smooth out differences between nodes. The presentation layer 206 allows incompatible processes in the application layer to communicate via the session layer.

The application layer 207 is the top layer of the OSI model. The application layer 207 is concerned with the user's view of the network (e.g. formatting electronic mail messages). The presentation layer 206 provides the application layer 207 with a familiar local representation of data independent of the format used on the network. Examples of application layer protocols include: Telnet, File Transfer Protocol (FTP), Simple Network Management Protocol (SNMP), Simple Mail Transfer Protocol (SMTP), Internet Control Message Protocol (ICMP), NetWare Core Protocol (NCP), Routing Information Protocol (RIP), Service Advertising Protocol (SAP), Trivial File Transfer Protocol (TFTP), and System Fault Tolerance Protocol (SFTP).

Of the seven layers in the OSI model, the session layer 205 and presentation layer 206 have relatively less relevance to the PLX protocol than the other five layers.

The PLX OSI Model

Figure 3:
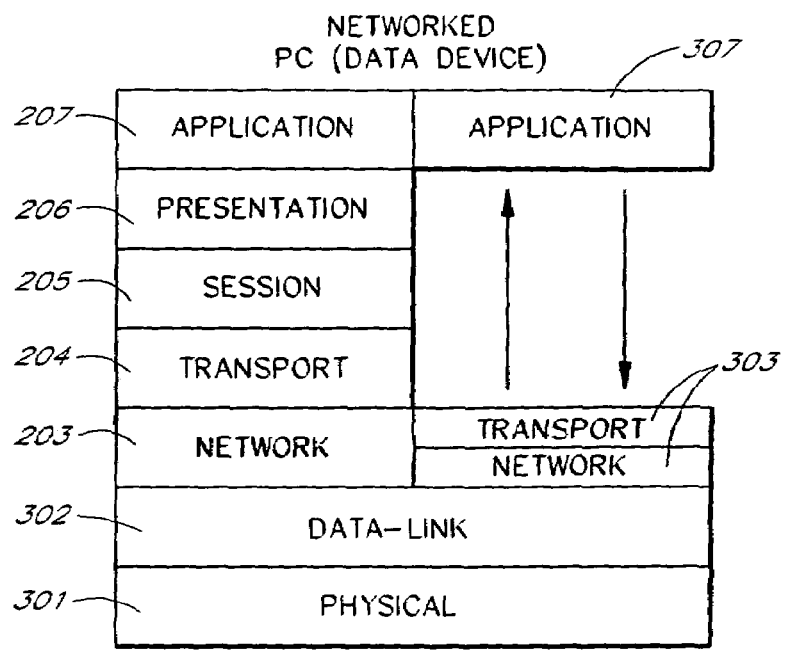
FIG. 3 is a block diagram of a PLX network model for a smart device.
Figure 4:
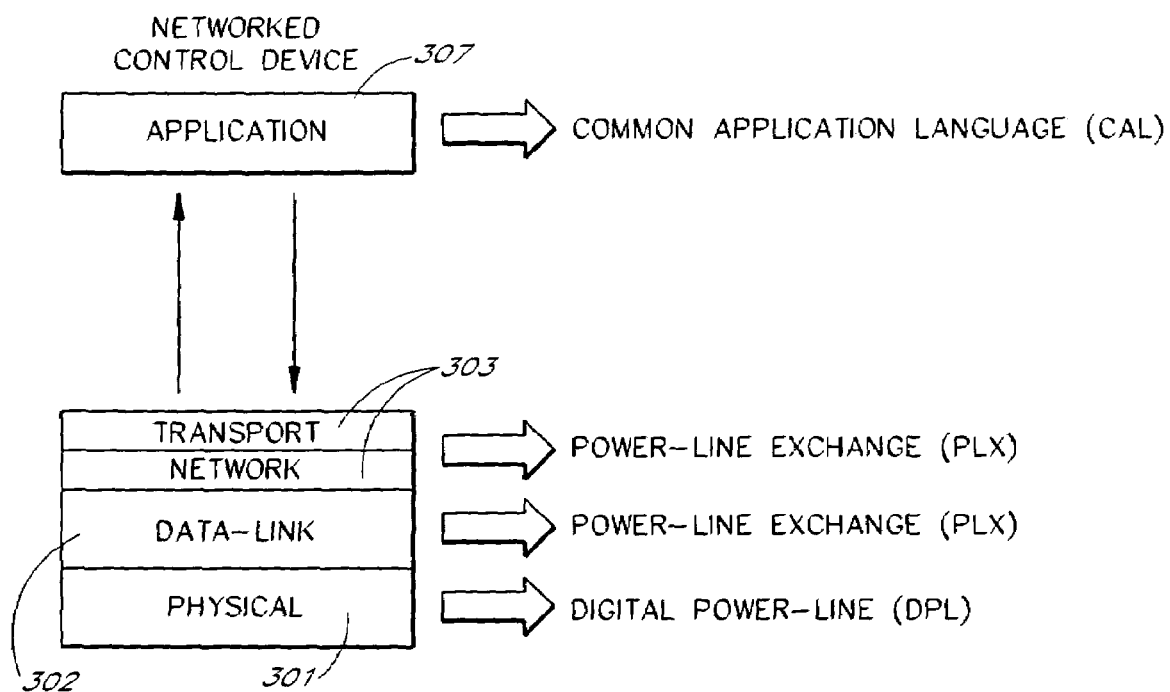
FIG. 4 is a block diagram of a PLX network model for a dumb device.

Each of the top five OSI layers 203-207 adds significant overhead to a network application. As shown in FIG. 3, PLX uses a relatively thin application layer 307, called the Common Application Language (CAL) and a relatively thin transport/network layer 303 to complement the underlying data-link layer 302 and physical layer 301. Each of the layers 301-303 and 307 are typically present in PLX compliant nodes. As shown in FIG. 3, PLX data networking nodes (smart nodes) may also include conventional OSI network capabilities (e.g., TCP/IP, IPX, Windows, NetWare, etc.) in the application layer 207, the network layer 203 and the transport layer 204. PLX compliant nodes typically contain a reduced amount of control information, which is passed between PLX nodes using only the PLX stack, as embodied in the layers 301-303 and 307.

The PLX Physical Layer

The PLX physical layer 301 handles the hardware details of physically interfacing with the network hardware, the network cable, and, typically, includes the actual hardware itself. The physical layer includes such attributes as modulation technique, frequencies used, power output, etc. In one embodiment, PLX uses Digital Power-Line (DPL) technology as described below.

The PLX Data-Link Layer

The PLX data-link layer 302 handles the details of interfacing with the medium 100, such as addressing capabilities, media arbitration schemes, inter-gap spacing, back-off algorithms, and so forth. The data-link layer 302 typically includes a header that contains source/destination addresses, lengths and error detection/correction data such as Cyclic Redundancy Check (CRC) or checksum data.

The PLX Network Layer

The network/transport layer 303, sometimes called the internet layer, is responsible for routing packets of data from one place to another on the network. Within PLX, the network layer 303 is typically handled using system, individual node, socket, and network address fields within a MAC header field.

The PLX Transport Layer

The PLX network/transport layer 303 provides a flow of data between two hosts for the application layer 307 that resides above it. The transport layer 303 also contains sequence numbers and/or request/response type acknowledgment information. Within PLX, the transport layer 303 is scaled down and streamlined, as compared to the OSI transport layer 203, to allow for control applications. The transport layer 303 provides request/response hand-shaking algorithms, retry algorithms, timeout algorithms, and the like. PLX implements the network/transport layer 303 almost entirely within a control field of a MAC header.

The PLX Application Layer

The PLX application layer 307 handles the details of the application and depending upon which transport is being used, the application layer 307 can use a hand-shaking protocol and/or a request/response protocol to ensure packet delivery. A considerable amount of duplication of fields exist within the protocols of the OSI layers. This duplication translates into more overhead, uses more space, and requires additional processing power. In the PLX protocol, many of the OSI fields are not needed and are typically omitted.

Examination of the various components included in the various OSI protocols reveals that, the data-link layer 302 can do much of the filtering without the upper three layers. This filtering is beneficial, because the data-link layer 302 is often typically confined to hardware logic that also takes care of hardware issues, such as multiple nodes contending for the same communication channel (e.g., multiple network cards contending for the same network wire).

In one embodiment, the network hardware for a specific network node filters everything except for the data packets destined for that specific network node. Under such a system, node need only parse the data portion of a data packet.

Two Protocols for DPL

Two protocols are preferably defined by PLX for use on a Digital Power Line (DPL); a low-level protocol and a high-level protocol.

Low-level Protocol Definition.

The low-level protocol provides a definition of the data-link layer 302 and how packets are filtered, sent, and received from the same medium 100 with relatively few networking and transport functions.

High-level Protocol Definition.

PLX nodes contain a reduced amount of control information. Each PLX node uses a common application layer 307 for controlling the particular node attributes. This allows the PLX system to be characterized regardless of node types. The application layer 307 deciphers or parses the control information after the hardware header is stripped off.

The Physical Layer: Digital Power-Line (DPL) Specification

The PLX protocol is a versatile protocol that can be used with many types of network media (i.e. data transmission systems) including optical transmission, fiber-optic transmission, radio-frequency transmission systems, twisted-pair transmission systems, coaxial transmission systems, satellite systems, digital power line (DPL) systems, etc.

DPL systems, also known as power-line carrier systems, use the power supply wiring (e.g., the standard 110 Volt Alternating Current (VAC) circuits in a building) to carry digital data. In one embodiment, the PLX protocol is used in connection with a DPL having a single low-speed channel (350-1000 kbps), a low-speed carrier frequency at approximately 5.6 MHz, approximately 80 dB dynamic range or better, low bandwidth usage (dependent on speed, but around one MHz).

In one embodiment, the PLX protocol is used in connection with a DPL having multiple high-speed channels (totaling 4-8 mbps), high-speed carrier frequencies up to 30 MHz or more, and approximately 80 dB dynamic range or better.

On a typical DPL system, the transmit carrier is typically enabled at least 20 microseconds before data and the time between disabling the transmitter, until the receiver detects no carrier, can be 15 microseconds or longer The Low-Level Protocol Layer: The PLX Specification The PLX protocol is scalable for applications ranging from simple control to complex data-streaming networks. In one embodiment, the PLX protocol is adapted to leverage most of the features of the Generic CAL specification. CEBus, defined in EIA-600, is an industry standard control language for controlling bus devices. EIA-600 provides a skeleton for a Common Application Language for use within home LANs. Generic CAL is defined in the EIA-721 series of standards (including EIA-721.1, EIA-721.2, EIA-721.3, and EIA-721.4). The CEBus Industry Council (CIC) has defined a Home Plug & Play (HPP) specification that fleshes out that skeleton by defining the "grammatical" rules for using the language.

The HPP specification details a set of behavioral characteristics for products and systems within the home that will allow them to take actions based upon the state of the home. For example the specification identifies different conditions within the home such as "occupants away" or "occupants home and asleep" to allow home systems to take appropriate action like arming the security system, shutting off interior lights, or setting the temperature. The HPP specification also includes information for developing i 95 PC-based applications for home control.

The Common Application Language defined within EIA-600 provides a framework for communication among home LAN products produced within divergent industry sectors (e.g., entertainment, computers, heating/cooling, kitchen appliances, etc.).

Each industry sector defines the "application contexts" (i.e., grammatical rules) under which its products will use the language. The CIC was created to serve as the support organization that helps divergent industry sectors develop "harmonious" application contexts. CIC's HPP is a compendium of harmonious application contexts for those industry sectors pursuing the home LAN market with CAL based interoperable products.

The CEBus/Generic CAL specification is hereby incorporated by reference in its entirety.

Media Access Overview

PLX can be characterized as a Datagram Sensing Multiple Access protocol with a Centralized Token-Passing scheme, or DSMA/CTP. Because multiple peers are allowed to access the same physical medium 100, PLX sets forth a common set of rules for each node to use when attempting to place data on the medium 100.

PLX integrates several features from a diverse number of protocols to create a single, efficient, deterministic environment. PLX provides datagram detection. Each PLX node can "sense" the medium 100 for traffic, and assert itself if the medium 100 is currently dormant. Collision avoidance is provided via an organized token passing-type mechanism. PLX includes a method for selecting a single, central, arbitration node to handle access to the medium. The central node (active server) is responsible for ensuring a token is present on an active system. PLX uses selective dynamic polling to provide simplicity of design, ease of implementation, collision-free access, systematic acceptance and subsequent relinquishment of the token, and an acknowledgement sequence for reliable delivery of data (request/response).

PLX provides an ability to have a "quiet" medium 100 when the nodes are "inactive". Typically, in PLX, only "active" nodes communicate on the medium 100. PLX also provides a global addressing scheme for plug-n-play ability, and an algorithm to isolate multi-node contention for the medium 100.

PLX also provides time determinism, or guaranteed time slots, for streaming applications, and reduced cell lengths (packet lengths) for quick turn-around times.

PLX provides multirate support, hot swapping, authentication and security, control and management packets.

Additionally, PLX provides many control networking features in the higher-layer protocols. As a result, the media access methodology has been highly polished utilizing many advantageous features of various topologies.

Media Access Methodology

The media access methodology outlines the rules involved in gaining access to the medium 100. The PLX method for gaining access to the medium 100 typically involves three events;
 1. Datagram Detection or "Listening";
 2. Spitting on the Bus; and
 3. Centralized Token Passing.

Nodes are characterized with respect to the token present on the system as either the active network server node or as a client node. On a PLX system, initial access to the medium 100 is done by listening for activity, then self-assertion as the active network server, and finally systematic, centralized token-passing by the active network server.

FIG. 5 is a flowchart that shows the media access algorithm used by PLX to arbitrate which node is allowed to "talk" on the medium 100. The flowchart in FIG. 5 begins with a power-up and announce process block 501, wherein each node, upon power-up, announced its presence on the medium 100. Upon completion of the announce, the process advances to a decision block 502. The node loops (idles) in the decision block 502 until a transmit (Tx) ready command is received, whereupon, the process advances to a decision block 503. If, in the decision block 503, the node is not on the lineup card or is the active server, the process advances to a datagram detection block 504; otherwise, the process advances to a decision block 516. In the decision block 516, if the node has received the token, then the process advances to a transmit packet block 514; otherwise, the process advances to a timeout decision block 510. In the decision block 510, if a timeout has not occurred, then the process returns to the decision block 516; otherwise, the process advances to the datagram detection block 504. In the transmit packet block 514, the process sends a transmit packet and advances to a polling block 515. In the polling block 515, the active network server polls the active nodes, as described in connection with FIG. 7, or returns if the node is a client. Upon completion of the polling block 515, the process advances to the decision block 502.

In the datagram detection block 504, the node listens to the medium 100 for a specified time period and then advance to a decision block 505. If the medium was awake during the listening period of the process block 504, then the process advances to a LIP request decision block 506; otherwise, the process advances to a process block 512. In the process block 512, the node sends a "wake-up" packet and advances to a decision block 514. In the decision block 514, if three wake-up packets have been sent without obtaining a response, then the process advances to a self-assert block 513; otherwise, the process returns to the datagram detection block 504. In the self-assert block 513, the node asserts itself as the active server node and the process advances to the transmit packet block 514.

In the LIP request decision block 506, the process checks for the presence of a LIP request. If no LIP request is present, the process advances to a timeout decision block 509, otherwise, the process advances to a process block 507. In the timeout decision block 509, the process checks to see if a specified packet timeout period has elapsed. If the period has elapsed, then the process returns to the decision block 502; otherwise, the process returns to the LIP request decision block 506.

In the process block 507, the node spits on the bus and then advances to a decision block 508. In the decision block 508, the process checks to see if the node has been drafted. If the node is drafted, then the process returns to the receive token decision block 516; otherwise, the process returns to the LIP request decision block 506.

The blocks 502, 503, 510, and 514-516, are part of a centralized token passing algorithm. The blocks 504, 505, and 511-513, are part of a datagram detection (listening) algorithm. The blocks 506-509 are part of a spitting on the bus algorithm.

As shown in FIG. 5, initial access to the medium 100 is accomplished in one of two different ways depending on whether the medium 100 is "sleeping" or "awake." If the medium 100 is sleeping, a node desiring access will self-assert itself as the active server. If the medium 100 is active (that is, being used by an active network server), then a client node desiring access will ask the active network server for access. The active network server maintains a lineup card of client nodes that have requested access. A client node asks to be placed on the lineup card through a process known as "spitting on the bus".

Typically, any server-capable node can assert itself as the active network server, however, it is not a requirement to contain server-capable attributes within a given node.

Once an active network server is selected, it must be capable of creating and maintaining a "lineup card" which contains a list of active nodes to be polled. When all of the active nodes have become inactive (through an aging process), the active network server relinquishes its current status as the active server and the medium 100 becomes dormant (sleeps) again. Typically the active network server is self-appointed by a node which has something to transmit onto the medium 100.

Active nodes are removed from the lineup card when the node has been silent for a period of time. Active nodes are also removed from the lineup card when a node with higher-priority data needs access to the lineup card. The lineup card typically has a maximum number of slots. In other words, the lineup card has a maximum number of nodes that can be entered on the lineup card. The number of slots is usually determined by the bandwidth available on the medium 100 and the bandwidth needed by the various network nodes. If N is the maximum number of slots in the lineup card, and t is the maximum amount of time (in milliseconds) that a particular active node is allowed to keep the token, then an active node will get the token at least approximately once every N*t milliseconds. Thus the lineup card provides determinism, in that an active node will get polled on a regular, predictable, basis.

For example, streaming video data has a higher priority than streaming audio. Thus, if N streaming video nodes are already entered on the lineup card, a streaming audio node requesting entry onto the lineup card will be refused. The streaming audio node will, however, be given the token each time it requests entry onto the lineup card. This illustrates one of the attributes of the lineup card. Nodes that are listed on the lineup card are automatically polled, and will thus get the token on a regular basis without having to ask for the token. Nodes that are not listed on the lineup card receive the token only after making a request for the token or a request to be placed on the lineup card.

The priority of the data provided by a particular network node is determined by the network_class field described in connection with the Node Profile Object described below. The network_class for a particular node is also found in the highest four bits (the device_type field) of the node address.

Node Semaphores

Each PLX node manages two local semaphores that reflect the current state of the system, and the node's involvement within the system. These semaphores help nodes determine whether or not the listening process needs to be initiated. Typically, nodes manage these two semaphores, since they are used to gain access to the medium 100 (when the node has something to transmit).

The first semaphore reflects the "system state." The system state is either "awake" or "asleep", depending upon whether or not the medium 100 is active (i.e., packets are seen on the medium 100).

The second semaphore is termed the "local node state." The local node state reflects one of three possible states for a node, as follows: (1) the node is an active network server node; (2) the node is an active client node, or (3) the node is an inactive client node. The local node state determines whether a node should initiate the listening algorithm, whether the node is currently on the lineup card (being polled), or whether the node is currently the active server.

The "System State" Semaphore

Each node makes individual decisions on whether the system is awake or asleep. This decision is based on the presence of Lineup Insertion request Packets (LIP) on the medium 100. When a node sees a LIP packet, the system state semaphore becomes awake. If after a period of time, LIP packets are not seen, the node toggles the system state to asleep. This means, if an active network server exists, it should periodically transmit LIP packets to keep client nodes awake.

A node uses this semaphore to determine whether or not it must listen to the medium 100. Only when the system state is asleep will a node need to contend for the medium 100 through a listening process.

The "Local Node State" Semaphore

The active network server will continue to distribute tokens (poll) a client node currently on its lineup card for one to ten seconds after the last transmission by the client inode. At this point in time, the active network server determines that the node is through transmitting and "ages" the client node off of the lineup card. The client node must be capable of detecting this. When the client node is currently receiving tokens, it is deemed active. When the client node is not currently receiving tokens, it is deemed inactive. An inactive client can only transmit onto the medium 100 after being inserted into the lineup card by the active network server, through a process termed "spitting on the bus." Listed below in Table 1 are the possible node semaphore states and what each state means in terms of transmitting on the medium:

TABLE 1

Next action for a node with a new transmit ready.

| System State | Node State | Next Transmit Action |
| --- | --- | --- |
| AWAKE | ACTIVE | On the Lineup Card: Wait for Token |
| AWAKE | INACTIVE | Off the Lineup Card: Spit on the Bus |
| ASLEEP | ACTIVE | Bad state: Listen, then assert as server |
| ASLEEP | INACTIVE | Listen, then assert as server |

Datagram Detection or "Listening"

The system state semaphore discussed above, is the primary factor in determining whether a node should begin listening or not. It is also the primary factor in determining whether or not the node should assert itself as the active network server or whether it would take a submissive role as a client. Typically, listening is only performed prior to initial transmission onto a sleeping system. If any node is transmitting on the medium 100, an active network server has already been selected to send LIP packets and to arbitrate token distribution, and the system is awake. The node should act as a client if the system is awake.

When a node determines that it has a packet ready to be sent onto the medium 100, and the system state semaphore is asleep, the node goes through a listening process to determine its next step and to minimize collisions during this initial process. This should be the only period of time on a PLX network that two nodes could contend for the medium 100, and possible unseen collisions could occur. Thus, a robust back-off algorithm is provided.

There are two possible cases to address in listening: (1) The node was just powered on and needs to transmit its "announce" or "CAL-ping" packet to announce its addition to the current system; or (2) the node was inactive and is trying to wake-up the system. In either case, if a server is detected while listening, the node should immediately begin searching for a LIP packet. A LIP packet will enable the node to insert onto the active network servers lineup card, and subsequent token passing and node transmissions.

Initial "Listen/Ping" Announcement

As soon as a node is powered up, it announces its presence on the system by transmitting a broadcast CAL-ping packet. This allows the auto-discovery mechanism to be more robust, by "pushing" the information instead of always trying to "pull" it. Since the node that was just powered on, has no history regarding the system, its listening algorithm is slightly different than a normal wake-up process.

The initial listen could take as long as 500 ms before broadcasting a CAL-ping packet. This is done by actually listening for traffic for a defined period of time, then randomly during that time period, transmitting a broadcast wake-up packet three times to allow a preferred server the opportunity to poll this node if it exists. This sequence is repeated three times, at the end of which, a CAL-ping packet is broadcast to all nodes signifying successful entry onto the system. The sequence for the listen/ping process is given in pseudo-code as follows:

1)
  a) listen to the medium 100 for a random amount of time less that 125 ms (look for a LIP packet).
  b) Transmit a broadcast wake-up packet three times with 300 us inter-gap spacing.
  c) Continue listening to complete a full 125 ms time period.
2)
  a) listen to the medium 100 for a random amount of time less than 125 ms (look for a LIP packet).
  b) Transmit a broadcast wake-up packet three times with 300 us inter-gap spacing.
  c) Continue listening to complete a full 125 ms time period.
3)
  a) "listen" to the medium 100 for a random amount of time less than 125 ms (look for a LIP packet).
  b) Transmit a broadcast wake-up packet three times with 300 us inter-gap spacing.
  c) Continue "listening" to complete a full 125 ms time period.
4) Assert as the active network server and transmit a broadcast "CAL-ping" packet to signify presence.
5) De-assert as the active network server.

The above listen/ping process takes place once after the node is powered up, and therefore the latency time that this process takes is typically not significant. The run-time wake-up process, described below, is executed more often and thus desirably has a smaller latency time.

The Run-time "Listen/Wake-up" Sequence

Once a node has powered up and announced its presence on the system, it begins to operate in a run-time mode. If, during its run-time mode of operation, a node needs to transmit a packet onto a sleeping system, it goes through a similar sequence of events to try and wake-up a preferred server. If a preferred server does not exist, and no active network servers are present, then the node asserts itself as the active network server and begins polling client nodes. A pseudo-code listing for the listen/wake-up algorithm is given below. In addition to the algorithm given below, for quicker response times, the node can alternatively monitor the medium 100 and use the local node semaphores to reflect the system state. The local node semaphores are used in connection with a wake-up packet to further reduce latency associated with this process.

1) a) Listen to the medium 100 for a random amount of time, typically less than 125 ms (look for a LIP packet).
   b) Transmit a broadcast wake-up packet three times with 300 us inter-gap spacing.
   c) Continue "listening" to complete a full 125 ms time period.
2) a) Listen to the medium 100 for a random amount of time, typically less than 125 ms (look for a LIP packet).
   b) Transmit a broadcast wake-up packet three times with 300 us inter-gap spacing.
   c) Continue listening to complete a full 125 ms time period.
3) a) Listen to the medium 100 for a random amount of time, typically less than 125 ms (look for a LIP packet).
   b) Transmit a broadcast wake-up packet three times with 300 us inter-gap spacing.
   c) Continue listening to complete a full 125 ms time period.
4) Assert as active network server and transmit next packet accordingly.
5) De-assert as the active network server.

Spitting on the Bus

The "spitting" process takes place when a node on the system has a packet ready for transmission, and the system is awake (an active network server exists and is currently distributing tokens). The active network server is the only node authorized to permit access onto the medium 100. The active network server's lineup card is the mechanism whereby inactive client nodes can gain access to the medium 100. The nodes spit to get into the active network server's lineup card.

During typical run-time operation, the network will appear in one of two states: either sleep or awake. The spitting process is slightly different depending on which state the network is currently in.

Sleep and Awake States

The network goes into a sleep state when the active network server determines that there are no nodes currently requiring service (packet to transmit), and as a result, stops transmitting tokens. Prior to signing off the network, the active network server sends a series of masked Group LIP (LIPG) request packets for a specified period of time. If the series of LIPG request packets elicits no responses from any of the client nodes, the active network server becomes inactive, and the network goes into a sleep state. Subsequent entry onto the network by nodes requesting to transmit, is then accomplished through the normal contention handling, listening algorithm described above.

The awake state symbolizes nodes on the designated network that are actively exchanging information with one or more remote nodes. In the awake state, media access is controlled by the active network server and its lineup card. Collisions are reduced by using a token-passing scheme for nodes currently on the lineup card and through spitting for nodes attempting to get onto the lineup card.

The "Spitting on the Bus" Sequence

The sequence for spitting on the bus allows the active network server to periodically transmit a LIPG packet. Sleeping client nodes are allowed to respond to the LIPG packet. Once a response is seen, the active network server transmits an unmasked LIPD request to all nodes, hoping for a single response with the address of the node desiring the token. If more than one node is contending for the token, the response will not be seen, and the active network server goes into a node isolation sequence.

Figure 6A:
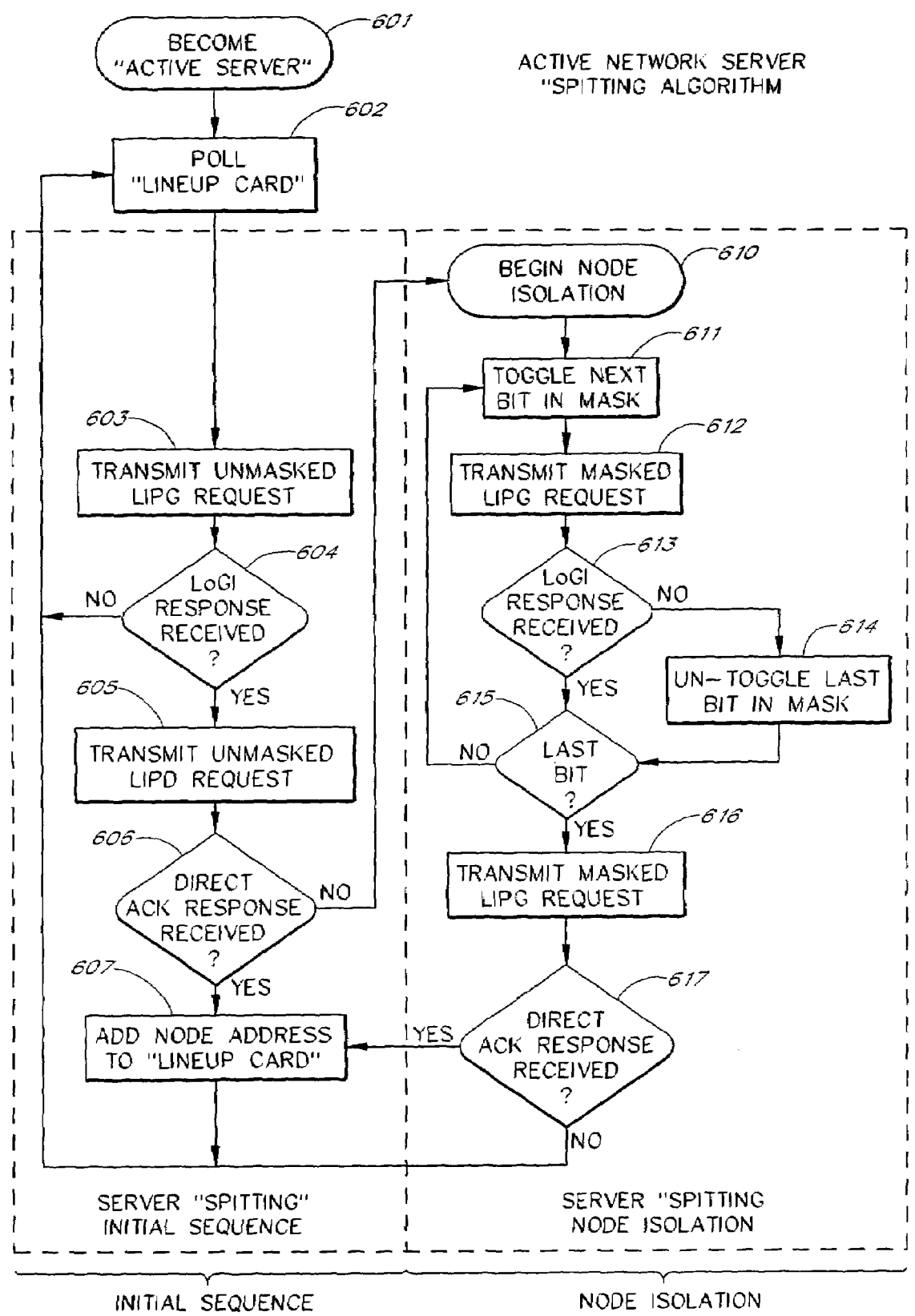
FIG. 6A is a flowchart showing the active network server spitting algorithm.
Figure 6B:
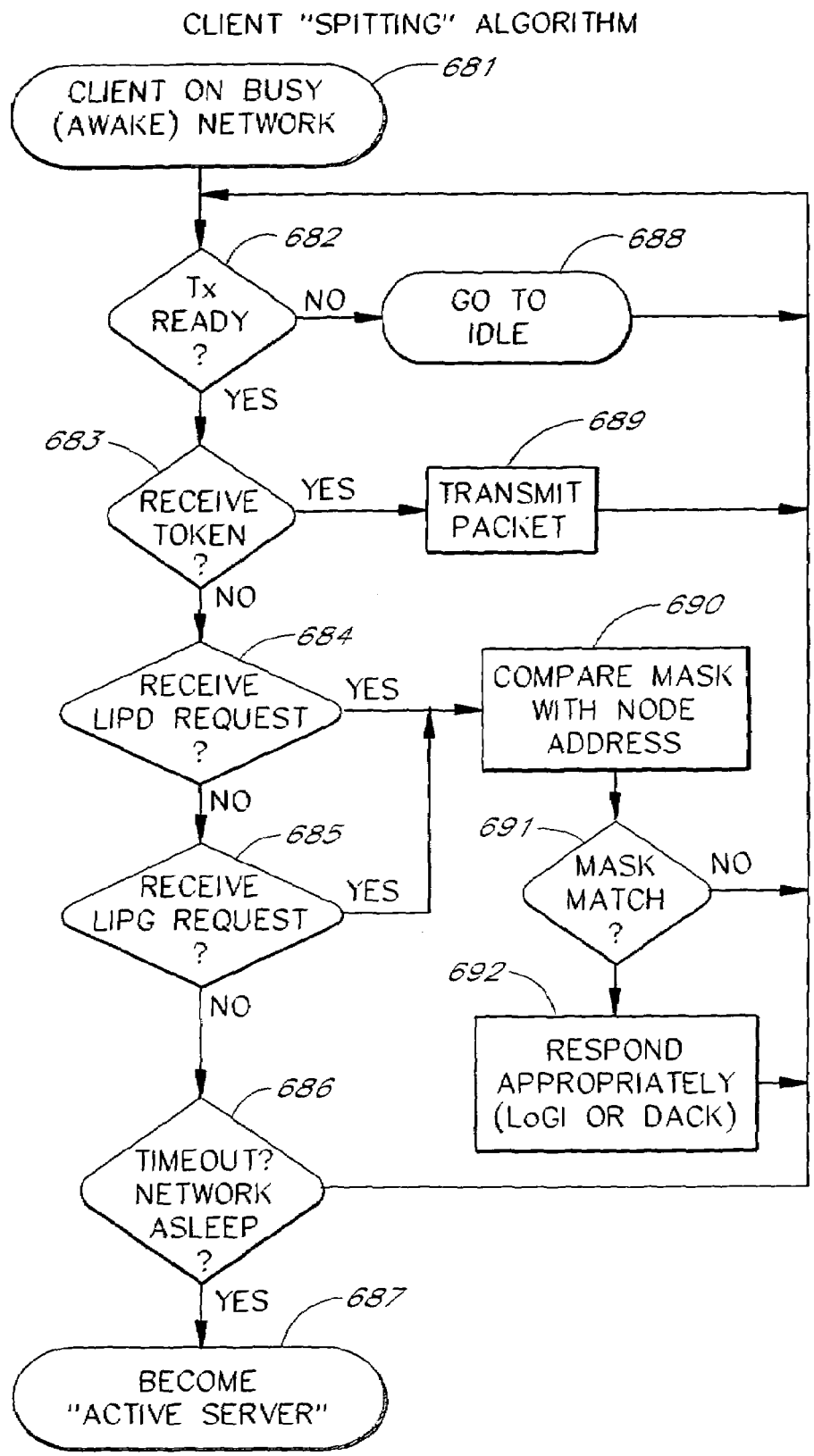
FIG. 6B is a flowchart showing the client spitting algorithm.

FIGS. 6A and 6B illustrate the process of spitting on the bus for an active network server and client node, respectively. In FIG. 6A, the process of spitting on the bus for an active network server begins in a start block 601 when a node becomes the active network server. The process advances from the start block 601 to a polling block 602. In the polling block 602, the active server polls all of the client nodes currently on the lineup card. Once the polling is complete, the process advances to a transmit block 603. In the transmit block 603, the active server node transmits an unmasked LIPG request and then advances to a decision block 604. In the decision block 604, the active server looks for a LoGI response. If a LoGI response is received, then the process advances to a process block 605; otherwise, the process returns to the polling block 602.

In the process block 605, the active server transmits an unmasked LIPD request and then advances to a decision block 606. In the decision block 606, the active server looks for a Direct ACK (DACK) response. If a single DACK response is received, then the process advances to a process block 607. If multiple DACK responses are received, or if no DACK responses are received, then the process advances to a node isolation block 610. In the process block 607, the client node that sent the DACK response is added to the lineup card, and then the process returns to the polling block 602.

In the process block 610 (beginning the node isolation algorithm) the process initializes an LIPG mask and advances to a process block 611. In the process block 611, the mask is updated (e.g., a next bit in the mask is toggled) and the process advances to a transmit block 612. In the transmit block 612, a masked LIPG request is sent and the process advances to a decision block 613. In the decision block 613, the process looks for a LoGI response. If a LoGI response is received, then the process advances to a decision block 615, otherwise, the process advances to a process block 614. In the process block 614, the mask bit most recently toggled in the process block 611 is un-toggled and the process advances to the decision block 615.

In the decision block 615, if all bits in the mask have been toggled, then the process advances to a process block 616; otherwise, the process returns to the process block 611. In the process block 616, the active network server transmits a masked LIPG request and advances to a decision block 617. In the decision block 617, if a DACK response is received, then the process advances to the process block 607; otherwise, the process returns to the polling block 602.

The process blocks 603-607 are part of a server spitting initial sequence. The process blocks 610-617 are part of a server spitting node isolation sequence.

FIG. 6B is a flowchart showing the client spitting algorithm, beginning at a start block 631 for a client on an active network. From the start block 681, the process advances to a decision block 682, where a transmit status is examined. If the transmit status is "ready," then the process advances to a decision block 683; otherwise, the process advances to an idle block 688 (the idle block returns to the decision block 682).

In the decision block 683, if the node has received the system token, then the process advances to a transmit block 689; otherwise, the process advances to a decision block 684. In the transmit block 689, the node transmits a packet of data and the process returns to the decision block 682. In the decision block 684, if the node has received an LIPD request, then the process advances to a process block 690; otherwise, the process advances to a decision block 686. In the decision block 686, the process checks for a timeout or a system sleep state. If the process detects a timeout or sleep, then the process advances to a process block 687, wherein the present node asserts itself as the active server.

In the process block 690, the mask from the LIPD is compared with the node address of the present node, and the process advances to a decision block 691. In the decision block 691, if the mask matches the node, then the process advances to a respond block 692; otherwise, the process returns to the decision block 682. In the respond block 692, the node responds to the network server (with a LoGI or DACK as appropriate) and the process returns to the decision block 682.

Group LIP (LIPG) Query

While the network is awake, the active network server periodically broadcasts group LIP queries. A group LIP (LIPG) query requires a Logical Group Isolation (LoGI) response from any number of nodes. This mechanism gives client nodes an opportunity to be inserted into the lineup card during a busy network in a collision-free mechanism. The beauty of the LoGI packet, is that multiple simultaneous nodes can transmit this type of packet (assuming they are within the same time period) and the result will be a single LoGI packet. Thus, multiple LoGI responses result in a single LoGI packet seen by the receiving node.

The initial LIP sequence packet is an unmasked group LIP (LIPG) query which is sent to determine if anyone on the network wants to start the LIP sequence to insert into the lineup card. If a LoGI response is seen, chances are only a single node wants to insert, thus an unmasked direct LIP (LIPD) packet is sent next. If a direct response is not seen, subsequent LIPG packets are sent as group packets with a masked address. This is the laborious and less efficient isolation mechanism used to isolate a particular node for insertion into the lineup card. This is accomplished by systematically transmitting a bitmask, which isolates a single bit of the remote nodes 32-bit address at a time. This isolation mechanism must be performed if two or more conflicted nodes request the token at the same time.

Direct LIP (LIPD) Query

Direct LIP (LIPD) queries are sent as a result of a LoGI response from a LIPG query. The purpose of the LIPD query is to expedite the LIP process by transmitting an unmasked LIPD request to all nodes, hoping that only a single node will respond (which should be the case most of the time). The LIPD packet is responded to with an ordinary DACK response, which includes the address of the responding node. If a single node responds, the response is seen, and the node address is added to the lineup card appropriately. If, however, the LIPD request is not seen, (due to multiple nodes responding simultaneously) the active network server continues to isolate, via the normal isolation algorithm, using LIPG packets to select only one of the contending nodes for insertion into the "lineup card".

Thus the LIPD packet is only used to expedite the isolation process, hoping that only a single node responds to the request.

Node Isolation Sequence

If a node responds to the initial LIPG, but a single response is not seen from the LIPD query for any reason, the active network server automatically goes into node isolation. The isolation sequence uses LIPG packets, which require a LoGI response. This allows multiple simultaneous responses to be seen by the active network server.

The "active network server" initiates this sequence by transmitting a packet with the first address (least significant) bit set. Nodes desiring to transmit, respond to this packet if and only if this particular address bit matches their own. This algorithm is a simple "AND" followed by a comparison to the original mask. If the two values match, the packet is responded to with a LoGI.

The active network server then transmits the next packet with the previously matched mask untouched, with the next bit set. Again, nodes will respond if the entire bit sequences matches. If none of the nodes respond, the active network server clears the current bit and retries the packet. This goes on until all 32 bits have been identified and a match is found. At this point in time, the uniquely identified node is added to the active network server's lineup card.

Centralized Token-Passing (Polling)

When the system is awake, it is desirable to give each node included on the lineup card (via the spitting process) a deterministic time slot in which it can access the medium 100. It is further desirable to give each node the same opportunity to transmit on a busy medium 100. Ethernet lacks either of the aforementioned benefits, whereas Token-Ring possesses both.

Token-Ring has a disadvantage of requiring each node to know its upstream and downstream neighbor's address, and constant existence/rotation of a token. The overhead requirements of conventional token-ring networks are incompatible with the dumb nodes contemplated by PLX. Furthermore, the ad hoc networking requirements of a power-line network are not conducive to such strict token rotation. Thus PLX introduces the Centralized Token-Passing (CTP) mechanism with a dynamic lineup card.

In CTP, the active network server node is responsible for ensuring that a token exists, that every node needing the token gets it, that sleeping nodes can wake-up and receive the token, and that tokens are distributed fairly in a deterministic fashion. Under CTP, nodes other than the active server are referred to as clients. The active network server role is self-appointed through the aforementioned datagram detection or listening process. The role of the active network server is relinquished after a pre-determined time period of in-activity on the medium 100. In one embodiment, the active server role is relinquished after approximately five seconds of inactivity. During system activity, the active network server is responsible for polling each client node in the lineup card, as well as allow new nodes the opportunity to insert themselves into the lineup card through the spitting process.

Figure 7:
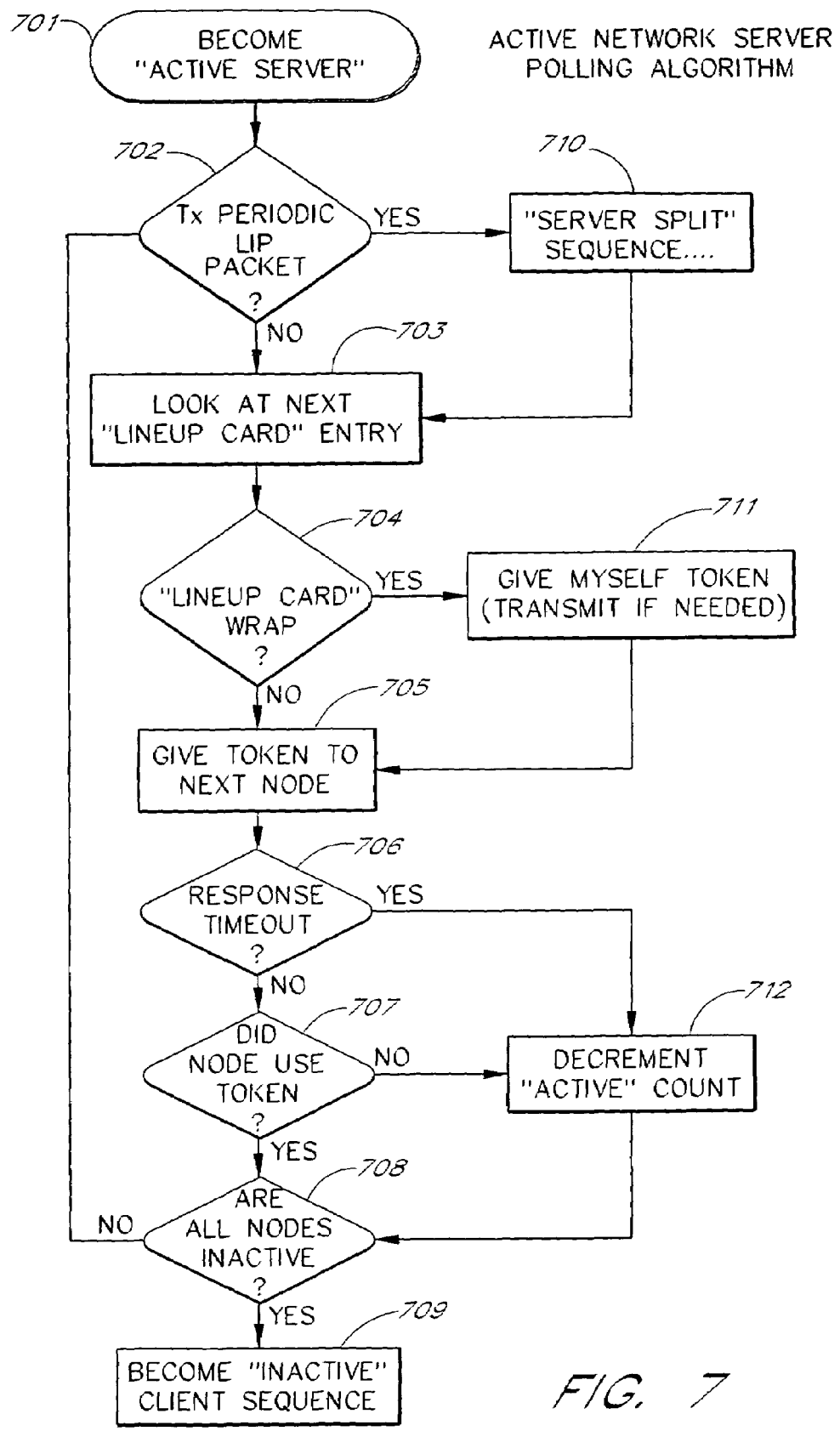
FIG. 7 is a flowchart showing the active network server polling algorithm.

FIG. 7 is a flowchart showing the network server polling algorithm, beginning with a start block 701 where a node becomes the active server. The process advances from the start block 701 to a decision block 702, where process determines the need to transmit a periodic LIP packet. If a LIP packet is needed, then the process advances to the process block 710; otherwise, the process advances to a process block 703. In the process block 710, the node executes the active server spitting process described in connection with FIG. 6A. Upon completion of the process block 710, the process advances to the process block 703.

In the process block 703, the process obtains the next entry in the lineup card and advances to a decision block 704. In the process block 704, if all of the entries in the lineup card have been processed (that is, if all client nodes have had an opportunity to speak) then the process advances to a process block 711; otherwise, the process advances to a process block 705. In the process block 711, the token is given to the active server (thus allowing the active server to speak) and the process advances to the process block 705.

In the process block 705, the token is given to the next node obtained from the lineup card and the process advances to a decision block 707. In the decision block 707, if a response timeout occurs, then the process advances to process block 712; otherwise, the process advances to a decision block 707. In the decision block 707, if the client node did not use the token, then the process advances to the process block 712. In the process block 712, a count of the number of active nodes is decremented and the process advances to a decision block 708.

In the decision block 708, if all nodes are inactive, then the process advances to a process block 709; otherwise, the process returns to the decision block 702. In the process block 709, the active server reverts back to an inactive client node.

Packet Types and Formats

Packets on a PLX network can take on different formats depending on the purpose of the packet. The different formats are conveniently grouped into three separate categories.

One format allows multiple nodes to simultaneously transmit/receive the same response packet without interference or demodulation problems. These are called Logical Group Isolation (LoGI) packets and are used primarily for broadcasting/re-broadcasting and acknowledgments.

The other two types of packets, called raw data payload packets and command payload packets are used when a single node is communicating on the wire at any given point in time. A raw data payload packet is used by an application desiring to transmit/receive information pertaining to its application. Packets coming from a host node are raw data payload packets, as well as any CAL packets.

A PLX command payload packet is used to manage the media access and flow. PLX command packets originate and terminate within the firmware and hardware of the adapter, and are not passed on to the host node. PLX command packets facilitate the smooth flow of tokens, acknowledgements, lineup insertions, etc., and are inherent in all PLX networks.

Logical Group Isolation (LoGI) Response Packet

Figure 8:
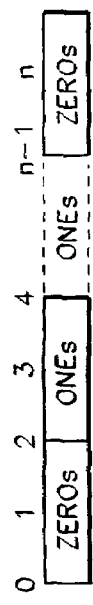
FIG. 8 is a block diagram showing the fields of a PLX Logical Group Isolation (LoGI) Packet.

The first form is used when a node sends out a group request (a request with the probability of multiple simultaneous responses) onto the network. Since PLX is desirably a reduced collision, or in some cases a collision-free, environment, it is difficult to detect collisions. Therefore, simultaneous responses are possible. The LoGI packet 800, shown in FIG. 8, includes a two-byte NULL field, followed by multiples of a two-byte All "1" fields, terminated by a two-byte NULL field. The data present in this type of packet is very cryptic, but it does serve its purpose to help isolate group responses down to a single node.

A LoGI packet is preceded by a masked LIPG request. The mask means more than one node could match the masked address, and thus multiple simultaneous responses could occur. The LIPG packet is described in later.

The LoGI packet can also contain some very simplistic data by lengthening the series of ones present within a particular packet. The lengthened packet must be used in conjunction with a time displacement to indicate a different type of response. Broadcast packet use this feature to allow a busy response to be indicated by one or more nodes in a simultaneous fashion.

Payload Packets

The second form is used to carry a payload around on the network. This is the form most commonly used on the network, and is the valid form for transmitting and receiving useful data information.

Payload packets additionally take on two forms which indicate the receiving audience scope and what type of a response they are expecting to receive. They are Group Addressed (typically broadcast packets) and Directly Addressed packet types. Group Addressed packets can only accept LoGI response packets, whereas Directly Addressed packets accept Direct ACKnowledge or DACK packets, since only a single response is expected.

Payload packet types are further sub-divided into two separate categories which determine the use of the payload within the packet. They are: Raw Data packets, and PLX Command packets.

Raw Data Packets

Figure 9:
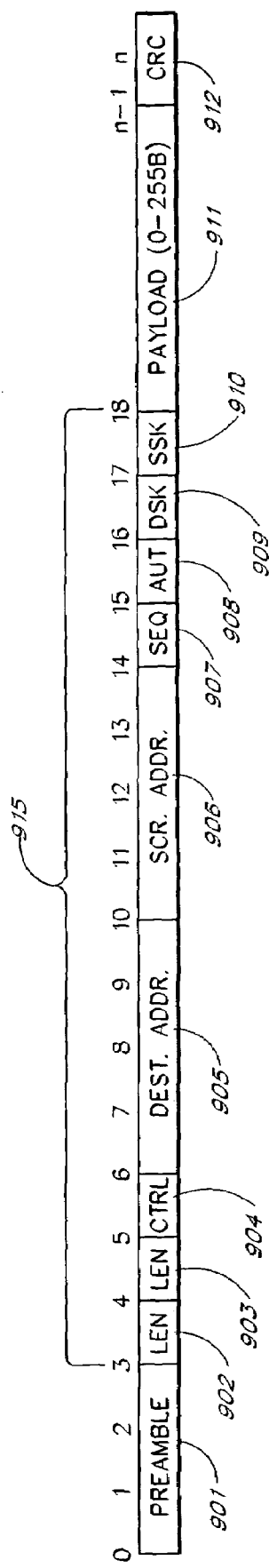
FIG. 9 is a block diagram showing the fields of a PLX raw data packet.

The format of a raw data packet 900 is shown in FIG. 9 and includes a preamble field 901, a length field 902, a length field 903, a ctrl field 904, a destination address field 905, a source address field 906, a sequence field 907, an authentication field 908, a DSk field 909, an SSk field 910, a payload field 911, and a CRC field 912. The raw data packet 900 is sent by an active server node or client node. The length field 902, the length field 903, the ctrl field 904, the destination address field 905, the source address field 906, the sequence field 907, then authentication field 908, the DSk field 909, and the SSk field 910 are components of a MAC header 915. The payload field 911 includes application layer information to be parsed by an appropriate payload handler. The host PC and CAL interpreter are examples of payload handlers. In one embodiment, the raw data packet 900 has a 3-byte preamble 901, a 13-15 byte MAC header 915, a payload section 911 of up to 255 bytes and a 2-byte CRC 912.

PLX (External) Command Packets

Figure 10:
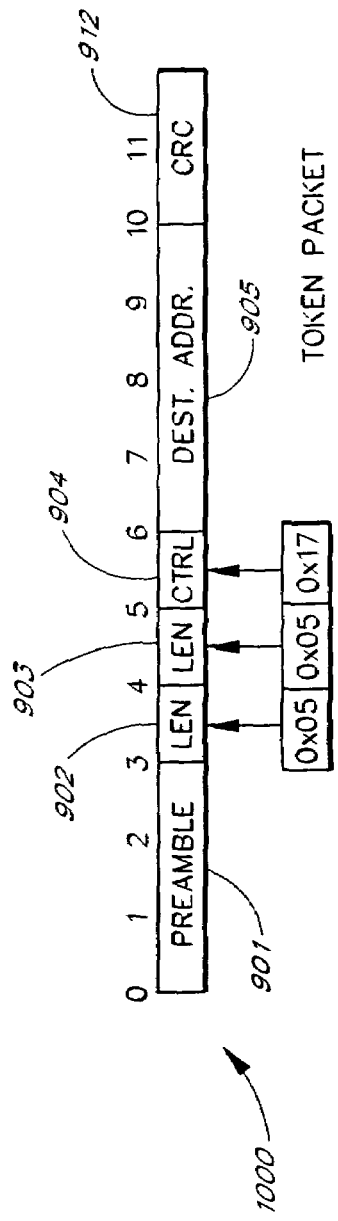
FIG. 10 is a block diagram showing the fields of a PLX token packet.

PLX Command packets are used to facilitate the flow of data on and off of the medium 100 by providing a means for two nodes to communicate via brief packet sequences. A description of the variations of PLX Command packets are presented below:

Token Packets: The format of a PLX token packet 1000 is shown in FIG. 10 and includes the preamble field 901, the length field 902, the length field 903, the ctrl field 904, the destination address field 905, the CRC field 912. The length field 902, the length field 903, and the ctrl field 904, have the (hexadecimal) values 0x05, 0x05, and 0x17 respectively.

The token packet 1000 is sent to a directly addressed node, and solicits either payload type packet. Nodes not requiring attention should simply DACK (with the status field set to 0x03), meaning they don't have anything to say and will not be using the token.

Client nodes should invoke a token (through the LIP process) before transmitting onto an active network. As long as a node continues to use the token, the active network server will continue to hand it a token. If, however, the client node repeatedly responds with a "token not used" response, the active network server will age the node and it will be taken out of the lineup.

A token packet contains the usual MAC header (minus a source address) and CRC, however, the data field is not used (the size of the data field is zero). Tokens can only come from the 'active network server' whose address is fixed to be 0xffffffe, thus the source address field is not needed.

Figure 11:
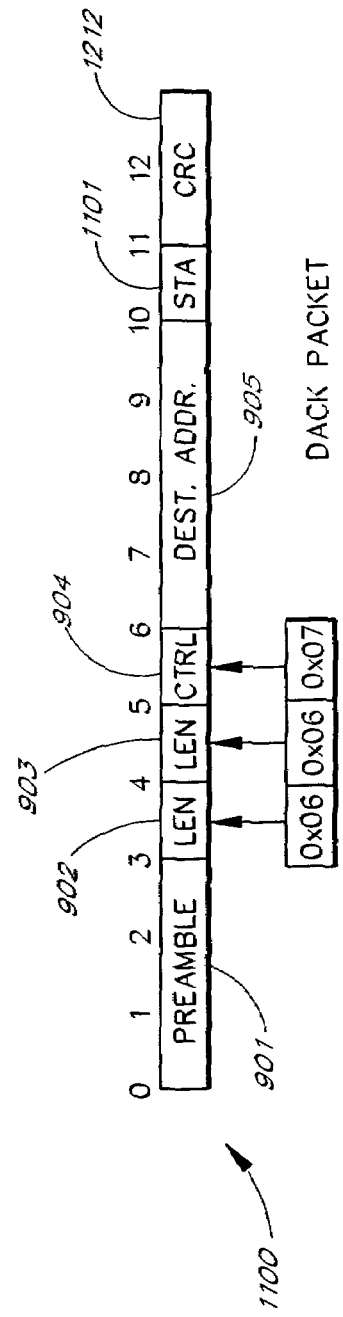
FIG. 11 is a block diagram showing the fields of a PLX Direct Acknowledgement (DACK) packet.

Direct ACKnowledge (DACK) Packet:

The format of a PLX token packet 1100 is shown in FIG. 11 and includes the preamble field 901, the length field 902, the length field 903, the ctrl field 904, the destination address field 905, a status field 1101, the CRC field 912. The length field 902, the length field 903, and the ctrl field 904, have the (hexadecimal) values 0x06, 0x06, and 0x07 respectively.

A DACK packet is sent by a receiving node to acknowledge the valid reception of the packet or packet sequence. DACK packets are only returned from directly addressed message packets (with the exception of the LIPD packet).

A DACK packet is used to terminate a typical handshaking sequence between two nodes on the network and as a result involve three nodes . . . 1) Active network server, 2) Node requesting, and 3) Node responding. (Requesting/responding nodes can also be the "active network server" if it is the destination of the current request). The DACK status field varies depending on the node type receiving the packet (active network server or client). DACK packets sent back to the requesting node (by the responding node) relinquishes control back to the requesting node to continue a packet stream, DACK packets sent back to the "active network server" (by the requesting node) relinquish control back to the "active network server", signifying the end of a packet stream. Requesting nodes are responsible for re-requesting a packet if a response or DACK packet is not received.

The DACK packet contains a typical MAC header and CRC, and a 1-byte payload. The status field contains information regarding the received packet and is returned within this field. Values for the status field 1101 are listed in Table 2.

TABLE 2

Values for the DACK status field 1101.

| DACK | Node | Description |
|------|------|-------------|
| 0x0 | All | Receive buffer full (Failure) |
| 0x1 | All | Failure (multi-channel responses) |
| 0x2 | Server | Token used by node |
| 0x3 | Server | Token NOT used by node |
| 0x4 | Server | Token responding to "wake-up" request |
| 0x9 | All | Printer sequence numbering error |
| 0xa | All | Printer unplugged error |
| 0xb | All | Printer off-line error |
| 0xc | All | Printer general error |
| 0xd | All | Printer out of paper error |
| 0xe | All | Printer unknown error |
| 0xf | All | Success |

It should be noted that this information is passed on the actual medium 100 itself, and may not be the status passed up to the host node. Please see the section on Internal PLX packets, Tx Status for more information regarding status information that is passed up to the host.

Figure 12:
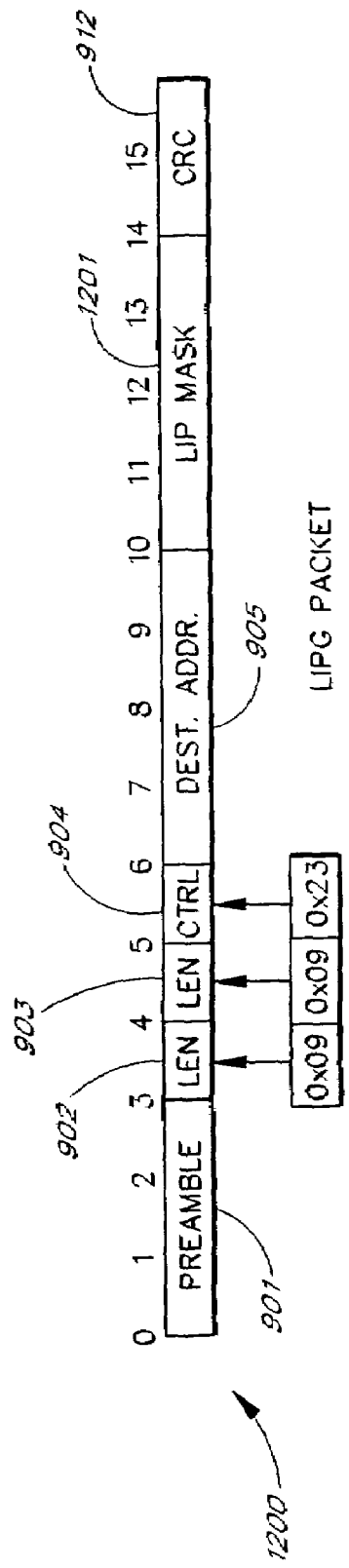
FIG. 12 is a block diagram showing the fields of a PLX masked Lineup Insertion Packet (LIPG).

Lineup Insertion Packets (LIPD and LIPG): FIG. 12 shows the format of a PLX LIPG packet 1200, which includes the preamble field 901, the length field 902, the length field 903, the ctrl field 904, the destination address field 905, a mask field 1201, and the CRC field 912. The length field 902, the length field 903, and the ctrl field 904, have the (hexadecimal) values 0x09, 0x09, and 0x23 respectively.

Figure 13:
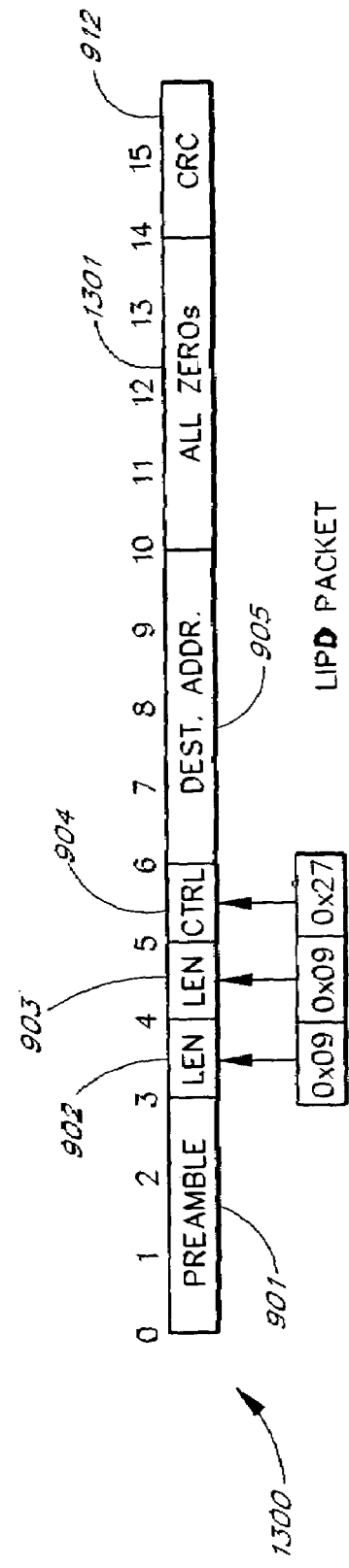
FIG. 13 is a block diagram showing the fields of a PLX direct Lineup Insertion (LIPD) packet.

FIG. 13 shows the format of a PLX LIPD packet 1300, which includes the preamble field 901, the length field 902, the length field 903, the ctrl field 904, the destination address field 905, a NULL field 1301, and the CRC field 912. The length field 902, the length field 903, and the ctrl field 904, have the (hexadecimal) values 0x09, 0x09, and 0x23 respectively.

Lineup Insertion Packets (LIP) are periodically sent by the "active network server" to allow new recruits to enter the existing lineup card. This is accomplished with two separate packets, which are both broadcast to all listening nodes. The first packet, the LIPG packet 1200, contains the LIP mask field 1201. The mask 1201 must match the address of the remote before responding with a LoGI response. The second packet, the LIPD packet 1300, is used to expedite the insertion process by having the responding node respond with a DACK packet which contains its source address (to be inserted into the lineup card).

Therefore, LIPG packets are masked and have a corresponding bit sequence in the LIP mask field. A node should respond to the LIPG packet with a LoGI packet. Likewise, LIPD packets are unmasked, which means any node desiring to enter the lineup card (which implies the node is not already on the lineup card) should respond with a DACK.

Payload Packet Frame Format

Following is a description of each of the fields that could be present within a payload type packet. This is true for both the raw data and PLX command packet types.

Although the preamble/start sequence is not part of the packet format, it is a pre-determined bit pattern used for detecting carrier, synchronizing the hardware to the incoming packet, and for determining the bit times or line speed of the subsequent bytes within the current packet. The length of the preamble is dictated by the minimum amount of bit times required to establish the presence of a valid carrier and synchronization on the line. The bit pattern of the preamble 901 is:

| Value | Sequence |
|---|---|
| 0xaa | 1$^{st}$ sync byte |
| 0x31 | 2$^{nd}$ sync byte |
| 0xnn | Speed/3$^{rd}$ sync byte |

The speed (or 3$^{rd}$ sync) byte determines the speed of the in-coming data (starting with the length byte 902) and is summarized as follows:

| Value | Speed |
|---|---|
| 0x55 | Low speed - 350 k |
| 0xdd | Mid speed - 700 k |
| 0x99 | Hi speed - 1.19 m |
| 0x11 | reserved |

Finally, the preamble is followed by two duplicate length bytes 902-903, which describe the length of the packet. These bytes will come in at the new speed.

Length Fields

The length fields 902-903 are used to indicate the size of the in-coming packet. The length fields 902-903 are used by the hardware (in the absence of a carrier detect signal) to determine valid packet reception. Once the length of the packet is reached, the CRC field 912 is tested for validity. The length of a PLX packet is thus preferably limited to 256 total bytes (excluding the preamble field 901 and the CRC field 912). The length includes the MAC header 915 (Control, Address, etc.), optional fields and the payload field 911.

The length field is duplicated two times (902,903) to ensure validity of the incoming data stream (it acts as an extension of the preamble). The length fields 902-903 must match each other (as well as a preamble match) before packet reception begins.

Control Field

As shown above, payload packets can be one of the following two main types: PLX command packets or raw data packets.

PLX command packet types can be further classified into two sub-types: External and Internal PLX commands. Internal PLX command packets refer to the handshake between the hardware and the host node driver through the local connection (USB, 1284, serial, etc.). External PLX command packets refer to handshake packets on the power line medium 100 itself which regulate medium 100 access.

The control field 904 varies depending on the type of packet as shown with each bit dedicated for a particular definition as shown in table 3.

TABLE 3

Bits in the control field 904.

| BIT | PLX (EXT) | PLX (INT) | RAW (NON-PLX) |
|---|---|---|---|
| 0: | PACKET_TYPE(1) | PACKET_TYPE(1) | PACKET_TYPE (0) |
| 1: | PLX_SUBTYPE(1) | PLX_SUBTYPE(0) | RAW_ACK_TYPE0 |
| 2: | PLX_ACK_TYPE | reserved(0) | RAW_ACK_TYPE1 |
| 3: | reserved(0) | reserved(0) | CIPHER |
| 4: | EXT_SUBTYPE | INT_SUBTYPE | SOCKET |
| 5: | EXT_SUBTYPE | INT_SUBTYPE | reserved (0) |
| 6: | EXT_SUBTYPE | INT_SUBTYPE | PID |
| 7: | EXT_SUBTYPE | INT_SUBTYPE | reserved (0) |

Packet Type

The Packet Type bit is used to designate whether the given packet is of type PLX or of type raw data or non-PLX. Since PLX protocol requests are handled differently, and in most cases by the microcontroller firmware, and raw data packets are typically handled by a separate application or host software, it was expedient to make a differentiation in the control field. Raw data packets typically contain raw payload information to be handed to the appropriate application software. An exception to this case is the CAL packets which contain part of the interpreter in the microcontroller and part in the host machine.

| Bit 0 | Packet Type |
|---|---|
| 1 | PLX command packet = 1 |
| 0 | Raw data packet = 0 |

PLX Sub-Packet Type

PLX commands typically come in one of two forms. The first form is a request from the wire by another node, the second form is a request from the host, which does not go onto the wire. Since the microcontroller firmware makes a distinction between responding to these two types, and since the two types are completely separate from each other, this bit was created.

| Bit 1 | PLX Sub-Packet Type |
|---|---|
| 1 | External PLX command packet = 1 |
| 0 | Internal PLX command packet = 0 |

PLX ACK Type

The Token and DACK command packets are used to transfer access rights to the medium 100, and terminate a sequence where the "active network server" temporarily releases control of the medium 100 to another node. The other two PLX command packets, LIPG and LIPD, require a response packet. The response type is either of type LoGI or of type DACK. This bit-determines what type of response the node should utilize.

| Bit 2 | PLX ACK Type |
|---|---|
| 1 | Respond with a DACK = 1 |
| 0 | Respond with a LoGI = 0 |

PLX Sub-Packet External Types

The PLX Specification provides connectionless, acknowledged and unacknowledged data transfer services between two nodes within a centralized (server arbitrated token) token-passing system. These bits allow for this communication to take place.

The active network server places a directed token onto the medium 100 before a client can begin transmission. A client node terminates access rights to the medium 100 with a DACK response packet directed back to the active network server node. The active network server maintains a lineup card of active nodes when polling client nodes. To get onto the lineup card, a client node responds appropriately to either a directed LIP request (LIPD) or a group LIP request (LIPG).

Once on the lineup card, nodes will be polled, and they can send and receive packets with payload information, in either an acknowledged or unacknowledged format. The following is a table of valid PLX sub-packet external types allowed on the medium 100:

| Bits (7,6,5,4) | Byte Value | Packet Sub-Type |
|---|---|---|
| 0 0 0 0 | 0x07 | DACK |
| 0 0 0 1 | 0x17 | Token |
| 0 0 1 0 | 0x27 | LIPD |
|  | 0x23 | LIPG |
| others . . . |  | Reserved |

NOTE: If a DACK/GACK is not received by the requesting node within the pre-determined inter-gap spacing requirements, then the transmitting (requesting or responding) node is responsible for re-trying the request (response).

PLX Sub-Packet Internal Type

The PLX Specification allows portions of the protocol to exist on a host node, such as a PC. Periodically, the host node will need to access information on the attached node to which it is physically connected. This is known as an internal PLX request, since it is meant for the attached node, and should typically not be placed on the wire to be sent to a remote node. Below is a description of the possible internal PLX sub-types:

| Bits (7,6,5,4) | Byte Value | Packet Sub-Type |
|---|---|---|
| 1 1 1 1 | 0xf1 | ERROR Handshake |
| 0 0 0 1 | 0x11 | CAL Request |
| 0 0 1 0 | 0x21 | CAL Response |
| 0 0 1 1 | 0x31 | Tx Status |
| 1 1 x x |  | Reserved |

Internal sub-types are sent from the host and consumed by the hardware, and an appropriate response is sent back to the host node. Internal packets are never sent onto the medium 100. As such, this packet type is no defined under the payload packet section, but is in the section defined under PLX (Internal) Host packets.

Raw ACK Type

The Raw ACK Type specifies what type of response should follow the current raw data packet. Response types take on one of four forms: Burst (no response), Double LoGI, LoGI, and a DACK.

A burst type is self-explanatory, packets are sent one after the other. The last packet of a burst sequence should have a different ACKnowledge type assigned (to complete the burst sequence, a response is used).

A Double LoGI sequence allows group or broadcast requests to be sent. If a node CANNOT buffer the packet, it responds within the first inter-gap space, if it correctly received and parsed the packet, it responds during a delayed inter-gap space.

LoGI responses are directed toward a single node and are the most efficient mechanism for responding. The length of a LoGI packet is the most bandwidth efficient, but is unable to contain much information about the response.

DACK responses are directed toward a specific node, but can contain much more information within the response than the LoGI type.

| Bits (2,1) | Packet Sub-Type |
|---|---|
| 0 0 | Burst |
| 0 1 | Double LoGI |
| 1 0 | LoGI |
| 1 1 | DACK |

Cipher

The cipher bit allows the packet contents, starting with the authentication byte, to be encrypted. One encryption scheme uses a 256-bit Diffie-Hellman handshake to do a key-exchange, after which, a secret 32-byte array is securely sent across the medium 100. Subsequent transaction can use the encryption array for secure communication.

| Bit 3: Cipher |
|---|
| Current Packet IS Encrypted = 1 |
| Current Packet IS NOT Encrypted = 0 |

Socket

Typically a PLX raw data payload packet will be comprised of the following field sizes:

| Field | Length |
|---|---|
| Preamble 901 | 3 Bytes |
| Length 902,903 | 2 Bytes Duplicated |
| Control 904 | 1 Byte |
| Destination Address 905 | 4 Bytes |
| Source Address 906 | 4 Bytes |
| Payload 911 | 0-255 Bytes |
| CRC 912 | 2 Bytes |

When multiple applications exist on the same node, a mechanism is used whereby packets can be routed to the appropriate application within a specific node address. These types of applications use a socket field. The first byte is the destination socket address, and the second byte is the source socket address. Therefore, by setting this bit, the MAC header size increases by 2. This field will immediately follow the authentication byte field when implemented, and is included if the following bit is set:

| Bit 4 | Socket |
|---|---|
| 1 | Include Socket Field |
| 0 | Don't Include Socket Field |

Protocol ID (PID)

Each packet contains information which can be parsed by higher-level protocols such as IPX, TCP/IP, or CAL. PLX is simply used as a transport to encapsulate these types of packets to be sent/received across the network. Typically, the higher-level parsing routines exist on a host system; however, the hardware is required to contain a minimum set of CAL parsing functions. As such, the hardware parses for CAL requests, and hands all other requests up to the appropriate payload handling routine. Some protocol information can be located in hardware (e.g., in ROM, FLASH memory, etc.), other protocol information is parsed by the host node. This bit determines whether the hardware protocol handler is required to initiate the parsing on this packet or not.

| Bit 6 | Protocol ID (PID) |
|---|---|
| 1 | Protocol ID Present (Micro Parse) |
| 0 | Protocol ID Absent (RAW - Host Parse) |

A RAW packet means the first byte of data is not a byte-code for the type of protocol, but instead is the first byte of the protocol header itself. PID Parse-able packets decode the first byte-code to determine which protocol should parse the packet.

Below are the options available when the PID bit is set. The first data byte will represent the type of protocol required to parse the current packet:

| Byte Value | Definition | Type |
|---|---|---|
| 0xff | Reserved | n/a |
| 0xfe | COMPLETED Packet | cebusResp |
| 0xfd | FALSE Packet | cebusResp |
| 0xfc | ERROR Packet | cebusResp |

-continued

| Byte Value | Definition | Type |
|---|---|---|
| 0xdf-0xfb | Reserved | n/a |
| 0xa0-0xde | Context Numbers (CAL) | cebusCmd |
| 0x9f | Reserved (CAL) | cebusCmd |
| 0x00-0x9e | Context Class (CAL) | cebusCmd |

Destination Address Field

The destination address 905 contains the destination node for the current packet.

When a node has a request or is responding to another nodes request, it places the address of the node to which the response packet is destined, within the destination address field 905. If the node is only capable of communicating to the active network server or the database server, it would put that address in the destination address field 905. Otherwise, the destination address is typically taken from the source address field 906 of the requesting packet.

Certain PLX addresses are well known. A list of these well known PLX addresses are shown below:

| Address | Description |
|---|---|
| 0x00000000-0xffffffef | Valid Unique Node Addresses |
| 0xfffffff0-0xfffffffc | Reserved |
| 0xfffffffd | Application Server Node Address |
| 0xfffffffe | Active network server Node Address |
| 0xffffffff | Broadcast Node Address |

Source Address Field

The source address 906 contains the address of the node for the current packet. When a node has a request or is responding to another nodes request, it puts its own node address into the source address field 906. The node address utilizes a portion of the 8 byte GUID, combined with the type of the node, to create a four byte node address. The least significant 7 nibbles from the GUID are used, and the node type overwrites the most significant nibble ('8' nibble) of the node address.

Example:

If . . .

GUID=0x0123456789ABCDEF

And Node Type=0x03

Then . . .

Source Address=0x39ABCDEF

End If

Sequence Number Field

The sequence field 907 provides a host application with the ability to recreate or reassemble a data packet or sequence which has been broken up into smaller packets for transmission on the medium 100. Duplicate sequence numbers can be thrown away, and unreceived sequence numbers can be re-sent. Sequencing provides for data integrity for larger data streams. The value placed in the sequence field 907 field depends on the application, and can be used for alternate purposes if required.

Authentication Field

The authentication field 908 allows each packet to be validated before completing reception. The authentication field 908 is typically seeded by exclusive-oring the first two bytes of the encryption array. Thus all nodes within a secure system will be seeded with the same authentication value, and those all should pass this verification procedure. The authenticated field is further encrypted for increased integrity.

Payload Field

The data payload field 911 is used to present information to the receiving node. The first byte of the payload data can contain a byte-code, which determines how to parse the contents. This first byte of data is used in conjunction with the RAW bit described earlier.

Cyclic Redundancy Check (CRC) Field

The Cyclic Redundancy Check (CRC) field 912 is used to provide a reliable error detection technique within the transmitted packet. It is re-evaluated upon completion and compared for authenticity. Packets that do not pass this check are discarded.

The CRC algorithm is chosen to be efficient and simple enough, so as to provide a desired level of reliability, without undue overhead (in software and hardware). It is desirable to provide a CRC algorithm that is fast enough to be able to do on-the-fly CRC computations for both transmitted and received packets.

On-the-fly calculations (as a bit or byte is received, the CRC is updated, instead of waiting for the entire packet to come in, the same applies to transmits) are not mandatory, but help in the overall throughput and performance of the system.

In one embodiment, G(X) is given by $G(x)=x^{16}+x^{15}+x^{11}+x^{8}+x^{6}+x^{5}+x^{4}+x^{3}+x+1$.

PLX (Internal) Host Packets

Figure 14:
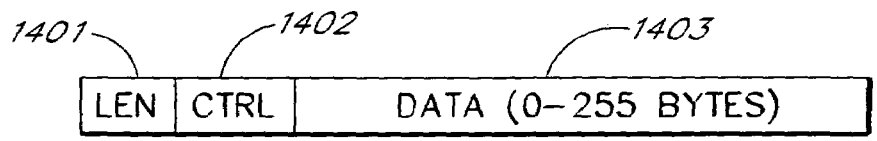
FIG. 14 is a block diagram showing the fields of a PLX internal host packet.

PLX Internal Host packets never reach the medium 100, as such, the packet description looks much simpler. The preamble 901 is not needed, nor the duplicate length fields 902,903, the addressing fields 905,906 are not needed, and the CRC field 912 is not needed. FIG. 14 shows the format of a PLX internal host packet, including a length field 1401, a control field 1402, and a data field 1403. The data field 1403 contains whatever the control field designates. As shown in the previous control field definition (which applies to PLX Internal Host packets as well), there exists a number of packets which pass between the hardware and host node which facilitate the flow of traffic. Following is a definition of each type packet.

CAL Request Packet

Figure 15:
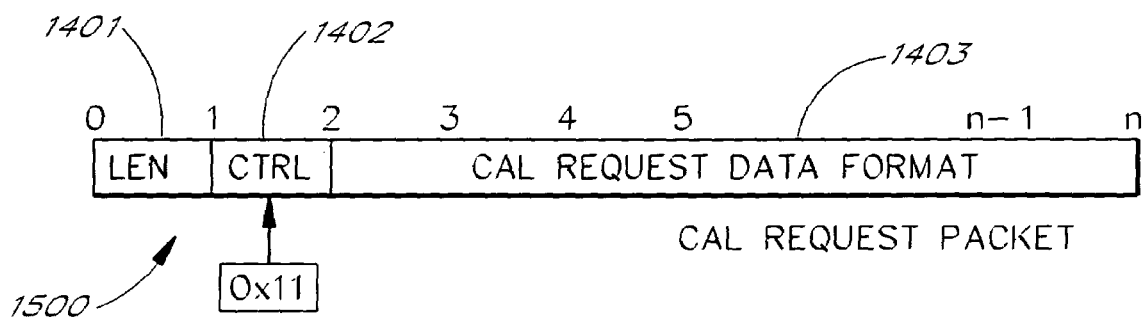
FIG. 15 is a block diagram showing a PLX Common Application Language (CAL) request packet.

FIG. 15 shows the format of a CAL request packet 1500, including the length field 1401, the control field 1402, and a CAL data field 1503. The control field 1402 has the value 0x11.

A CAL request packet 1500 is sent by the host to the hardware node to retrieve CAL information present on the hardware. Since PLX nodes can have application code or a host processor separate from the hardware/ASIC, CAL information can also be spread across these two separate processors. As such, the host processor periodically gathers CAL information from the attached node.

CAL Response Packet

Figure 16:
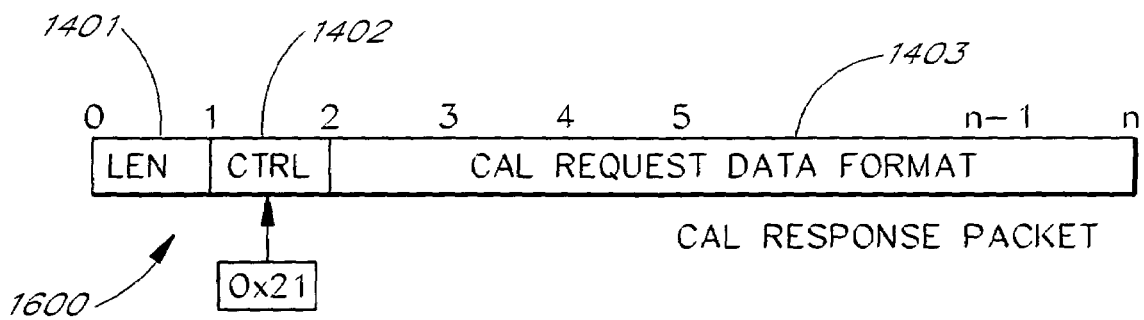
FIG. 16 is a block diagram showing a PLX CAL response packet.

FIG. 16 shows the format of a CAL response packet 1600, including the length field 1401, the control field 1402, and a CAL response field 1603. The control field 1402 has the value 0x21.

For the same reasons stated above, a CAL Response packet is sent from the hardware node to the attached host node. This response packet 1600 is sent in response to a preceding CAL request packet 1500.

Tx Status Packet (Single Channel, Speed)

Figure 17:
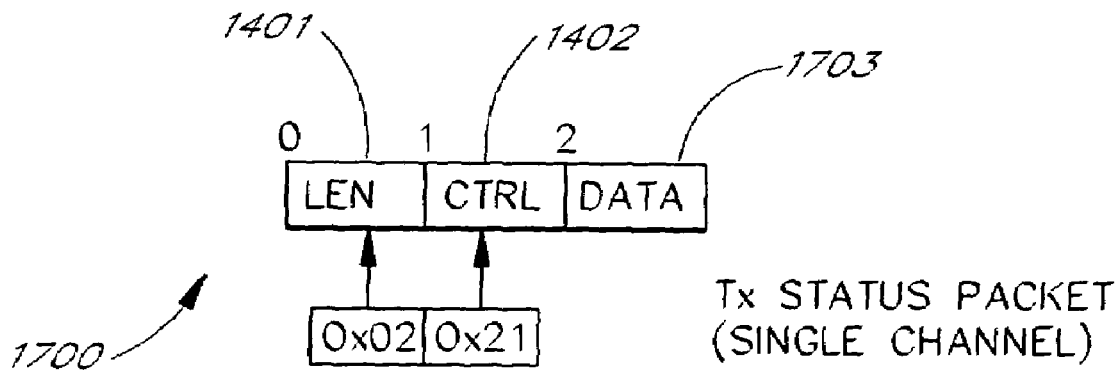
FIG. 17 is a block diagram showing a PLX single channel transmit status packet.
Figure 18:
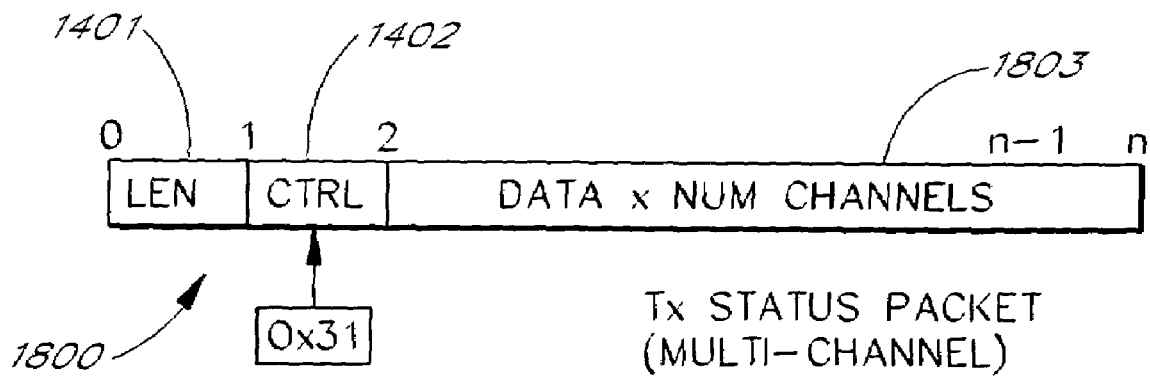
FIG. 18 is a block diagram showing a PLX multi-channel transmit status packet

FIG. 17 shows the format of a single channel CAL response packet 1700, including the length field 1401, the control field 1402, and a data field 1603. The control field 1402 has the value 0x21. FIG. 18 shows the format of a multi-channel CAL response packet 1800, including the length field 1401, the control field 1402, and a data field 1803. The control field 1402 has the value 0x31.

There are two forms of Tx Status packets. One form is for single channel, single speed applications and uses a control byte value of 0x21. The second form is for multi-channel, multi-speed solutions and uses a control byte of 0x31.

The single channel, single speed solution only has two Tx Buffers available, and the status of these two Tx Buffers is periodically given back to the host node via an internal PLX handshake. The purpose of these Tx Status packets it to close the loop regarding outstanding transmit events handed to the hardware from the host node. Oftentimes, the same value returned within a DACK packet will be handed to the host for information regarding this transmit event, however, many times the DACK is to an external PLX event, in which case the DACK value should not be handed to the host node. The DACK value is handed back to the host node when the host node originated the transmit request.

Accordingly, PLX uses duplicated the DACK status values shown below.

DACK Status Field Values Seen on the Medium
0x0=Receive buffer full (Failure)
0x2=Token used by node (Not passed to host)
0x3=Token NOT used by node (Not passed to host)
0x4=Token responding to "wake-up" request (Not passed to host)
0x9=Printer sequence numbering error
0xa=Printer unplugged error
0xb=Printer off-line error
0xc=Printer general error
0xd=Printer out of paper error
0xe=Printer unknown error
0xf=Success Values 0x9 through 0xe are DACK responses from a printer node. Printer response values are handed back to the host node unmodified.

Value 0xf is a successful DACK response and if the host originated the request, this value is also handed back to the host node unmodified.

Values 0x2 through 0x4 are DACK response values to external PLX command packets and should not be handed up to the host node.

The only strange status value is 0x0, which on the wire means the receiving node is busy and therefore cannot accept the packet. The hardware recognizes this situation and will retry this packet (more often than if it weren't busy) for a specified number of times. If the receiving node remains in a busy state for an unusually long amount of time, the packet is finally aborted and a "failure—0xf" response status is handed back to the host node. A value of 0x0 handed back to the host node means nothing. It is the default value of a transmit event that has not been completed and the host will wait until a non-zero status is placed in this field. A value of 0x1 is never returned on the wire. If a node receives a packet with erroneous data, it simple does not respond to the packet, and the transmitting node is required to re-transmit it. A value of 0x1 is only handed back to the host when a transmit packet has timed out and hit its maximum number of retries.

Below is a table showing the Tx Status values that are normally returned to the host node (Notice the values are not identical to the DACK response values in all cases):

Tx Status Data Field Values
0x0=No Tx Status for this Tx Buffer
0x1=Failure (Tx Timeout or Receive buffer full)

0x9=Printer sequence numbering error
0xa=Printer unplugged error
0xb=Printer off-line error
0xc=Printer general error
0xd=Printer out of paper error
0xe=Printer unknown error
0xf=Success This means the following DACK information is not handed up to the host node via an internal Tx Status packet.

Additional Tx Status Info not Given to Host
0x0=Receive buffer full (Failure)
0x2=Token used by node (Not passed to host)
0x3=Token NOT used by node (Not passed to host)
0x4=Token responding to wake-up request (Not passed to host)

The Tx Status byte is further broken up into two sections, each a nibble wide, to represent the two Tx Buffer status. The values in the Tx Status field with their respective meanings are shown below.

Tx Status Value Examples
0x0f=First Tx Buffer successfully sent
0xf0=Second Tx Buffer successfully sent
0xff=Both Tx Buffers successfully sent
0x1f=Second Tx Buffer failed, First Tx Buffer successful etc. . . .

Tx Status Packet (Multi-Channel, Speed)

The second form of Tx Status packet is for multi-channel, multi-speed solutions. The entire previous discussion regarding the Single Channel Tx Status packet and how it relates to DACK values, still apply. The difference being, the amount of data information enclosed within the multi-channel/speed Tx Status packet. The packet will basically contain a single previously defined status byte for each channel present. The result is multiple bytes of data, with each byte representing a single channel with two separate Tx Buffers.

Packet Timing, Spacing and Retrying

All packets presented for transmission on the medium 100 must adhere to strict timing requirements. These timing requirements are the rules that allow the system to operate smoothly and without collisions. Adherence to these rules must be strictly enforced for proper operation.

Under normal operation, an "active network server" is present on the system and arbitrates with all active nodes for access to the medium 100. The following assumptions apply to such an active state present on the medium 100. Inactivity on the medium 100 implies each node is in a sleep state and must go through the normal "listening" process before asserting as "active network server".

Furthermore, the PLX system is characterized by acknowledged handshake sequences. Acknowledge packets are to be returned within specified time intervals. Token packets are required before transmitting anything other than an acknowledge (DACK, LoGI, or Double LoGI) packet. The active network server is the only node that has the right to transmit Token or LIP packets. Client nodes only transmit payload and acknowledge packets.

Typical Packet Timing

Figure 19:
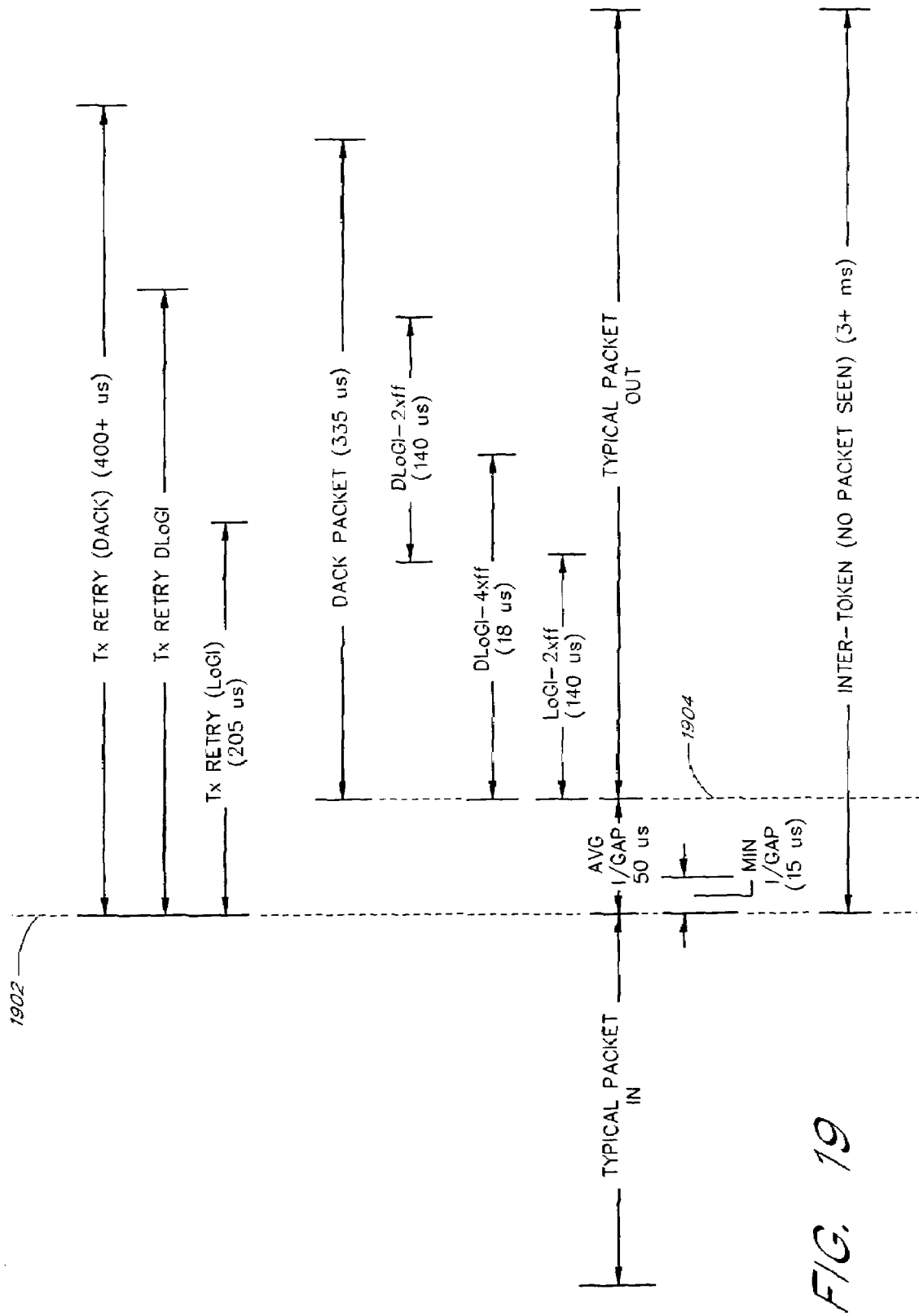
FIG. 19 is a timing diagram showing a PLX packet timing.

FIG. 19 is a timing diagram showing packet timing and spacing. Packet times are defined in relation to a first reference time 1902 and a second reference time 1904. The second reference time follows the first reference 1902 time by an Average inter-packet gap (I/Gap) of 50 us (microseconds).

The diagram shown above assumes timing for a system running at 350 kbps. All values other than the inter-gap timing should be adjusted as given in Table 4 wherein a superscript [1] denotes a time referred to the first reference 1902 and a superscript [2] denotes a time referred to the second reference 1904.

TABLE 4

Packet timing.

|  | 350 kbps | 700 kbps | 1.2 mbps | 1.4 mbps |
| --- | --- | --- | --- | --- |
| Min I/Gap[1] | 15 us | 15 us | 15 us | 15 us |
| Avg I/Gap[1] | 50 us | 50 us | 50 us | 50 us |
| Preamble | 130 us | 65 us | 38 us | 33 us |
| loGI Packet[2] | 140 us | 70 us | 40 us | 35 us |
| DLoGI Packet[2] | 185 us | 92 us | 54 us | 46 us |
| DACK Packet[2] | 335 us | 168 us | 98 us | 84 us |
| TxRetry LoGI[1] | 205 us | 103 us | 61 us | 52 us |
| TxRetry DACK[1] | 400 us | 200 us | 117 us | 100 us |
| TxRetry DloGI[1] | 320 us | 160 us | 94 us | 80 us |
| Inter-Token[1] | 3+ ms | 3+ ms | 3+ ms | 3+ ms |

Under normal conditions, typical packet timing requires the node receiving the packet to respond within a predetermined amount of time. This response time is consistent with all packets except for the LoGI/Double LoGI acknowledge packet. Thus the two cases for packet timing are 1) LoGI/Double LoGI response and 2) All other responses.

Other Packet Timing

Nodes transmit a packet back to the node from which the payload packet originated, within a certain amount of time, with the exception of burst packets and acknowledge packets, which don't require a response packet. Response packets can be of the types: DACK packet, LoGI packet, or Payload packet.

Response packets adhere to the inter-gap spacing requirements shown above in FIG. 19. Minimum response time is typically greater than 15 microseconds, maximum response time typically should not exceed 50 microseconds.

If a transmitting node fails to receive an acknowledgement of the previous transmit, it must begin a retry process in order to increase reliability of delivery. This retry process typically begins after the longest possible acknowledge sequence or the length of a DACK packet plus the longest possible inter-gap spacing, or approximately 400 microseconds at 350 kbps.

Node Specific Information

Each node comes configured with a certain amount of information, which characterizes that specific node. PLX nodes require this minimal amount of information in order to fully function on the system.

Unique Identification, Addressability, and Globally Unique Identification (GUID)

When a PLX node is plugged into an electrical system, it is immediately ready for action. Each node comes with a burned-in serial number, of which the least significant 28 bits are used as a run-time address for the node. This doesn't ensure global uniqueness, but it does limit the possibilities since your chances of finding two nodes with conflicting addresses are one in 268 million. This larger run-time address decreases throughput slightly, but it enhances plug-and-play capability and ease of use, while simplifying the system (since nodes come pre-configured from the factory).

Universal Context and Node Profile Object

CEBus/Generic CAL compliant nodes have, at a minimum, a Universal Context and a Node Control Object with associated instance variables (IVs). PLX deviates from the CEBus/Generic CAL defined reporting conditions and node addressing, (both of which are related to the PLX client/server architecture as opposed to the CEBus/Generic CAL peer-to-peer architecture. Thus, PLX re-defines the Universal Context/Node Control Object as the Node Profile Object with slightly different IV descriptions. Again, each PLX compliant node contains the instance variables associated with the Node Profile Object.

Each node is responsible for containing a pre-defined set of attributes that identifies, and places the node within a group of node types with commonly known attributes. The Node Profile Object information for each node is preferably hard-coded into non-volatile memory in the node. The information is sent to the server upon request. A Node Profile Object is made up of a list of instance variables. Each PLX node contains, at least, a Universal Context (0x00), a Node Profile Object (0x01) and the specified instance variables (IV) shown in Table 5 below (where R/W indicates read/write).

TABLE 5

| IV | R/W | Type | Name | Description |
|---|---|---|---|---|
| o | R/W | d | context_list | Contains a list of all contexts supported by this particular node |
| w | R/W | b | power | Controls the global power to this specific node |
| s | R | d | serial_number | Contains a manufacturer assigned product serial number the least significant 8 bytes of which is also the devices GUID (Globally Unique Identification) (18 bytes) |
| n | R | c | manufacturer_name | Manufacturer specific name (18 byte MAX) |
| m | R | c | manufacturer_model | Manufacturer specific model (18 byte MAX) |
| c | R | n | product_class | As per the Generic CAL specification (2 ASCII bytes) |
| v | R | c | conformance_level | String identifying the current level of this particular devices CAL/PLX support. (4 ASCII bytes) |
| h | R/W | d | area_address | Used for routing and network identification purposes (1 byte). This IV is always globally READABLE (along with the network_name). |
| a | R/W | d | unit_address | Node ID used for directly addressed packets (4 bytes) |
| t | R | d | network_class | Defines the network class of the device and will be used to overwrite the most significant nibble of the devices MAC address to prioritize token disbursement. Below are the priorities and associated values in relation to network type:<br>0x01 Video System I<br>0x02 Video System II<br>0x03 Audio System I<br>0x04 Audio System II<br>0x05 Reserved<br>0x06 Security System<br>0x07 Utility Monitoring System<br>0x08 HVAC System<br>0x09 Lighting System<br>0x0a Appliance System<br>0x0b Data Networking System<br>0x0c Reserved<br>0x0d Reserved<br>0x0e Reserved<br>0x0f Global System |

TABLE 5-continued

| IV | R/W | Type | Name | Description |
|---|---|---|---|---|
| f | R | d | buffering | Size of the receive buffer in bytes. |
| x | R | c | product_rev | Product revision level. (4 ASCII bytes) |
| b | R/W | d | dynamic_mask | Includes some dynamic node functions that can be characterized by a single bit.<br>Bit 0: Promiscuous Mode<br>  1 = enabled<br>  0 = disabled<br>Bit 1: MAC Server<br>  1 = MAC server<br>  0 = not MAC server<br>Bit 2: Rules/Database Server<br>  1 = Database server<br>  0 = not Database server<br>Bit 3: Inactive/Active Device (polled/ing)<br>  1 = Currently Active<br>  0 = Currently Inactive |
| u | R | d | static_mask | Includes some static node functions that can be characterized by a single bit.<br>Bit 0: Remote Winkability<br>  1 = remote capable<br>  0 = remote incapable<br>Bit 1: Authentication Capable<br>  1 = authenticatable (requires NV Mem)<br>  0 = not authenticatable<br>Bit 2: Complex Method Support<br>  1 = Complex Methods Supported<br>  0 = Complex Methods Unsupported<br>Bit 3: Diffie/Hellman Max Key size<br>  1 = 512 bits<br>  0 = 256 bits |
| y | R | d | statistics | A statistics table of all pertinent counters kept by this node with the following format:<br>Byte 0: Table version<br>Byte 1: Bit mask counter |
| r | R/W | d | reset | Allows this node to be reset. Writing a value of 0x52 'R' to this instance variable initiates a reset function |
| l | R/W | b | sleep | Allows the node to go on or off-line for service or manual control |
| G | R/W | d | group_address_list | A length preceded list of all group addresses supported by this node. Therefore the first 16-bit value is the number of group addresses to follow. |
| j | R/W | d | authentication | Authentication ID value passed to the node upon configuration and initialization. |
| i | | | | XOR'd cipher array used during Diffie-Hellman |
| | | | | Non-XOR'd cipher array used during Diffie-Hellman |
| k | | | | Public Key |
| g | | | | Public Generator |
| d | | | | Random Number |
| q | R/W | c | network_name | Allows a node to be placed within a specified secure network by the user with an understandable name. |

TABLE 5-continued

| IV | R/W | Type | Name | Description |
|----|-----|------|------|-------------|
| e | R/W | c | product_name | Allows a node to be referenced by a logical name. |
| p | R/W | c | product_location | Allows a node to be placed within a specified location by the user with an understandable name. |
|   | R/W | d | *system_id_list | A list of all the assigned system ID'S within this environments domain. |
|   | R/W | c | *last_log | Last logged event |

Table 6 below lists client IVs that are stored, managed, and maintained by the "application server" and exist within a database in the application server. Therefore, the client need not be concerned about storing or providing information regarding these Ivs.

Also part of the universal context for the master case only, is a rules object (0x03) which uses the data memory object defined by CAL, as well as some unique IVs defined for our purposes. Below is a description of this particular object:

TABLE 6

| IV | R/W | Type | Name | Instance Variable Description |
|----|-----|------|------|-------------------------------|
| r | R/W | d | current_rule | Contains the active rule pointed to by the current index variable. |
| C | R/W | n | current_index | Contains the index (handle) of the rule shown in the current rule variable. |
| s | R | n | Rule_length | Contains the length of the rule shown in the current rule variable. |
| m | R | n | Maximum_index | Contains the maximum index value that can be placed within the current index variable (the minimum is always zero '0') |
| p | R/W | d | Previous_value | Contains a string of previous values for each IV mentioned within the corresponding rule. Each IV is length preceded and NULL terminated/padded. |
| l | R | n | Previous_value_length | The max length of the previous_value string. |
| n | R/W | c | Rule_name | The logical name assigned to this particular rule. Used to make the user-interface more readable. |
| z | R/W | n | Status | Contains the status of the current rule. If it is zero, then the rule is in effect, if its non-zero, one of the IV's pointed to by this rule is non-active (off line). |

The rules object allows remote nodes a method for adding (inheriting), deleting (disinheriting), and viewing (getArray) rules within the rules list.

By providing a universal context, the network is able to contain a node list. The node is able to contain a context list. The node is able to have an object list for each context. Given the object list, the node is also able to contain specific instance variables. Many of these lists are specified within the Generic CAL specification (other than the network and node lists).

When requested, a node responds with specific portions of the Node Profile shown above for its particular configuration. The Node Profile allows a means to auto-configure particular nodes that are unique within the network under consideration. Duplicate nodes can provide another level of configuration in order to be uniquely identified.

Security

Security is realized through a two-step process. Initially, each node that powers up onto the network is immediately placed within the public network. The public network is the default network assignment for all nodes, and they are visible by all other public nodes and their authentication ID is assigned to NULL. Once a node has become secure through the key-exchange process described below, its authentication ID changes to a value dictated by the encryption array. As each node is assigned to this private/secure network, they are given a 32-byte encryption array, from which they encrypt or decrypt subsequent packets. This is accomplished through a key exchange technique known as Diffie-Hellman, using a 256-bit key. Use of an efficient exponentiation algorithm reduces the time needed to compute the values used in the key exchange. Once the encryption array is stored within the memory of each node on the network, encryption and decryption are performed. In one embodiment, encryption an decryption are use a stream-ciphering technique based on an exclusive-or with feedback. Other algorithms may be used, including, for example, DES, RC4, MD5, and the like.

Additional Features

Reporting Condition Specifics

Since reporting conditions are handled differently under PLX than they are under CAL, the PLX methods for handling rules will be shown here. These changes were implemented to address many of the limitations inherent within a strict CAL reporting condition methodology. The differences are shown in Table 7 below.

TABLE 7

Advantages of PLX over Generic CAL.

| CEbus CAL | PLX |
|-----------|-----|
| 1 rule per object | multiple rules per object |
| 1 active IV per object | multiple active IVS per object |
| simple rules only | simple and complex rules |
| rigid rules | flexible rules |

Since PLX rules exist on the server, as opposed to distributed rules under Generic CAL, PLX is more powerful in how it handles rules by virtue of its single, powerful engine. PLX client nodes each report changes in their IVs to the server. This is true of any IV change. When the server sees an IV change, the server looks at the specific object/IV combination that changed, the server looks at its list of rules, and the server tests each rule for validity. Therefore, each object is configured to contain the following two IVs, which handle each of the rules created for the specified object and associated IVs as listed below.

| IV | R/W | Type | Name | Context Function |
|---|---|---|---|---|
| R | R/W | d | rules_array | Contains an array of pointers of indices into the masters rules list (rules object). Each entry signifies a complete rule to be tested when an IV within this object is modified. |
| P | R/W | n | number_of_rules | Contains the number rules within the rules_array. |

The actual report_header, and report_address, report_condition and previous_value variables are each kept within the rule pointed to by the array. The calling routine simply passes this pointer (or index) to the rules engine, and the rules engine will parse the appropriate information it needs from the masters rules list.

Non-Volatile Memory Usage

Each node contains the Node Profile information in a static memory location such as ROM. Additionally, nodes may store other information such as the authentication key in non-volatile memory, however, this is an option, and is not required of any PLX compliant node. Other optional memory requirements include routing information and other dynamic tables.

Client Change Notification

Client nodes typically report a state change condition to the application server node. This means, that even if the application server tells a client to change its state, the client reports back to the application server that its state has changed. This reduces the chance of problems wherein the application server database is not synchronized with the actual client nodes' variable(s).

This is desirable since the application server contains the reporting conditions and rules associated with client variable changes. The clients are less intelligent in this regard, and so they should notify the application server of appropriate changes.

The application server typically does not update its database variables pertaining to a specific client node, until after receiving validation from that client node, notifying the "application server" that the client has changed state.

Multiple Channels

Figure 20:
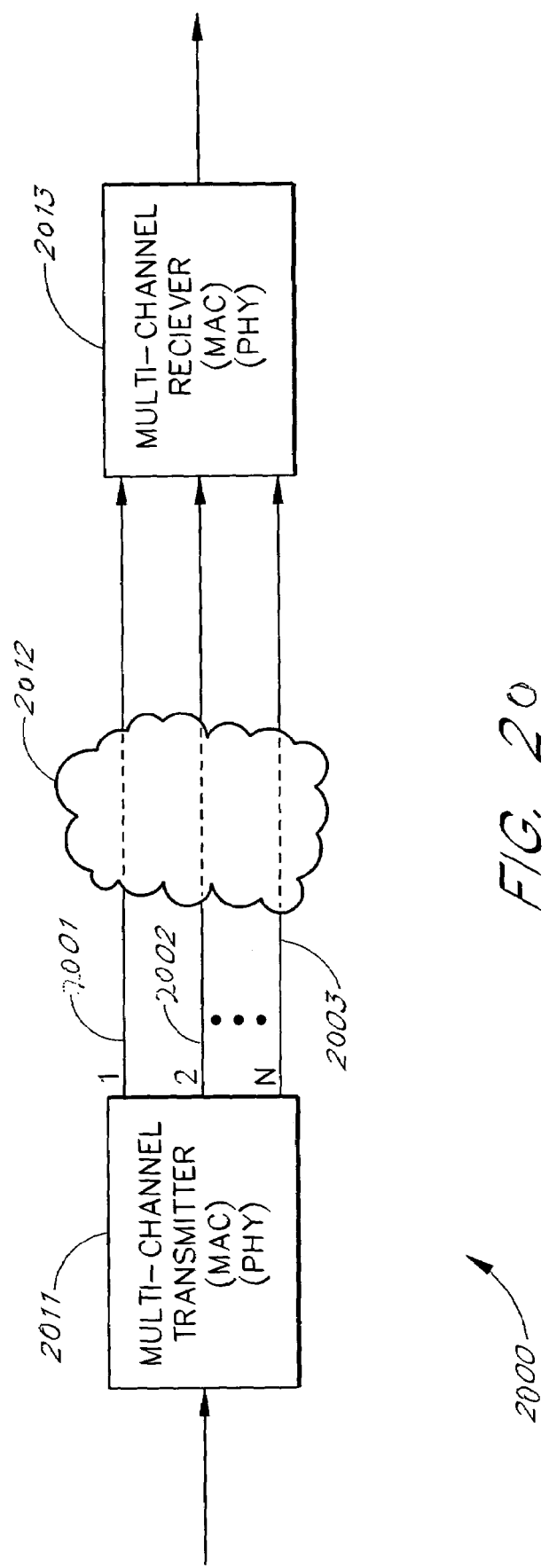
FIG. 20 is a block diagram showing a multi-channel medium connecting a multi-channel transmitter to a multi-channel receiver.

In one embodiment, the network medium is configured or used as a multi-channel medium. FIG. 20 is a block diagram showing a multi-channel medium 2012 connecting a multi-channel transmitter 2011 to a multi-channel receiver 2013. The multi-channel medium 2012 is configured to provide n separate data channels 2001-2003 shown as a first channel 2001, a second channel 2002, and an n-th channel 2003. The multi-channel transmitter 2011 provides a separate data output to each channel 2001-2003 and each of the multi-channels 2001-2003 is provided to a separate data input of the multi-channel receiver 2013. In one embodiment, the multi-channel transmitter 2011 receives a single logical input data stream and separates the input data stream into n data streams, one stream for each of the n channels. Similarly, the multi-channel receiver 2013 receives the data from the multi-channel transmitter 2011 on n data streams and combines the received data into a single logical output stream. In one embodiment, the multi-channel transmitter 2011 and the multi-channel receiver 2013 each includes a Media Access Control layer (MAC) portion and a Physical layer (PHY) portion.

The multi-channel transmitter 2012 and multi-channel receiver 2011 can be used, for example, in the printer 110, the computers 103 and 104, and the security lighting system 118 shown in FIG. 1. The multi-channel medium 2012 can be, for example, the network medium 100 shown in FIG. 1. The multi-channel 2012 medium can be configured physically as separate channels, such as, for example, separate wires, cables, fibers, etc. The multi-channel 2012 medium can also be configured logically as separate channels, such as, for example, by frequency division, code division, time division, and the like.

Figure 21B:
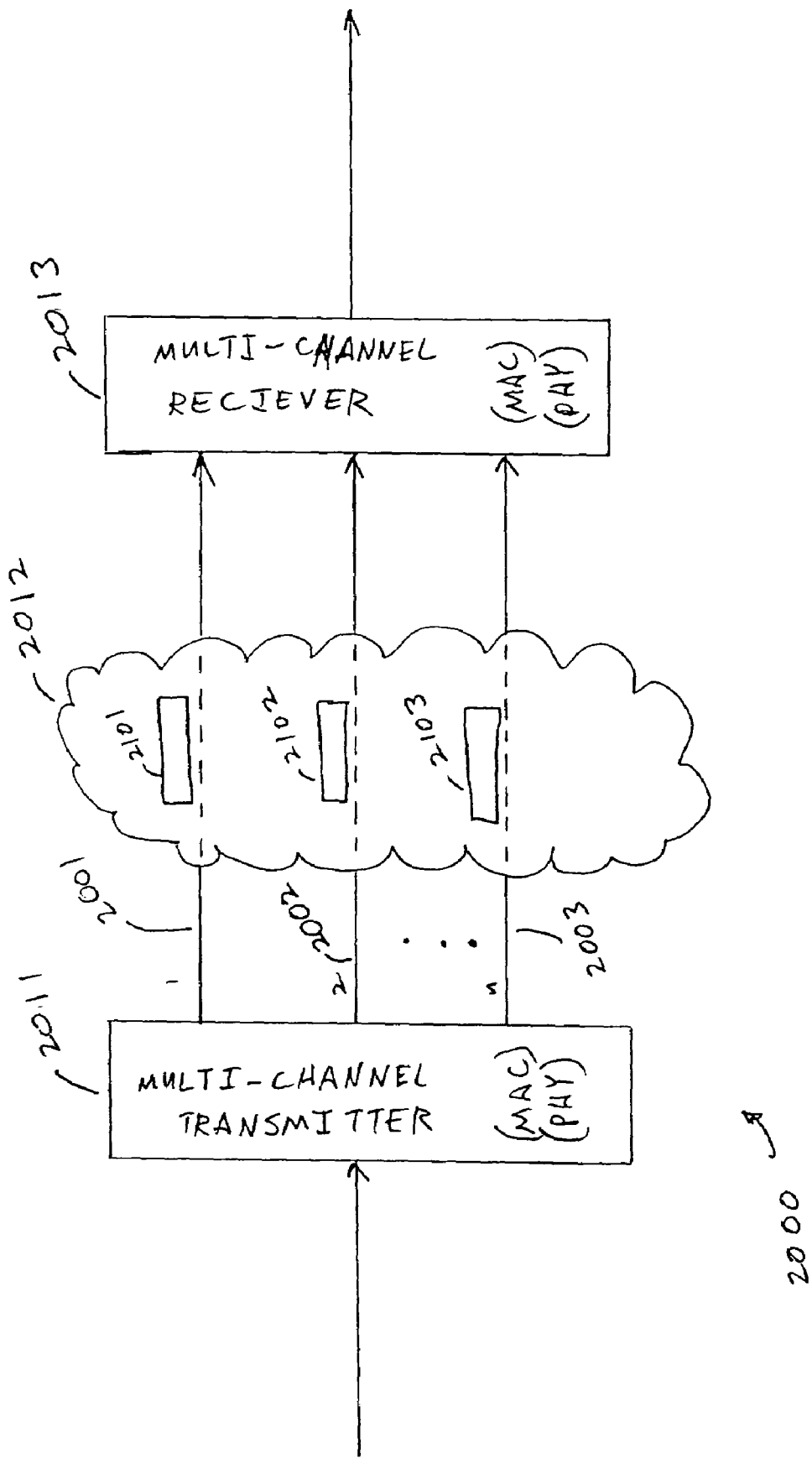
Figure 21C:
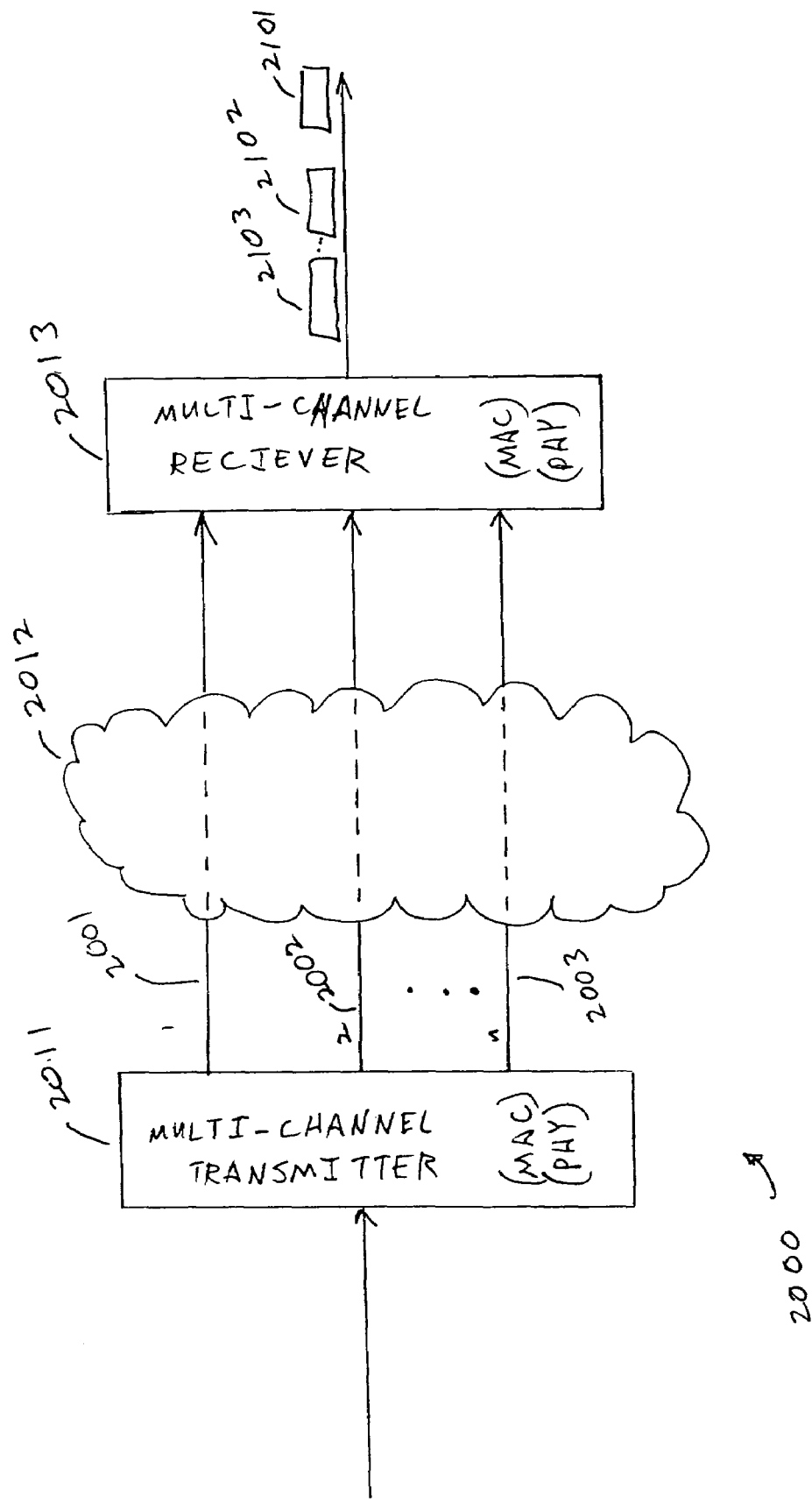

In one embodiment, the multi-channel transmitter 2011 is configured to receive data in packets and packet fragments, such as, for example, ethernet packets, and the multi-channel transmitter 2013 is configured to output data in packets. FIG. 21, comprising FIGS. 21A-21C, shows transmission of packets over the channels 2001-2003 by sending each packet over a separate channel. In FIG. 21A a sequence of n packets, shown as packets 2101-2103 are provided in the data input stream to the transmitter 2011. The transmitter 2011 separates the packets such that: the first packet 2101 is sent over one channel, such as, for example, the first channel 2001; the second packet 2102 is sent over one channel, such as, for example, the second channel 2002; and the n-th packet 2103 is sent over one channel, such as, for example, the n-th channel 2003.

Figure 22B:
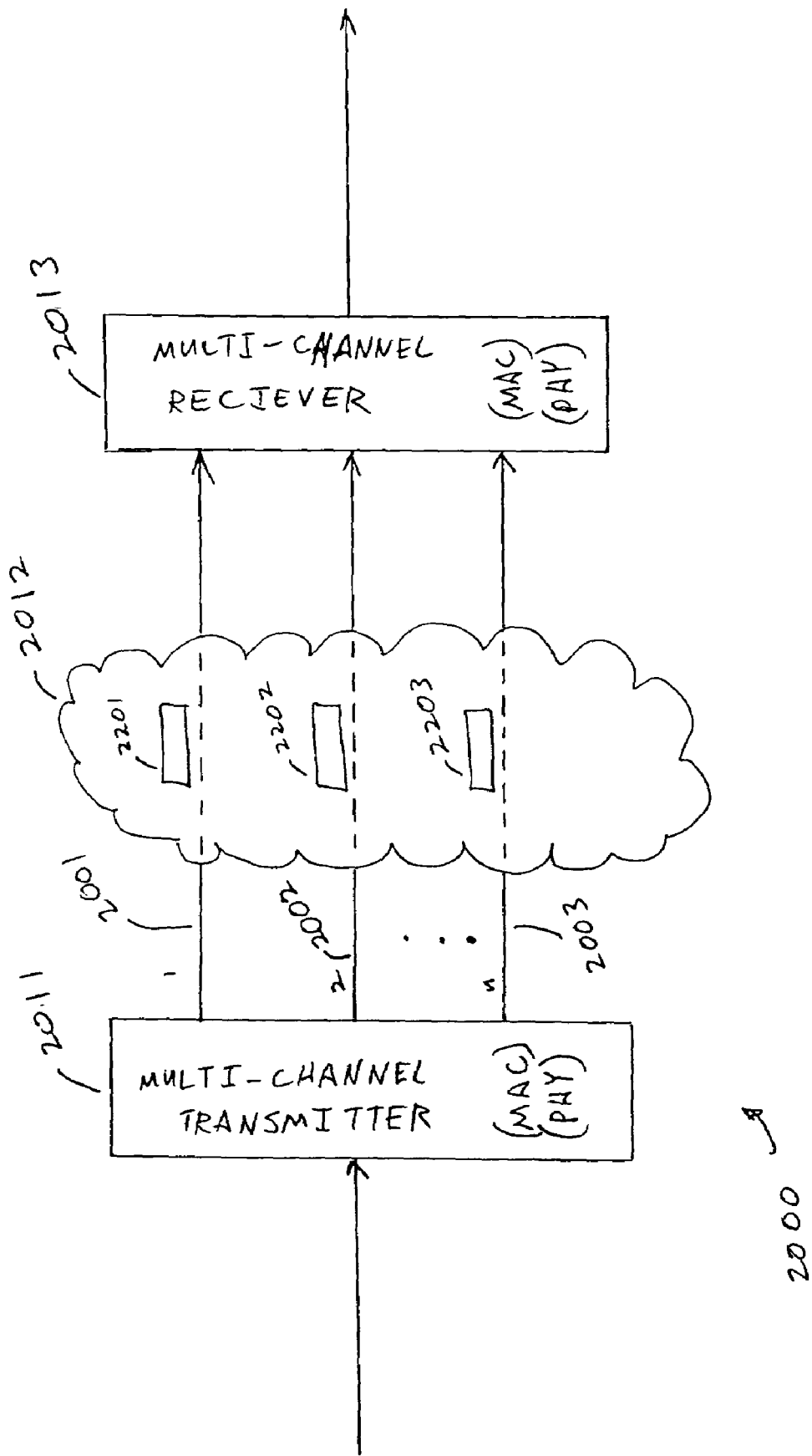

One embodiment includes a system wherein an input packet is broken up into separate pieces (byte fragments or bits) and the pieces are transmitted over the channels 2001-2003, as shown in FIG. 22. FIG. 22, comprising FIGS. 22A-22C, shows decomposition of a packet into multiple pieces, the pieces are sent over channels of the multi-channel medium 2012 and reassembled into a received packet at the receiver. In FIG. 22A, an input packet 2207 is provided in the data input stream to the transmitter 2011. The transmitter 2011 separates the packet 2207 is separated into a plurality of smaller packets 2201-2203 such that: the first smaller packet 2201 is sent over one channel, such as, for example, the first channel 2001; the second smaller packet 2202 is sent over one channel, such as, for example, the second channel 2002; and the n-th smaller packet 2203 is sent over one channel, such as, for example, the n-th channel 2003. At the receiver 2013, the smaller packets 2201-2203 are reassembled to reconstruct the packet 2207 at the output of the receiver.

Typically, the smaller packets 2201-2203 include fields such as length fields, address, fields, payload fields, and error-detection fields (e.g. forward error correction fields, CRC fields, and the like). The various pieces of the packet 2207 are carried in the payload fields of the smaller packets 2201-2203.

In the present discussion, the term fragment will be used to refer to the packets carried on the channels 2001-2003 regardless of whether each fragment correspond to one of the packets 2101-21-3 or the smaller packets 2201-2203. In one embodiment, the fragments are PLX packets as described herein.

FIG. 23 is a block diagram showing a single-channel receiver 2313 connected to the multi-channel transmitter 2011. The single-channel receiver 2013 receives one of the channels 2001-2003 provided by the multi-channel medium 2012. The single-channel receiver 2313 typically provides lower throughput than the multi-channel receiver 2013. The use of the single-channel receiver 2313 in connection with the multi-channel medium 2012 is desirable, for example, in situations when the typically lower cost and typically smaller size of the single-channel receiver 2313 are more desirable than the greater throughput capabilities of the multi-channel receiver 2013. The multi-channel transmitter 2011 can send data to the single-channel receiver 2313 by knowing which channel the single-channel receiver 2313 is listening to and sending data to the single-channel receiver 2313 on that channel. The multi-channel transmitter 2011 can also send data to the single-channel receiver 2313 by transmitting on all of the channels 2001-2003.

Figure 24B:
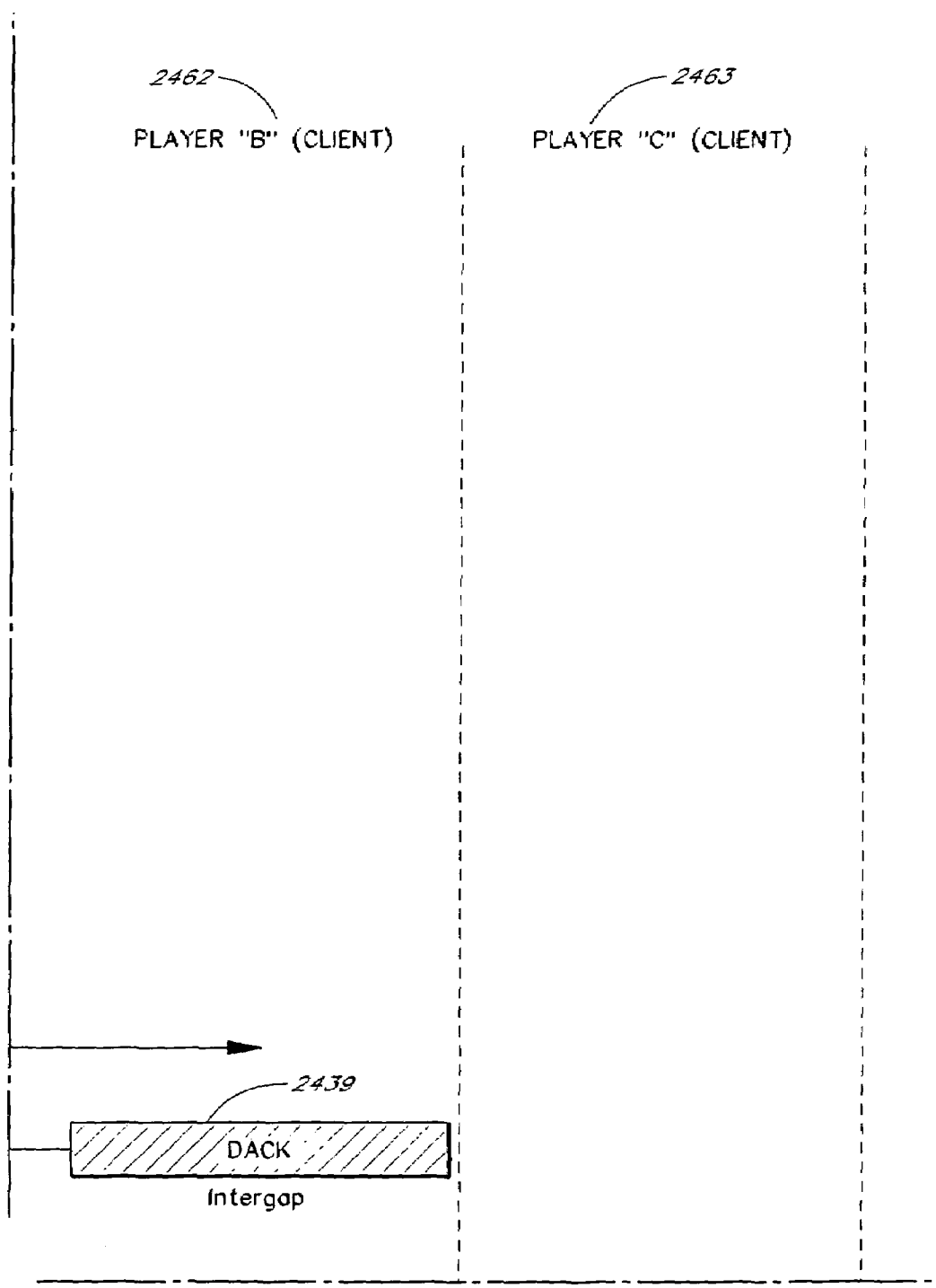
FIG. 24, consisting of FIGS. 24A-D, is a flow diagram showing transactions in one embodiment of a PLX system suited for with single-channel or multi-channel transmitters and receivers.
Figure 24C:
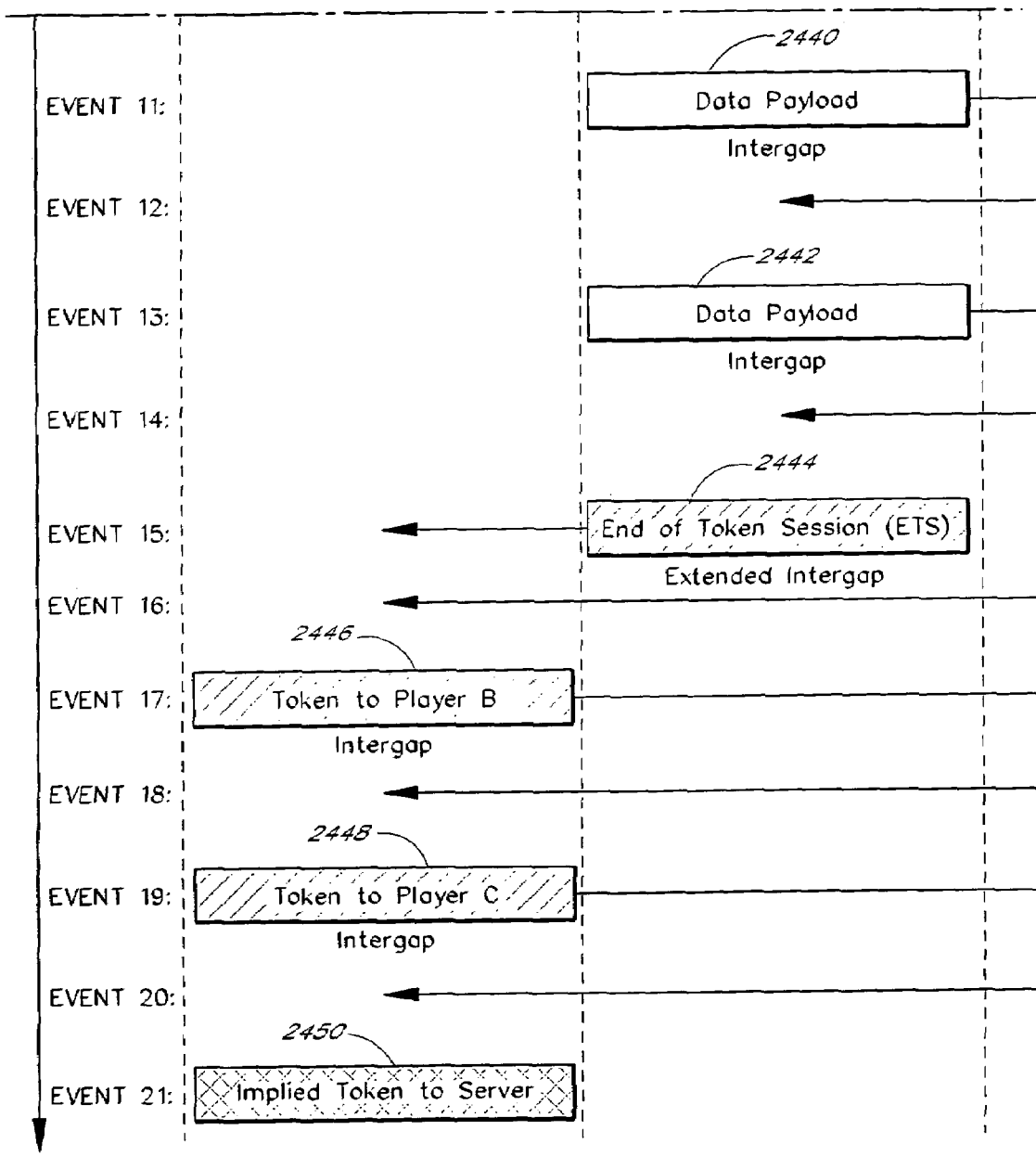
Figure 24D:
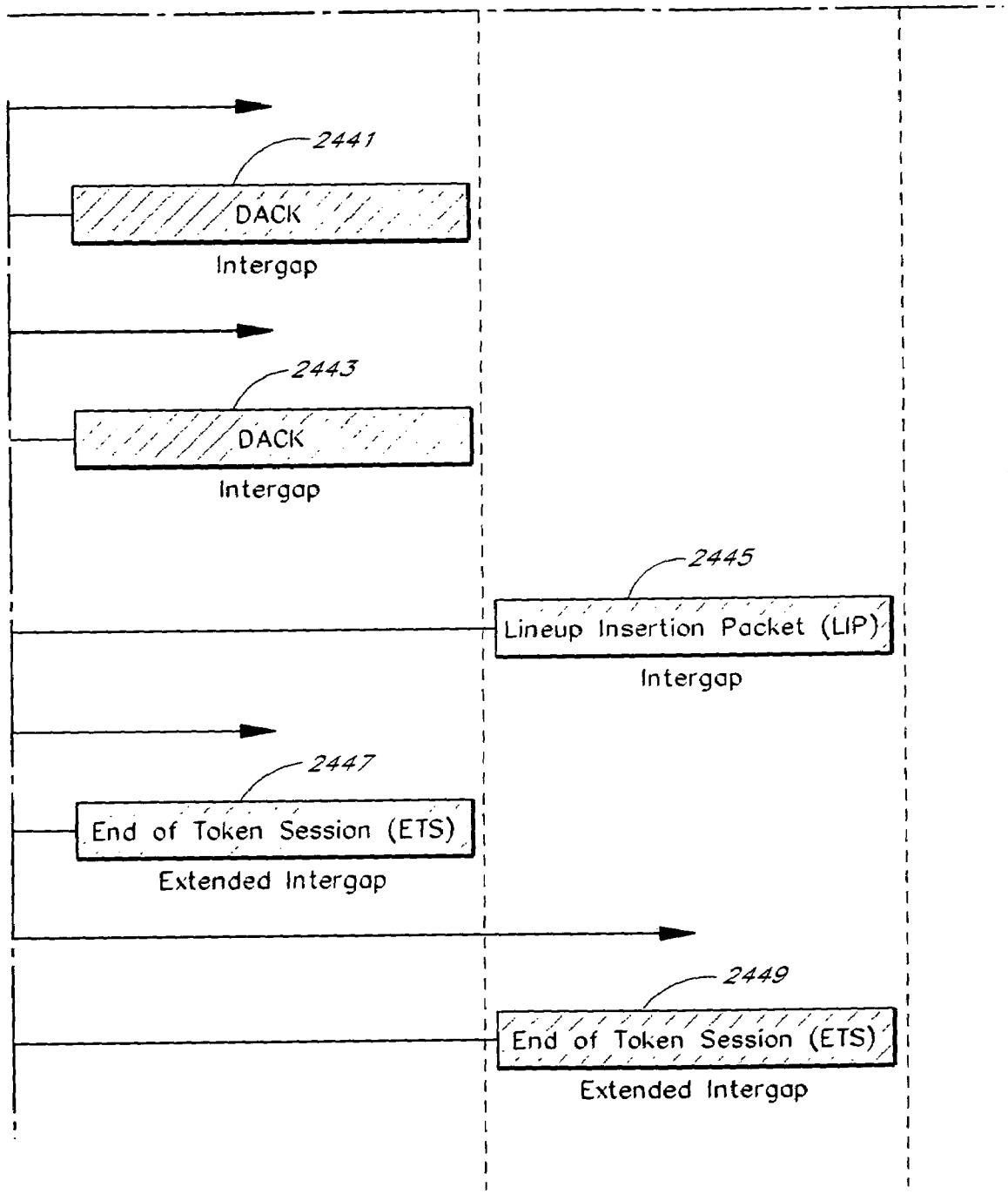

FIG. 24 is a flow diagram showing packet transactions in one embodiment of a PLX system suited for with single-channel or multi-channel transmitters and receivers using the multi-channel medium 2012. FIG. 24 shows a sequence of 21 shown as events 2401-2421. The events 2401-2421 proceed sequentially in time from the first event 2401 through the last event 2421. Each of the events 2401-2421 is associated with a PLX packet transaction between a manager (server) 2460, a first client 2461, a second client 2462, and a third client 2463. The transactions shown FIG. 24 can be used with a single channel medium or with a multi-channel medium.

The events 2401-2421 illustrate, by way of example, the types of transactions that can occur during one pass through the lineup card. Before the first event 2401, it is assumed that the server 2460 is the active server, that the first client 2461 and the second client 2462 exist on the lineup card maintained by the server 2463, that the third client 2463 is not yet on the lineup card, and that the server is at the "top" of the lineup card.

In the first event 2401, an implied token 2430 is sent from server 2460 to itself. This token is not sent on the network medium, but is merely used internally by the server 2460 to indicate that the top of the lineup card has been reached, and that it is the server's "turn" to send data packets (as opposed to control-type packets such as token packets) if the server 2460 has any data packets to send.

In the example shown in FIG. 24, the server has three data packets to send to the first client 2461. Accordingly, in the second event to 4028, a first data packet 2431 is sent from the server 2460 to the first client 2462. After sending the data token 2431, the server 2460 waits, during an inter-gap period, for an acknowledgement from the first client 2461. In the third event 2403, the client 2461, having received the first data packet 2431, responds to the server by sending a DACK packet 2432 to the server 2460, thereby acknowledging receipt of the packet 2431.

The pair of events 2402 and 2403 is a complete packet transmission and handshake between the server 2460 and the first client 2461. Transmission of the data packet 2431 is completed when he server 2460 receives the DACK packet 2432 indicating that the packet 2431 was received by the client 2461.

In a pair of events 2404 and 2405, the server 2460 sends a second data packet 2433 to the client 2461 and the client 2461 responds to the server 2460 with a second DACK packet 2434. Finally, in a pair of events 2406 and 2407, the server 2460 sends a third data packet 2435 to the client 2461 and the first client 2461 responds with a third DACK packet 2436.

After sending the third packet 2435 (and receipt of the third DACK 2436) the server 2460 has completed its data transmissions, and is ready to temporarily relinquish control of the medium to other clients, thereby allowing the clients to send data to the server or to other clients. The server 2460 temporarily relinquishes control to each client on the lineup card according in the order the clients are listed on the lineup card. As indicated above, in the example illustrated by FIG. 24, the first client 2461 is the first node listed on the lineup card. Accordingly, in an event 2408, the server 460 sends a token packet 2437 to the client 2461. Receipt of the token packet 2437 by the first client 2461 begins a token session on the client first 2461 and gives temporary control of the medium to the client 2461, thereby allowing the client 2461 to send data back to the server or to other clients in the network.

Figure 27:
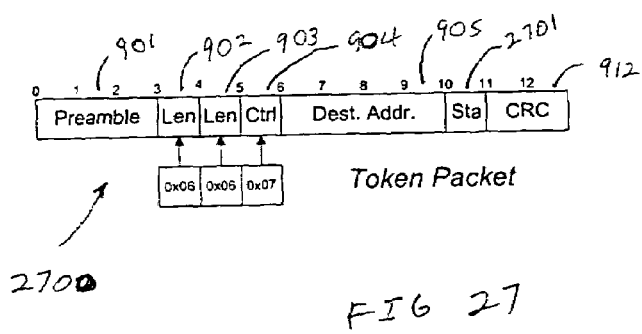
FIG. 27 is a block diagram showing a PLX QoS Token packet.

The first token packet 2437 can either be a basic token packet 1000 as shown in FIG. 10 or a QoS token packet 2700 shown in FIG. 27. Typically, the first token packet 2437 is a QoS token packet 2700. the QoS token packet 2700 includes the packet-count field 2701 that specifies the maximum number of packets the second client 2461 is allowed to send during the token session. This limits the length (in time) of the token session, and thereby assures that the first client 2461 will not tie up the network for an unacceptably long period of time. Limiting the length of token sessions advantageously allows the server 2460 to guarantee a maximum latency time between sessions for nodes that need frequent access to the network medium, such as, for example, nodes that are sending time-sensitive data, nodes that are sending audio data, video data, real-time measurement data, and the like.

In the example shown in FIG. 24, the first client 2461 has three data packets to send to the second client 2462. Therefore, in a pair of events 2409 and 2410, the first client 2461 sends a first data packet 2438 to the second client 2462 and the second client 2462 sends a DACK packet 2439 response back to the first client 2461 to acknowledge receipt of the data packet 2438. Similarly in a pair of event 2411 and 2412 the first client 2461 sends a second data packet 2440 to the second client 2462 and the second client 2462 responds with a DACK packet 2441. Finally, in a pair events 2413 and 2414, the first client 2461 send a data packet 2442 to the second client 2462 and the second client 2462 responds with a DACK packet 2443.

The first client 2461 can hold the token (thereby maintaining the token session) either until it has no more data to send or until it has reached its the maximum packet count provided in a QoS token packet 2700, which ever is shorter. In either case, when the first client 2461 is ready to end the token session and thereby relinquish control of the medium, the first client 2461 sends an End of Token Session (ETS) packet 2444 to the server 2460. The sending of the ETS packet 2444 corresponds to the event 2415. After receiving the ETS packet 2444, the server 2460 waits, and listens to the medium, for an Extended InterGap (XIG) period. During the XIG following an ETS, nodes that wish to be inserted onto the lineup card maintained by the server 2460 can request insertion by sending LIP packets to the server 2460.

For example, in FIG. 24, in an event 2416, the third client 2463 sends a LIP packet 2445 to the server 2460. Upon receipt of the LIP packet 2445 the server 2460 adds the third server 2463 to the end of its lineup card.

After receipt of a LIP packet 2445 or the expiration of an XIG, the server 2460 initiates the next token session. Accordingly, in FIG. 24, the event server 2460 sends a token packet 2446 to the second client 2462 (because second client 2462 is the next client on the lineup card). The second client 2462 receives the token packet 2462 and begins a token session. In FIG. 24, the second client 2462 has no data to send and therefore in an event 2418 ends the token session by sending an ETS packet 2447 to the server 2460.

Upon receiving the ETS packet 2447 the server waits for an XIG period. After the XIG, the server 2460 advances to be next node on the lineup card. In this case, the next node on the lineup card is the third client 2463. So, during the event 2419 the server 2460 sends a token packet 2448 to the third client 2463 to begin a token session. The third client 2463, having no data to send, ends the token session by sending an ETS packet 2449 to the server 2460. Again resulting in an XIG.

After the XIG, the server, having reached the end of the lineup card, sends itself an implied token 2450 and the lineup card process begins anew.

The use of ETS packets provide PLX with lower latency selection from the active server. Self-assertion onto the lineup card is improved by reducing arbitrary recovery wake-up and back-off incidents.

In one embodiment PLX includes the capability to give priority to certain devices, to provide devices with access to the low latency lineup card, to enable dynamic token sessions sizes, and to allow unacknowledged responses. Since at any given time, the PLX system is designed to use a single active server, PLX has the ability to control access to the medium this control includes: at what intervals with regards to both time and frequency multiplexing; how many times; how much bandwidth to allocate per device; and for how long a node can use the medium. The active server grants access to the medium by sending a token packet to the node. The node returns access to the server by sending an ETS packet. The active server decides which node will get access by sequentially working through the lineup card. As devices are inserted into the lineup card, information is exchanged that allows the active server to recognize, understand, and cater to the specific needs of each device.

In one embodiment, the active server grants access by sending a Quality of Service (QoS) token packet. The QoS token packet includes a count field that tells the receiving node how many packets it can send during the token session before it must end the token session (by sending an ETS packet). The count value is dynamically set by the server and can be changed as often as needed, depending on the characteristics of the system.

In one embodiment, Quality of Service (QoS) is improved by splitting the lineup card into two separate lineup cards. The first lineup card, called the Low Latency Queue (LLQ) card, is a high-priority card used by low latency devices (e.g. audio and video devices). The second card, called the High Latency Queue (HLQ) card, is a low-priority card used by devices that do not require low latency (e.g. printers, computers doing basic file transfers, etc.). In one embodiment, the HLQ can further pace token distributions through a "Token Choke" mechanism, which alerts the active server of the devices request to receive tokens at less than optimal intervals. The active server progresses through all devices on the LLQ card before polling the next device on the HLQ card. On each complete pass through the LLQ card, the server polls one device from the HLQ card. This allows the active server to provide guaranteed time slots to devices needing a minimum latency to operate properly. The active server can adjust for a given device type, allowing audio or video stream data to be sent along with lower priority data. The active server is capable of controlling the QoS requirements of the system since it maintains and holds real-time information regarding each devices requirements.

As illustrated in FIG. 24, in one embodiment, the active server provides efficient insertion into the lineup card by polling the active devices (by giving them token for a predefined period of time). Each device (node) returns the token by sending an ETS packet. The ETS packet tells the server whether the device used the token or not, and it tells the rest of the sleeping devices on the system that they can now insert (transmit a LIP packet) immediately following the ETS packet. The active server allows an Extended InterGap (XIG) space after each ETS. During the XIG the server listens for LIP packets for an optimally small period of time by looking for the preamble of a "Datagram", which indicates the successful detection of a valid preamble sequence (meaning a packet is on it's way). ETS packets are sent on a relatively frequent basis to reduce contention. To further prevent contention, the nodes can use a random back-off count. The back-off count tells the node to ignore a specified number of ETS packets before attempting to send a LIP packet.

Although not shown in FIG. 24, PLX also provides a burst mode. In burst mode, fragments are sent back-to-back without waiting for a response (that is, without waiting for a DACK). Burst mode allows information to be sent in a timely, repetitive manner, while optimizing throughput. Burst mode sessions are terminated by an ETS packet.

Unacknowledged transmission (burst mode) of multi-node destined packets is also provided. A broadcast or group address packet can be sent without a DACK response. This capability is provided because multiple DACK transmissions would create collisions. In order to increase the probability of packet delivery, each multi-node packet can be sent at a lower speed and/or replicated across several (or all) of the channels. Broadcasts can also be replicated by increasing the transmit-retry count, thereby causing the same packet to be sent several times (according to the value specified in the transmit-retry count).

The packet transaction shown in FIG. 24 are examples of the types of packet transactions that can occur during one pass through a lineup card in a PLX network. As explained above, the transactions shown FIG. 24 can be used with a single channel medium or with a multi-channel medium. The differences in single channel and multi-channel systems are not reflected at the packet-level shown in FIG. 24, but rather, are evident at the fragment level as shown in FIG. 25.

Figure 25A:
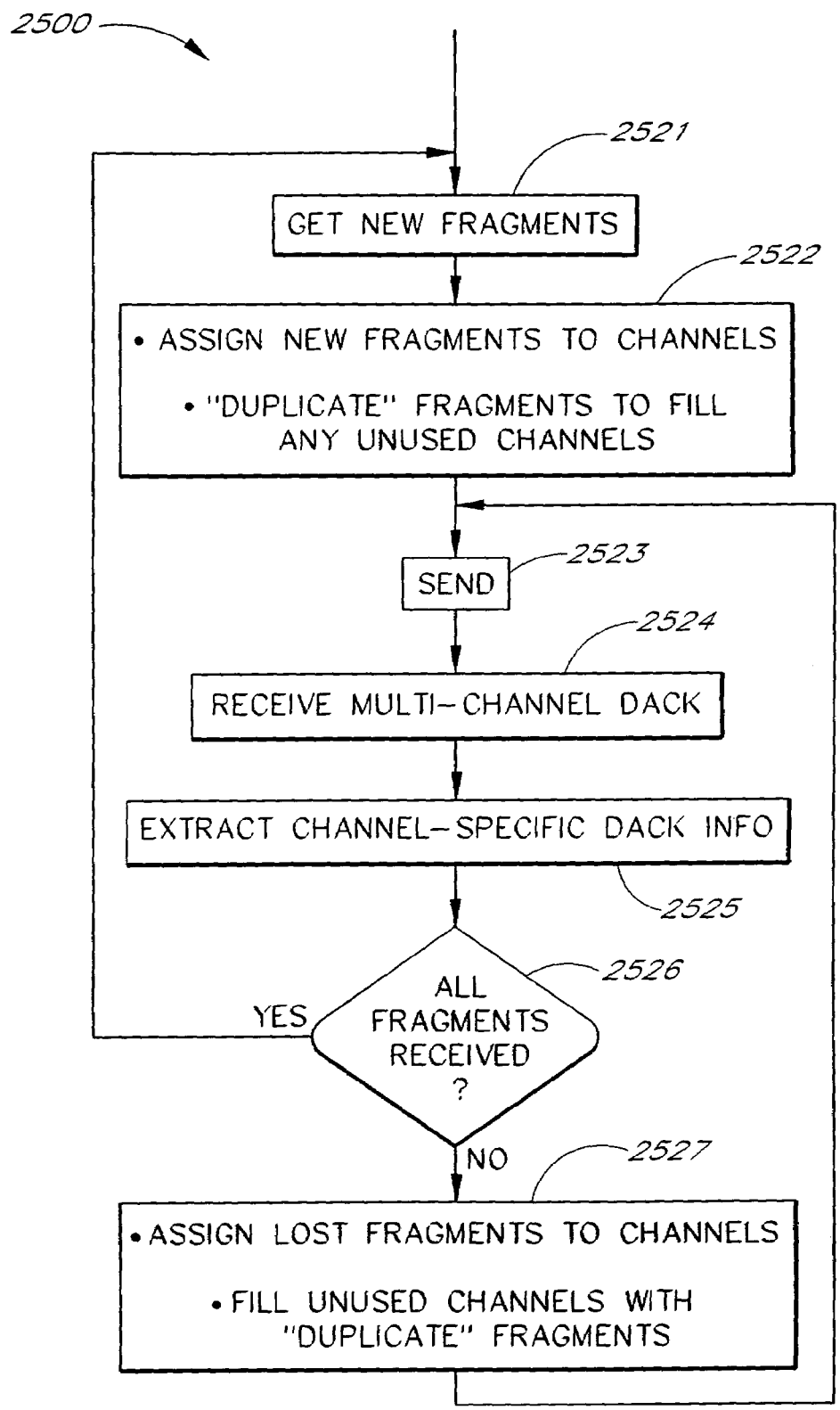
FIG. 25A is a flowchart showing a bad channel detection and transmission-retry algorithm for sending data on a multi-channel medium.

FIG. 25A is a flowchart of a bad-channel detection and transmission-retry algorithm for use on a multi-channel medium such as the medium 2012 shown in FIG. 20. The flowchart 2500 shows the algorithm used by a source node to send fragments (containing data) to a destination node. The flowchart 2500 begins at a first block 2521 in which a group of new data fragments to be sent over the medium is obtained. Each group of fragments contains 1 to m fragments, where m is the number of channels currently available for use (m can be less than or equal to the number of channels actually provided by the medium). Once the group of fragments is obtained, the process advances to a block 2522 where each fragment is assigned to a channel. If there are more available channels than fragments, then fragments are assigned to multiple channels such that all of the available channels are used. Once the fragments are assigned to channels, the process advances to a send block 2523 where the fragments are sent to the destination node. After sending the fragments, the process advances to a block 2524 to receive a multi-channel DACK from the destination node. The multi-channel DACK is sent by the destination node back to the source node. In one embodiment, the multi-channel DACK is sent on all channels to increase the probability that the DACK will be received. The multi-channel DACK contains channel-specific DACK information for each channel. Once the multi-channel DACK is received, the process advances to a block 2525 where the multi-channel DACK is examined to extract a channel-specific DACK for each channel. The process then advances to a decision block 2526 where each channel-specific DACK is examined to determine if all of the fragments were received. If all fragments in the group were received, then the process jumps back to the block 2521 to get the next group of fragments. Note that if a one or more of the fragments were sent on multiple channels (because there were fewer fragments than channels), then fragments in the group may be received even though some of the channel-specific DACKs indicated a lost fragment. Channels where fragments were lost are marked as being bad channels, and channels were fragments were not lost are marked as being good channels.

If, in the decision block 2526 it is determined that some of the fragments were lost in transmission, then the process advances to a block 2527. In the block 2527, the lost fragments are assigned to channels. If there are more available channels than lost fragments, then, as before, fragments are assigned to multiple channels such that all of the available channels are used. The process first attempts to assign fragments to good channels (on the assumption that channels that were good during the previous transmission will also be good during the next transmission). The process attempts, if possible, to ensure that each lost fragment is assigned to at least one good channel. After the good channels are assigned, then fragments are assigned to bad channels until all of the channels have an assigned fragment. The process then returns to the process block 2523 to send the lost fragments. The loop comprising blocks 2523-2527 continues until all of the fragments in the group have been successfully received by the destination node.

Figure 25B:
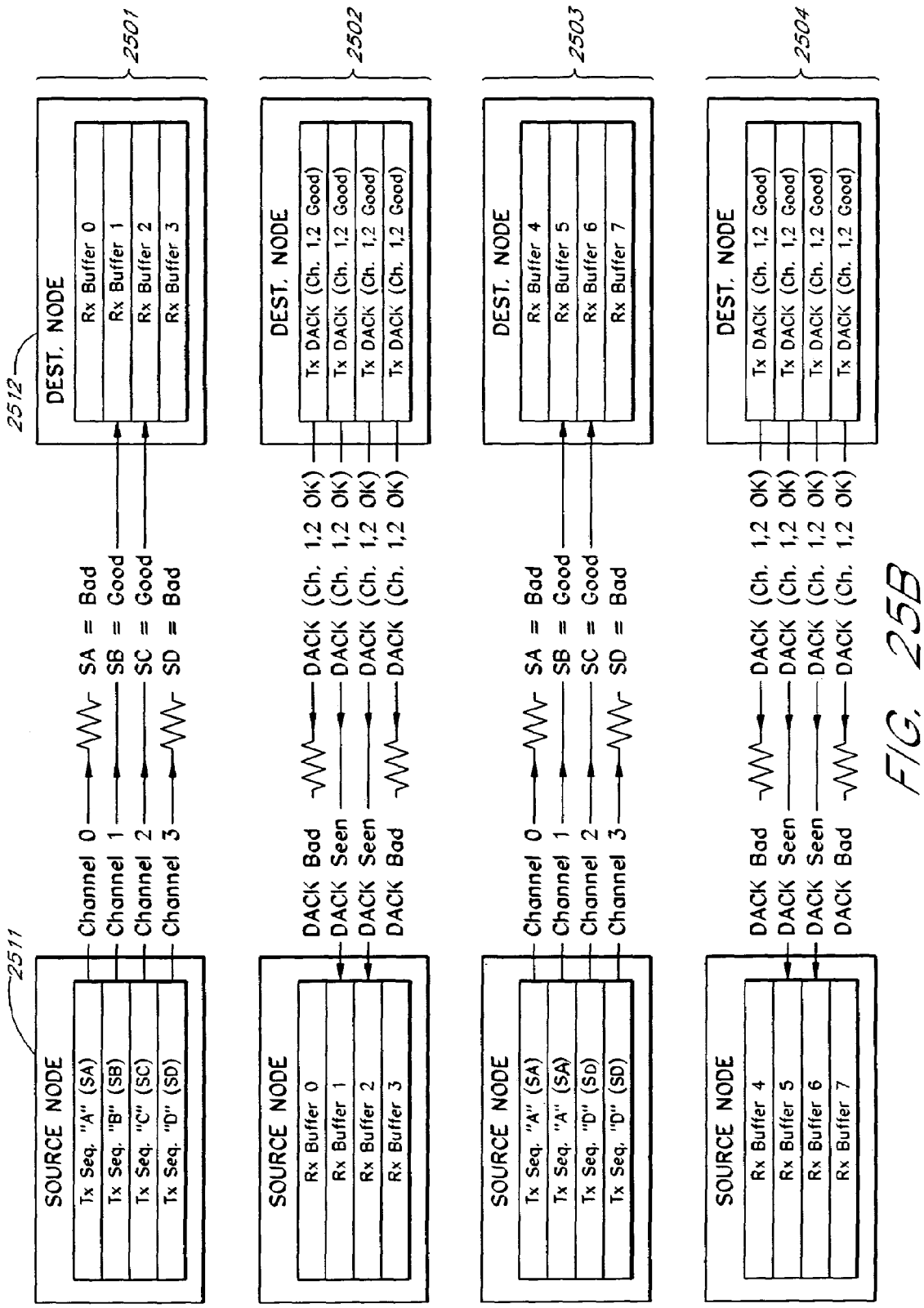
FIG. 25B is a diagram of a bad-channel detection and re-transmission of fragments in a multi-channel system based on the algorithm illustrated in FIG. 25A.

FIG. 25B, shows an example of a sequence of four events 2501-2504 corresponding to sending a group of four data fragments (fragments A, B, C, and D) from a source node 2511 to a destination node 2512. In FIG. 25B, the multi-channel medium is shown as having four available channels. One skilled in the art will recognize that the use of four channels is used for purposes of explanation, and not by way of limitation, and that the system described herein can be used with more than four channels or less than four channels as well. In the first event 2501, the source node 2511 send fragments A, B, C, and D on channels 0, 1, 2, and 3 respectively. Channels 0 and 3 are shown as being bad channels, and thus only fragments B and C are received by the destination node 2512. Accordingly, the destination node 2512 responds to the source node 2511 with a multi-channel DACK indicating that only channels 1 and 2 were good (event 2502). The destination node 2512 sends the multi-channel DACK on all channels. Since only channels 1 and 2 are good, the source node receives the multi-channel DACK only on channels 1 and 2.

The source node 2511 evaluates the multi-channel DACK, ascertains that fragments A and D were not received, and then resends fragments A and D to the destination node 2512 (event 2503). On the resend, the source node 2511 sends fragment A on channels 0 and 1 and fragment D on channels 2 and 3. The destination node 2512 receives fragment A on channel 1 and fragment D on channel 2. The destination node then respond with a second multi-channel DACK indicating that channels 1 and 2 are still good (event 2504). Upon receipt of the second multi-channel DACK during event 2504, the source node 2511 knows that all fragments A, B, C and D have been successfully received by the destination node 2512 and thus transmission of the group A, B, C, and D is complete and the source node can proceed to the next group of fragments (if any).

Duplicate fragment support, as illustrated in FIGS. 25A and 25B, allows a source node to send the same information across many or all channels. This provides reliability at the expense of throughput Multi-channel DACK allows a DACK information to be sent in response to packet requests. Instead of sending a separate DACK for each channel regarding that specific channel, the PLX multi-channel DACK packet contains channel status information for many channels. The multi-channel DACK packet is duplicated across each channel, effectively allowing the receiving node to see only 1 of n channel responses and still get an accurate DACK for all n channels.

Typically (except in burst mode discussed above) a destination node sends DACK information for each fragment group. This means that the source node can determine which channels worked (that is, which fragments were successfully sent) and which channels did not work. Thus the source node can resend only the unsuccessful fragments and the transmitter can use all of the available channels to resend the unsuccessful fragments. Thus, the multi-channel-DACK packet provides real-time information as to which channels are unstable channels as well as providing redundant information in case a good (stable) channel becomes unstable. The DACK packet also indicates the current status of the DACKing device, i.e., whether it's receive buffers are full (Busy), or whether it's host is inactive (Asleep), etc.

Intelligent transmit retry logic allows the source node to determine which channels to use to send data. After the data is sent, subsequent DACK information indicates which channels were successful and which channels were bad. Intelligent retry logic maps the fragments from the bad channels to the good channels and also leverages the bad channels by replicating fragment information onto the bad channels (in case the bad channels become functional and it also simplifies channel management logic by eliminating the need to turn channels on or off).

The destination node's packet reassembly logic can be reduced because a source node will not send the sequence number more than the channel number out of order. So for a four-channel system, the receiving node will not see more than a maximum of four sequence numbers out of order. This is accomplished by assuring that each fragment group is successfully received before moving on to the next fragment group.

Allowing large fragments to be sent across multiple channels allows real-time responses to each fragment burst, thus optimizing the learning process and allowing for bits or bytes to be lost and still be retried in a timely manner on a fragment-by-fragment basis (instead of re-trying an entire packet or requiring sophisticated error-correction schemes)

Figure 26B:
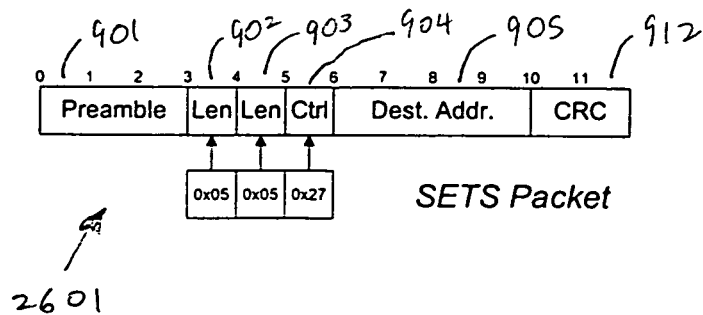
FIG. 26B is a block diagram showing a second type of PLX ETS packet.
Figure 26A:
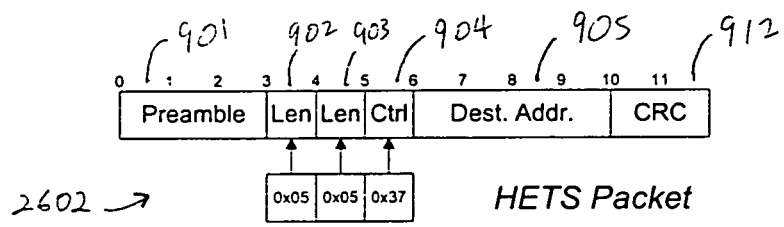
FIG. 26A is a block diagram showing a first type of PLX ETS packet.
Figure 28:
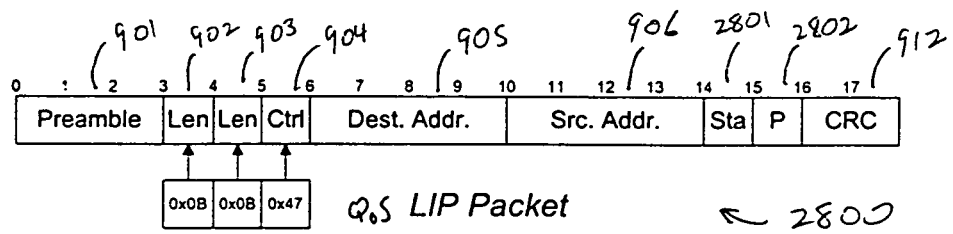
FIG. 28 is a block diagram showing a PLX broadcast packet.

Two forms of PLX ETS packets are shown in FIGS. 26A and 26B, each includes the preamble field 901, the length field 902, the length field 903, the ctrl field 904, the destination address field 905, and the CRC field 912. The length field 902, the length field 903 have the (hexadecimal) values 0x06 and 0x06 respectively. Two types of ETS packet are described in connection with FIGS. 26A and 26B. FIG. 26A shows a HETS packet (the ctrl field has the value 0x37), which indicates that the client used the token to send payload data. FIG. 26B shows a SETS packet (the ctrl field has the value 0x27), which indicates that the client did not use the token, thus allowing the server to gradually age-off the client. In one embodiment, the ETS packet can also contain a response value containing the number of packets or other statistics regarding that particular session.

The format of a PLX QoS token packet 2700 is shown in FIG. 27 and includes the preamble field 901, the length field 902, the length field 903, the ctrl field 904, the destination address field 905, a packet count field 2701, and the CRC field 912. The length field 902, the length field 903, and the ctrl field 904, have the (hexadecimal) values 0x06, 0x06, and 0x07 respectively. A token session begins when a node receives a PLX QoS token packet 2700 from the active server and ends when the node sends an ETS packet 2601 or 2602 back to the active server. In one embodiment, the packet count field 2701 specifies the maximum number of packets that the receiving node can send during the token session. In an alternate embodiment, the packet count field 2701 specifies a time limit for a token session. In another embodiment, the packet count field 2701 specifies a termination of the device from the lineup card ("Token of Death"), or still yet another embodiment indicates a variable maximum payload size the device can use during the current token session.

Figure 29:
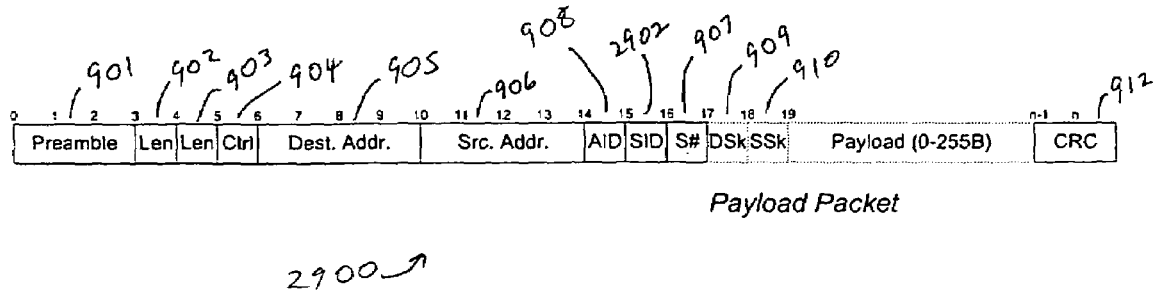
FIG. 29 is a block diagram showing an extended PLX payload packet.

FIG. 29 is a block diagram showing an extended PLX payload packet 2900, the packet 2900 is an alternate embodiment of the payload packet 900 shown in FIG. 9. Like the packet 900, the packet 2900 includes the preamble field 901, the length field 902, the length field 903, the ctrl field 904, the destination address field 905, the source address field 906, the sequence field 907, the authentication field 908, the DSk field 909, the SSk field 910, the payload field 911, and the CRC field 912. In addition, the packet 2900 includes a sequence ID field 2902. Four bits of the sequence ID field 2902 are combined with the sequence field 907 to form a sequence number. The sequence ID field 2902 also includes sequence-start bit and a sequence-end bit to indicate the start and end of a sequence.

Figure 30:
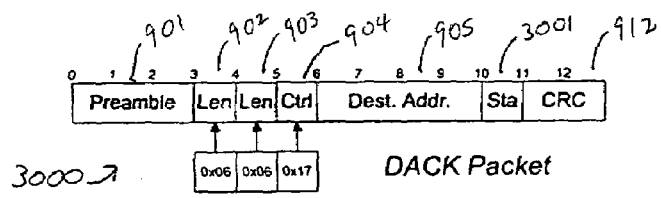
FIG. 30 is a block diagram showing a multi-channel DACK packet.

FIG. 30 is a block diagram of a multi-channel DACK packet 3000. The DACK packet 3000 is similar to the DACK packet 1100 shown in FIG. 11, where the DACK packet 3000 includes a status field 3001. The status field 3001 is used to provide a multi-channel DACK by indicating which channels received good data (as described, for example, in connection with FIGS. 25A and 25B).

OTHER EMBODIMENTS

Although the foregoing has been a description and illustration of specific embodiments of the invention, various modifications and changes can be made thereto by persons skilled in the art, without departing from the scope and spirit of the invention as defined by the following claims.

What is claimed is:

1. A method for arbitrating use of a network medium to avoid collisions caused by multiple nodes attempting to transmit data on the network medium at the same time, said method comprising the steps of:
    sending a token packet from an active server to a first client node, said token packet granting network medium access to said first client node;
    sending an end of token session packet from said first client to said server, said end of token session packet relinquishing network medium access by said first client node; and
    broadcasting a lineup insertion packet from said server, said lineup insertion packet comprising an address mask, said server configure to wait for a prescribed time period after broadcasting said lineup insertion packet to allow a second client node to send a lineup insertion response packet to said active server, said second client node sending said lineup insertion response packet if an address of said second client node falls within a range of addresses given by said address mask.

2. The method of claim 1, wherein said active network server maintains a lineup card that lists one or more client nodes.

3. The method of claim 1, wherein said token packet specifies a maximum number of packets that said first client can send before sending said end of token session packet.

4. The method of claim 3, wherein said first client node is allowed to transmit data packets on said network medium only during a token session.

5. The method of claim 3, wherein said first client node is removed from said lineup card when said node has been inactive for a period of time.

6. The method of claim 3, wherein said lineup insertion packet requests insertion onto a high priority queue.

7. The method of claim 1, wherein a presence of a packet is detected by matching a specified preamble and length sequence.

8. The method of claim 1, wherein access to said medium is provided by a media access control layer.

9. The method of claim 8, wherein said media access control layer provides a burst mode.

10. The method of claim 1, wherein said medium provides multiple channels.

11. The method of claim 1, wherein said medium is a power line.

12. The method of claim 1, wherein said medium is a radio frequency transmission medium.

13. A networking architecture to provide isochronous and non-isochronous data transmission on a network medium, comprising:
    an active server node, said active server node configured to send a lineup insertion packet containing an address mask and listen to said network medium for a specified period of time after sending said lineup insertion packet; and
    at least one client node configured to request insertion onto a lineup card of said active server node by responding to said lineup insertion packet, said active server node configured to provide a token to said at least one client node, said at least one client node configured to transmit on said medium for no more than a specified time period before sending an end of token session packet to said active server node.

14. The network architecture of claim 13, wherein said active server node maintains a lineup card of active client nodes, said lineup card comprising a high priority queue and a low priority queue.

15. The network architecture of claim 13, wherein said active server node polls all nodes listed on said high priority queue before polling a next node listed on said low priority queue.

* * * * *